US011966013B2

(12) United States Patent
Huang

(10) Patent No.: US 11,966,013 B2
(45) Date of Patent: Apr. 23, 2024

(54) IMAGING LENS ASSEMBLY, IMAGE CAPTURING UNIT AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 248 days.

(21) Appl. No.: 16/814,923

(22) Filed: Mar. 10, 2020

(65) Prior Publication Data

US 2020/0209595 A1 Jul. 2, 2020

Related U.S. Application Data

(63) Continuation of application No. 15/867,419, filed on Jan. 10, 2018, now Pat. No. 10,627,603.

(30) Foreign Application Priority Data

Sep. 22, 2017 (TW) .................................. 106132637

(51) Int. Cl.
G02B 3/02 (2006.01)
G02B 9/62 (2006.01)
G02B 13/00 (2006.01)
G02B 13/02 (2006.01)
G02B 13/18 (2006.01)

(52) U.S. Cl.
CPC ........... *G02B 13/0045* (2013.01); *G02B 9/62* (2013.01); *G02B 13/02* (2013.01)

(58) Field of Classification Search
CPC ...... G02B 9/62; G02B 13/0045; G02B 13/02; G02B 13/0065; G02B 13/18

USPC .................................................. 359/642–830
See application file for complete search history.

(56) References Cited

U.S. PATENT DOCUMENTS

| 2,983,194 A | 5/1961 | Miles |
| 3,659,922 A | 5/1972 | McCrobie |
| 4,279,476 A | 7/1981 | Nakahashi |
| 4,279,477 A | 7/1981 | Tojo |
| 4,632,520 A | 12/1986 | Yamakawa |
| 5,311,364 A | 5/1994 | Kanoshima et al. |

(Continued)

FOREIGN PATENT DOCUMENTS

| CN | 204556941 U | 8/2015 |
| TW | I574040 B | 3/2017 |
| WO | 2014175058 A1 | 10/2014 |

OTHER PUBLICATIONS

IN Office Action in Application No. 201834004501 dated Dec. 29, 2020.

*Primary Examiner* — Mahidere S Sahle
(74) *Attorney, Agent, or Firm* — Maschoff Brennan

(57) ABSTRACT

An imaging lens assembly includes six lens elements which are, in order from an object side to an image side: a first lens element, a second lens element, a third lens element, a fourth lens element, a fifth lens element and a sixth lens element. The second lens element has positive refractive power. The third lens element with negative refractive power has an image-side surface being concave in a paraxial region thereof. The fifth lens element with negative refractive power has an image-side surface being concave in a paraxial region thereof. The image-side surface of the fifth lens element has at least one inflection point.

19 Claims, 30 Drawing Sheets

(56) References Cited

U.S. PATENT DOCUMENTS

| | | | |
|---|---|---|---|
| 2013/0033762 A1* | 2/2013 | Tsai | G02B 13/0045 |
| | | | 359/713 |
| 2015/0022714 A1 | 1/2015 | Huang | |
| 2015/0168677 A1* | 6/2015 | Lee | G02B 9/62 |
| | | | 348/222.1 |
| 2016/0011401 A1 | 1/2016 | Chen et al. | |
| 2016/0103300 A1* | 4/2016 | Tang | G02B 27/0025 |
| | | | 359/713 |
| 2016/0139368 A1 | 5/2016 | You | |
| 2016/0187620 A1* | 6/2016 | Huang | G02B 13/0045 |
| | | | 359/713 |
| 2017/0168271 A1* | 6/2017 | Jiang | G02B 13/04 |
| 2017/0299846 A1* | 10/2017 | Lin | G02B 27/0025 |
| 2018/0052303 A1* | 2/2018 | Tang | G02B 5/208 |
| 2018/0074294 A1* | 3/2018 | Hsueh | G02B 27/0025 |
| 2018/0188496 A1* | 7/2018 | Hsieh | G02B 13/0045 |

\* cited by examiner

IMAGING LENS ASSEMBLY, IMAGE CAPTURING UNIT AND ELECTRONIC DEVICE

RELATED APPLICATIONS

This application is a continuation patent application of U.S. application Ser. No. 15/867,419 filed on Jan. 10, 2018, which claims priority to Taiwan Application 106132637, filed on Sep. 22, 2017, which is incorporated by reference herein in its entirety.

BACKGROUND

Technical Field

The present disclosure relates to an imaging lens assembly, an image capturing unit and an electronic device, more particularly to an imaging lens assembly and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

For various applications, the optical systems have been widely applied to different kinds of electronic devices, such as vehicle devices, image recognition systems, entertainment devices, sport devices and intelligent home systems. In particular, portable electronic devices equipped with the optical systems are now more popular than ever. Furthermore, in order to provide better user experience, the electronic devices equipped with one or more optical systems have become the mainstream on the market, and the optical systems are developed with various optical characteristics according to different requirements.

However, lens elements in a conventional telephoto type camera are usually made of glass material and have spherical lens surfaces, such that it is difficult to reduce the camera size, and thereby an electronic device equipped with the camera would likely be large as well; therefore, it is unfavorable for the telephoto camera to be installed in a compact portable electronic device. On the other hand, a conventional compact telephoto camera is usually equipped with a small aperture due to its size limitation, thereby leading to low image brightness. Furthermore, many optical systems on the market are incapable of capturing detailed images of an object from afar; accordingly, the conventional optical systems are unable to satisfy the market demands. As a result, there is a need to develop an optical system featuring telephoto, compact size and high image quality.

SUMMARY

According to one aspect of the present disclosure, an imaging lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element with negative refractive power has an image-side surface being concave in a paraxial region thereof. The fifth lens element with negative refractive power has an image-side surface being concave in a paraxial region thereof. The image-side surface of the fifth lens element has at least one inflection point. When a focal length of the imaging lens assembly is f, a maximum image height of the imaging lens assembly is ImgH, a curvature radius of the image-side surface of the fifth lens element is R10, a curvature radius of an image-side surface of the sixth lens element is R12, an axial distance between the third lens element and the fourth lens element is T34, and an axial distance between the fifth lens element and the sixth lens element is T56, the following conditions are satisfied:

$2.15 < f/ImgH < 5.5;$ $R10/R12 < 1.8;$ and $0 < T56/T34 < 0.85.$

According to another aspect of the present disclosure, an imaging lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element has negative refractive power. The fifth lens element with negative refractive power has an image-side surface being concave in a paraxial region thereof. The image-side surface of the fifth lens element has at least one inflection point. When a focal length of the imaging lens assembly is f, a maximum image height of the imaging lens assembly is ImgH, a central thickness of the first lens element is CT1, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of an object-side surface of the first lens element is R1, and a curvature radius of an image-side surface of the sixth lens element is R12, the following conditions are satisfied:

$2.15 < f/ImgH < 5.5;$ $0.10 < (CT1+T12)/(T23+T34+T45) < 0.90;$ and $-1.70 < (R1-R12)/(R1+R12) < 5.0.$ According to still another aspect of the present disclosure, an imaging lens assembly includes six lens elements. The six lens elements are, in order from an object side to an image side, a first lens element, a second lens element, a third lens element, a fourth lens element, a fifth lens element and a sixth lens element. The first lens element has positive refractive power. The second lens element has positive refractive power. The third lens element has negative refractive power. The fifth lens element with negative refractive power has an image-side surface being concave in a paraxial region thereof. The image-side surface of the fifth lens element has at least one inflection point. When a focal length of the imaging lens assembly is f, a maximum image height of the imaging lens assembly is ImgH, a central thickness of the first lens element is CT1, an axial distance between the third lens element and the fourth lens element is T34, and an axial distance between the fourth lens element and the fifth lens element is T45, the following conditions are satisfied:

$2.15 < f/ImgH < 5.5;$ and $1.8 < (CT1+T34)/T45 < 33.0.$

According to yet another aspect of the present disclosure, an imaging lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element has negative refractive power. The fifth lens element with negative refractive power has an image-side surface being concave in a paraxial region thereof. The image-side surface of the fifth lens element has at least one inflection point. When half of a maximum field of view of the imaging lens assembly is HFOV, an Abbe number of the third lens element is V3, an Abbe number of the fourth lens element is V4, and an Abbe number of the sixth lens element is V6, the following conditions are satisfied:

5.0[deg.]<HFOV<23.0[deg.]; and

10<$V3+V4+V6$<95.

According to yet still another aspect of the present disclosure, an imaging lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element has negative refractive power. The fifth lens element with negative refractive power has an image-side surface being concave in a paraxial region thereof. The image-side surface of the fifth lens element has at least one inflection point. When half of a maximum field of view of the imaging lens assembly is HFOV, an axial distance between an object-side surface of the first lens element and an image surface is TL, a focal length of the imaging lens assembly is f, and a maximum image height of the imaging lens assembly is ImgH, the following conditions are satisfied:

5.0[deg.]<HFOV<23.0[deg.];

0.70<$TL/f$<1.10; and 2.0<$f$/ImgH<10.

According to yet still another aspect of the present disclosure, an image capturing unit includes the aforementioned imaging lens assembly, a driving device and an image sensor, wherein the driving device is disposed on the imaging lens assembly, and the image sensor is disposed on the image surface of the imaging lens assembly.

According to yet still another aspect of the present disclosure, an electronic device includes the aforementioned image capturing unit.

According to yet still another aspect of the present disclosure, an imaging lens assembly includes six lens elements. The six lens elements are, in order from an object side to an image side, a first lens element, a second lens element, a third lens element, a fourth lens element, a fifth lens element and a sixth lens element. The first lens element has an object-side surface being convex in a paraxial region thereof. The second lens element has positive refractive power. The third lens element has negative refractive power. The fifth lens element with negative refractive power has an image-side surface being concave in a paraxial region thereof. The image-side surface of the fifth lens element has at least one inflection point. When half of a maximum field of view of the imaging lens assembly is HFOV, an axial distance between the object-side surface of the first lens element and an image surface is TL, a focal length of the imaging lens assembly is f, a maximum image height of the imaging lens assembly is ImgH, a central thickness of the fourth lens element is CT4, and an axial distance between the third lens element and the fourth lens element is T34, the following conditions are satisfied:

5.0[deg.]<HFOV<30.0[deg.];

0.70<$TL/f$<1.45;

2.0<$f$/ImgH<10; and 0.05<$CT4/T34$<0.85.

BRIEF DESCRIPTION OF THE DRAWINGS

The disclosure can be better understood by reading the following detailed description of the embodiments, with reference made to the accompanying drawings as follows.

DETAILED DESCRIPTION

An imaging lens assembly includes six lens elements. The six lens elements are, in order from an object side to an image side, a first lens element, a second lens element, a third lens element, a fourth lens element, a fifth lens element and a sixth lens element.

There can be an air gap in a paraxial region between every adjacent lens elements of the imaging lens assembly; that is, each of the first through the sixth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between every adjacent lens elements of the imaging lens assembly in the present disclosure is favorable for preventing the problem associated with the cemented lens elements while improving the yield rate.

The first lens element can have positive refractive power; therefore, it is favorable for the distribution of light converging power among lens elements on the object side of the imaging lens assembly, so as to prevent overly strong refractive power from any one of the lens elements, thereby reducing aberrations. The first lens element can have an object-side surface being convex in a paraxial region thereof; therefore, it is favorable for balancing the lens curvatures so as to reduce spherical aberration. In addition, when configured with a concave image-side surface of the first lens element, it is favorable for light in both sagittal direction and tangential direction converging, thereby correcting astigmatism.

The second lens element has positive refractive power; therefore, it is favorable for providing the main light converging power so as to reduce the total track length of the imaging lens assembly, thereby achieving compactness.

The third lens element has negative refractive power; therefore, it is favorable for correcting chromatic aberration so as to prevent image overlaps due to light rays with different wavelengths focusing on different positions. The third lens element can have an image-side surface being concave in a paraxial region thereof; therefore, it is favorable for balancing light divergence capability so as to correct aberrations. In addition, when configured with an object-side surface being convex in a paraxial region of the third lens element, it is favorable for correcting aberrations of the second lens element, thereby improving the image quality.

Figure 25:
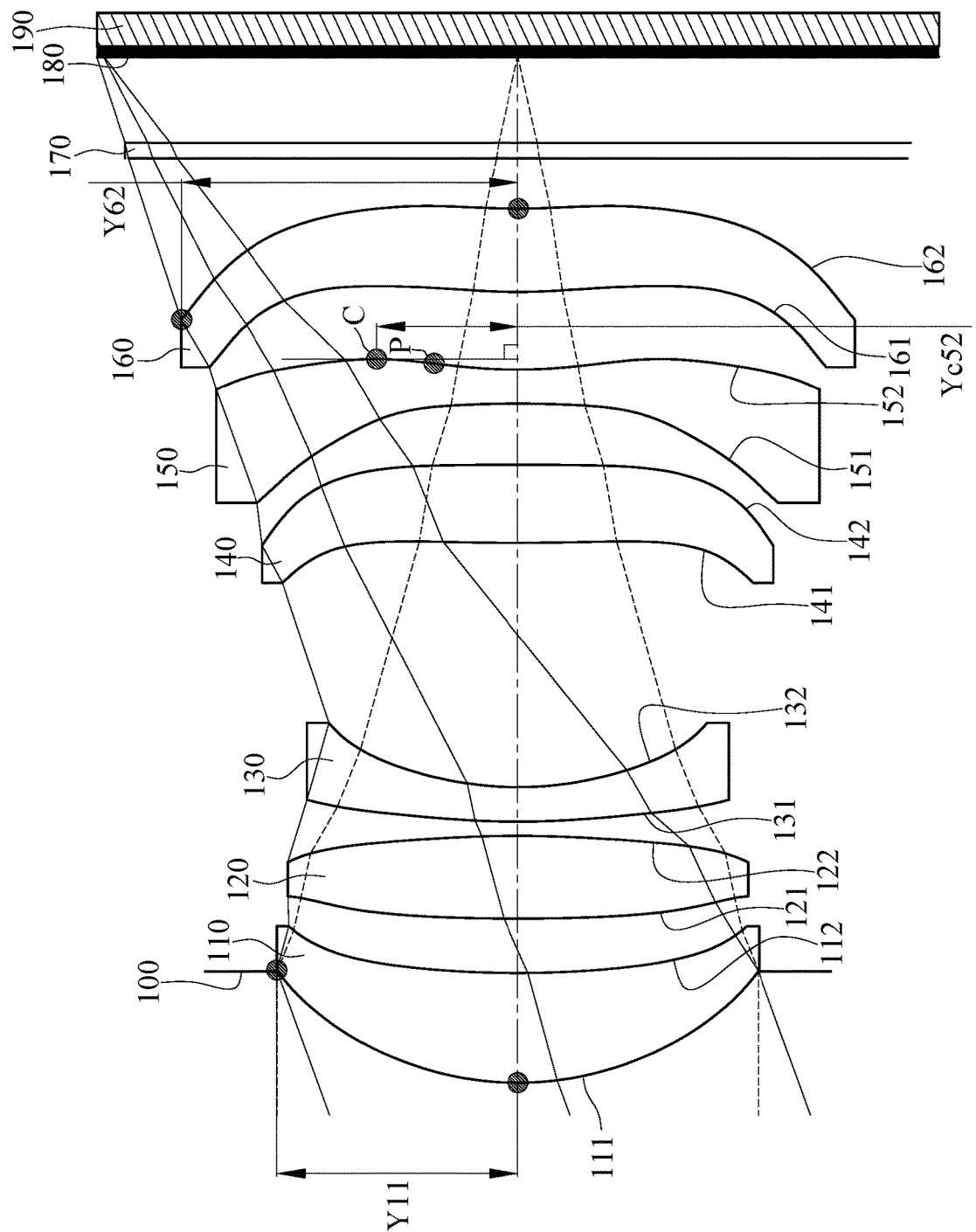
FIG. 25 shows a schematic view of Y11, Y62, Yc52, a critical point on an image-side surface of a fifth lens element, and an inflection point on the image-side surface of the fifth lens element, according to the 1st embodiment of the present disclosure.

The fifth lens element has negative refractive power; therefore, the refractive power distribution on the image side is favorable for avoiding the overly long back focal length of the imaging lens assembly and the difficulty of minimizing the size of the electronic devices with the imaging lens assembly. The fifth lens element has an image-side surface being concave in a paraxial region thereof; therefore, it is favorable for reducing the back focal length and miniaturization. The image-side surface of the fifth lens element has at least one inflection point; therefore, it is favorable for reducing distortion, preventing vignetting in the peripheral region of the image, and correcting off-axis aberrations. Please refer to FIG. 25, which shows a schematic view of an inflection point P on the image-side surface of the fifth lens element according to the 1st embodiment of the present disclosure.

The sixth lens element can have an image-side surface being concave in a paraxial region thereof, and the image-side surface of the sixth lens element can have a convex shape in an off-axis region thereof. Therefore, it is favorable for correcting off-axis aberrations and improving the Petzval field curvature so as to reduce the size of the imaging lens assembly and provide high image quality.

Each of an image-side surface of the fourth lens element, the image-side surface of the fifth lens element and the image-side surface of the sixth lens element can have a convex shape in an off-axis region thereof. Therefore, it is favorable for correcting distortion and field curvature so as to improve peripheral image quality.

According to the present disclosure, each of at least two of the six lens elements of the imaging lens assembly can have at least one inflection point. Therefore, it is favorable for correcting off-axis aberrations and reducing the total track length of the imaging lens assembly.

When a focal length of the imaging lens assembly is f, and a maximum image height of the imaging lens assembly (half of a diagonal length of an effective photosensitive area of an image sensor) is ImgH, the following condition can be satisfied: $2.0 < f/ImgH < 10$. Therefore, it is favorable for obtaining a telephoto configuration in the imaging lens assembly so as to capture detailed images of an object from afar, and become applicable to a wide range of applications. Preferably, the following condition can also be satisfied: $2.15 < f/ImgH < 5.5$.

When a curvature radius of the image-side surface of the fifth lens element is R10, and a curvature radius of the image-side surface of the sixth lens element is R12, the following condition can be satisfied: $R10/R12 < 1.8$. Therefore, it is favorable for balancing the shapes of the image-side surfaces of the fifth and the sixth lens elements so as to enhance the capability of aberration corrections on the image side of the imaging lens assembly. Preferably, the following condition can also be satisfied: −1.8<R10/R12<1.3.

When an axial distance between the third lens element and the fourth lens element is T34, and an axial distance between the fifth lens element and the sixth lens element is T56, the following condition can be satisfied: 0<T56/T34<0.85. Therefore, it is favorable for arranging the axial distances between the lens elements in the middle part of the imaging lens assembly so as to provide sufficient distance for refracted light rays to travel, thereby obtaining the telephoto effect. Preferably, the following condition can also be satisfied: 0<T56/T34<0.55.

When a central thickness of the first lens element is CT1, an axial distance between the first lens element and the second lens element is T12, an axial distance between the second lens element and the third lens element is T23, the axial distance between the third lens element and the fourth lens element is T34, and an axial distance between the fourth lens element and the fifth lens element is T45, the following condition can be satisfied: 0.10<(CT1+T12)/(T23+T34+T45)<0.90. Therefore, it is favorable for obtaining proper spacing in the imaging lens assembly with proper axial distances between the lens elements so as to correct aberrations. Preferably, the following condition can also be satisfied: 0.20<(CT1+T12)/(T23+T34+T45)<0.70.

When a curvature radius of the object-side surface of the first lens element is R1, and the curvature radius of the image-side surface of the sixth lens element is R12, the following condition can be satisfied: −1.70<(R1−R12)/(R1+R12)<5.0. Therefore, it is favorable for controlling the curvature configuration of the lens element closest to the object side and the lens element closest to the image side and correcting astigmatism and balancing the shape distribution of the lens elements so as to improve the image quality. Preferably, the following condition can be satisfied: −1.50<(R1−R12)/(R1+R12)<2.0. More preferably, the following condition can also be satisfied: −1.50<(R1−R12)/(R1+R12)<0.

When the central thickness of the first lens element is CT1, the axial distance between the third lens element and the fourth lens element is T34, and the axial distance between the fourth lens element and the fifth lens element is T45, the following condition can be satisfied: 1.8<(CT1+T34)/T45<33.0. Therefore, it is favorable for balancing between lens thickness and axial distances between lens elements so as to prevent molding problems due to overly large lens thickness, and interference in assembling due to overly small axial distances between lens elements. Preferably, the following condition can also be satisfied: 3.0<(CT1+T34)/T45<25.0.

When half of a maximum field of view of the imaging lens assembly is HFOV, the following condition can be satisfied: 5.0 [deg.]<HFOV<30.0 [deg.]. Therefore, it is favorable for controlling the imaging range of the imaging lens assembly so as to become applicable to a wide range of applications. Preferably, the following condition can also be satisfied: 5.0 [deg.]<HFOV<23.0 [deg.].

When an Abbe number of the third lens element is V3, an Abbe number of the fourth lens element is V4, and an Abbe number of the sixth lens element is V6, the following condition can be satisfied: 10<V3+V4+V6<95. Therefore, it is favorable for obtaining the proper materials for the lens elements so as to increase the density difference between each lens element and air, thereby strengthening the refractive power of the lens elements with light properly refracted within a shorter distance, and therefore it is favorable for reducing the total track length and becoming applicable to a wide range of applications. Preferably, the following condition can also be satisfied: 30<V3+V4+V6<80.

When an axial distance between the object-side surface of the first lens element and an image surface is TL, and the focal length of the imaging lens assembly is f, the following condition can be satisfied: 0.70<TL/f<1.45. Therefore, it is favorable for balancing between the total track length and the field of view so as to provide high image quality with high-end specifications. Preferably, the following condition can also be satisfied: 0.70<TL/f<1.10.

When a central thickness of the fourth lens element is CT4, and the axial distance between the third lens element and the fourth lens element is T34, the following condition can be satisfied: 0.05<CT4/T34<0.85. Therefore, it is favorable for balancing between the central thickness of the fourth lens element and the axial distance between the third lens element and the fourth lens element so as to improve lens assembling, thereby reducing the manufacturing sensitivity.

When a vertical distance between a non-axial critical point on the image-side surface of the fifth lens element and an optical axis is Yc52, and the focal length of the imaging lens assembly is f, the following condition can be satisfied: 0.01<Yc52/f<1.0. Therefore, it is favorable for controlling the incident angle of marginal rays projecting on the image surface, and correcting field curvature so as to provide high image quality. Please refer to FIG. 25, which shows a schematic view of Yc52 and a critical point C on the image-side surface of the fifth lens element according to the 1st embodiment of the present disclosure.

When the focal length of the imaging lens assembly is f, and a curvature radius of an object-side surface of the fifth lens element is R9, the following condition can be satisfied: −0.50<f/R9<5.0. Therefore, it is favorable for balancing the curvature of the object-side surface of the fifth lens element so as to control the refractive power of the fifth lens element for improving the image quality.

When the focal length of the imaging lens assembly is f, a curvature radius of an object-side surface of one lens element of the six lens elements is Rf, and a curvature radius of an image-side surface of the lens element of the six lens elements is Rr, at least one of the six lens elements satisfies the following condition: |f/Rf|+|f/Rr|<1.0. Therefore, it is favorable for controlling the refractive power of any one of the lens elements so as to prevent total reflection due to overly curved surfaces of the lens element, thereby reducing unwanted spots on the image. Preferably, the following condition can also be satisfied: |f/Rf|+|f/Rr|<0.50.

When a maximum value among all refractive indices of the six lens elements of the imaging lens assembly is Nmax, the following condition can be satisfied: 1.50<Nmax<1.75. Therefore, it is favorable for selecting proper materials of the six lens elements so as to balance between high image quality and a short total track length, thereby achieving miniaturization.

When the focal length of the imaging lens assembly is f, and an entrance pupil diameter of the imaging lens assembly is EPD, the following condition can be satisfied: 0.90<f/EPD<2.55. Therefore, it is favorable for providing sufficient amount of incident light so as to increase image resolution.

When the focal length of the imaging lens assembly is f, and the curvature radius of the object-side surface of the first lens element is R1, the following condition can be satisfied:

$2.85<f/R1<6.0$. Therefore, it is favorable for enhancing the light convergence capability of the first lens element so as to reduce the total track length.

According to the present disclosure, each of at least three of the six lens elements of the imaging lens assembly can have an Abbe number smaller than 25.0. Therefore, due to a larger density difference between a high-dispersion material (low Abbe number) and air, it is favorable for obtaining stronger refractive capability, such that light is properly refracted within a shorter distance for reducing the size of the imaging lens assembly. Preferably, each of at least two of the six lens elements of the imaging lens assembly can have an Abbe number smaller than 22.0. More preferably, at least one of the six lens elements of the imaging lens assembly can have an Abbe number smaller than 20.0. Much more preferably, each of at least two of the six lens elements of the imaging lens assembly can have an Abbe number smaller than 20.0.

According to the present disclosure, the axial distance between the third lens element and the fourth lens element is the largest among all axial distances between every adjacent lens elements of the imaging lens assembly; that is, the axial distance between the third lens element and the fourth lens element is larger than other axial distances between every adjacent lens elements of the imaging lens assembly. Therefore, balancing the axial distance between the third lens element and the fourth lens element is favorable for providing a sufficient distance for refracted light rays to travel so as to obtain high image quality.

When a focal length of the second lens element is f2, and a focal length of the third lens element is f3, the following condition can be satisfied: $-1.90<f2/f3<-0.85$. Therefore, it is favorable for balancing the refractive power distribution of the imaging lens assembly so as to reduce the sensitivity.

When a maximum effective radius of the object-side surface of the first lens element is Y11, and a maximum effective radius of the image-side surface of the sixth lens element is Y62, the following condition can be satisfied: $0.80<Y62/Y11<1.65$. Therefore, it is favorable for the imaging lens assembly to have sufficient pupil diameters on the object side and the image side so as to increase image brightness. Please refer to FIG. 25, which shows a schematic view of Y11 and Y62 according to the 1st embodiment of the present disclosure.

According to the present disclosure, the imaging lens assembly further includes an aperture stop, and the aperture stop can be located between an imaged object and the third lens element. When an axial distance between the aperture stop and the image-side surface of the sixth lens element is SD, and an axial distance between the object-side surface of the first lens element and the image-side surface of the sixth lens element is TD, the following condition can be satisfied: $0.75<SD/TD<0.90$. Therefore, it is favorable for balancing between the field of view and the total track length of the image capturing lens system, while keeping electronic devices compact with improved practicality.

When the axial distance between the third lens element and the fourth lens element is T34, and the axial distance between the fourth lens element and the fifth lens element is T45, the following condition can be satisfied: $0<T45/T34<5.5$. Therefore, it is favorable for arranging the axial distances between the lens elements so as to reduce the sensitivity of the imaging lens assembly. Preferably, the following condition can be satisfied: $0<T45/T34<1.5$. More preferably, the following condition can also be satisfied: $0<T45/T34<0.6$.

When the axial distance between the fourth lens element and the fifth lens element is T45, a central thickness of the fourth lens element is CT4, and a central thickness of the fifth lens element is CT5, the following condition can be satisfied: $0<T45/(CT4+CT5)<2.4$. Therefore, it is favorable for obtaining proper lens thicknesses for lens molding and proper axial distance between the fourth lens element and the fifth lens element for applications in compact electronic devices.

When a maximum value among all axial distances between each of the six adjacent lens elements is ATmax, and a maximum value among all central thicknesses of the six lens elements is CTmax, the following condition can be satisfied: $1.20<ATmax/CTmax<6.0$. Therefore, it is favorable for balancing space arrangement of lens elements with more efficient space utilization.

When the focal length of the imaging lens assembly is f, and the curvature radius of the image-side surface of the sixth lens element is R12, the following condition can be satisfied: $-0.65<f/R12<4.0$. Therefore, it is favorable for controlling the back focal length so as to prevent overly long track length, thereby minimizing the size of the imaging lens assembly.

When the focal length of the second lens element is f2, and a focal length of the fifth lens element is f5, the following condition can be satisfied: $-3.0<f2/f5<-0.8$. Therefore, it is favorable for balancing the refractive power distribution on the object side and the image side of the imaging lens assembly so as to reduce the total track length for various applications.

When the Abbe number of the third lens element is V3, the following condition can be satisfied: $10.0<V3<35.0$. Therefore, it is favorable for increasing the density difference between the third lens element and air so as to enhance the capability of aberration corrections of the third lens element.

When the Abbe number of the fourth lens element is V4, the following condition can be satisfied: $10.0<V4<35.0$. Therefore, it is favorable for increasing the density difference between the fourth lens element and air so as to enhance the capability of aberration corrections of the fourth lens element.

Figure 26:
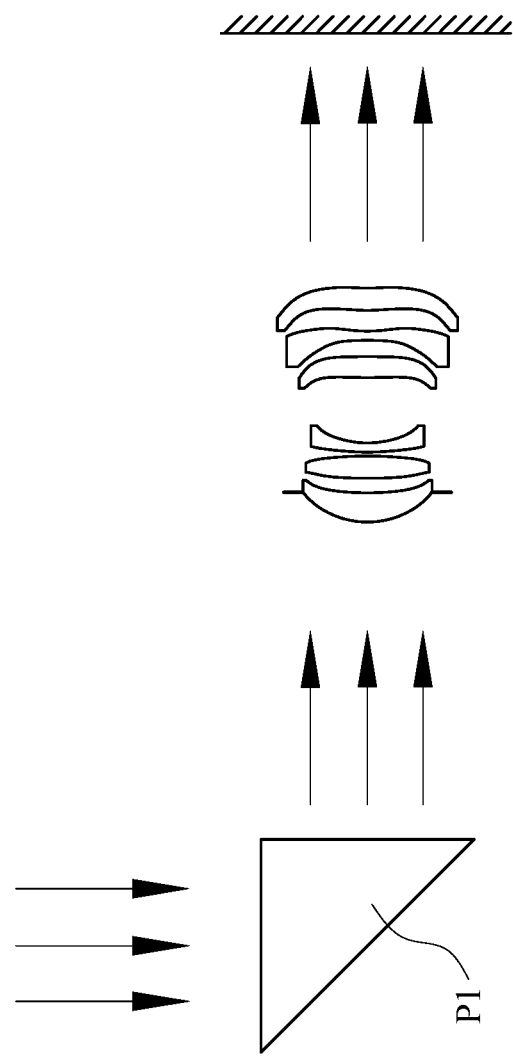
FIG. 26 shows a schematic view of a reflector and an imaging lens assembly according to one embodiment of the present disclosure.
Figure 27:
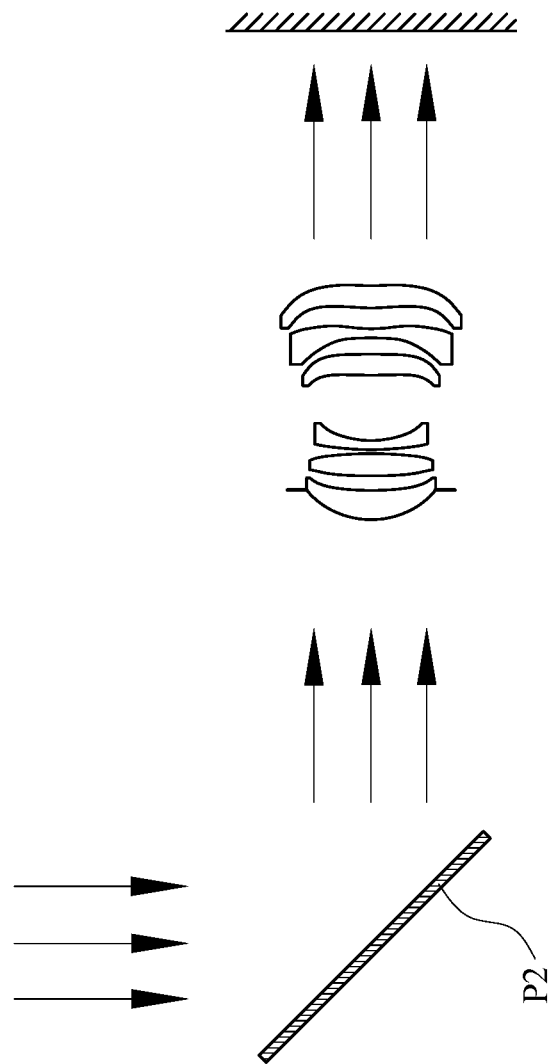
FIG. 27 shows a schematic view of another reflector and the imaging lens assembly according to one embodiment of the present disclosure.
Figure 28:
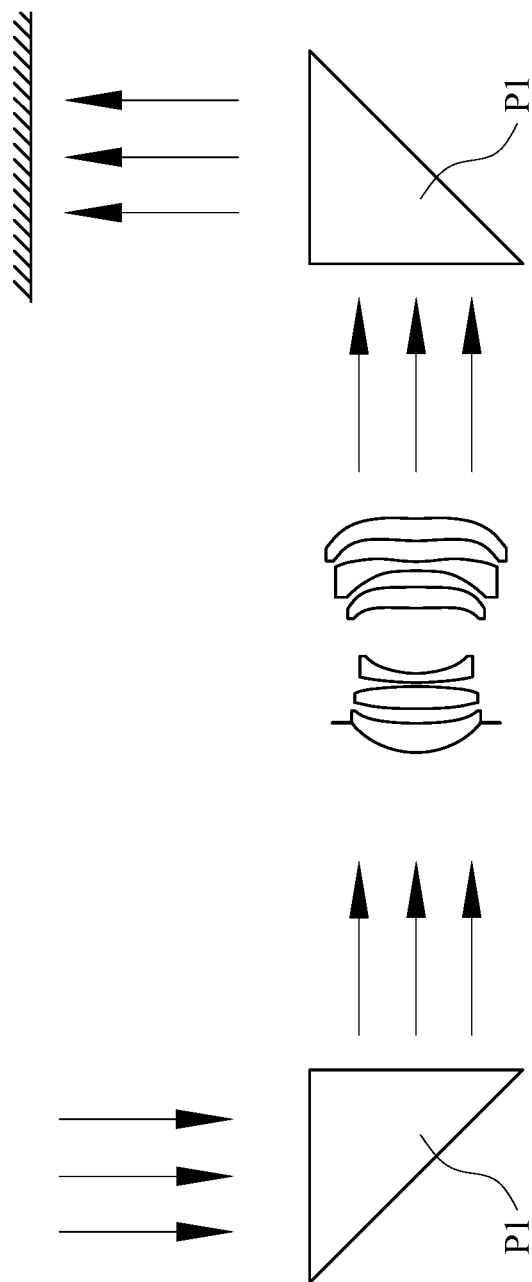
FIG. 28 shows a schematic view of two reflectors and the imaging lens assembly according to one embodiment of the present disclosure.
Figure 29:
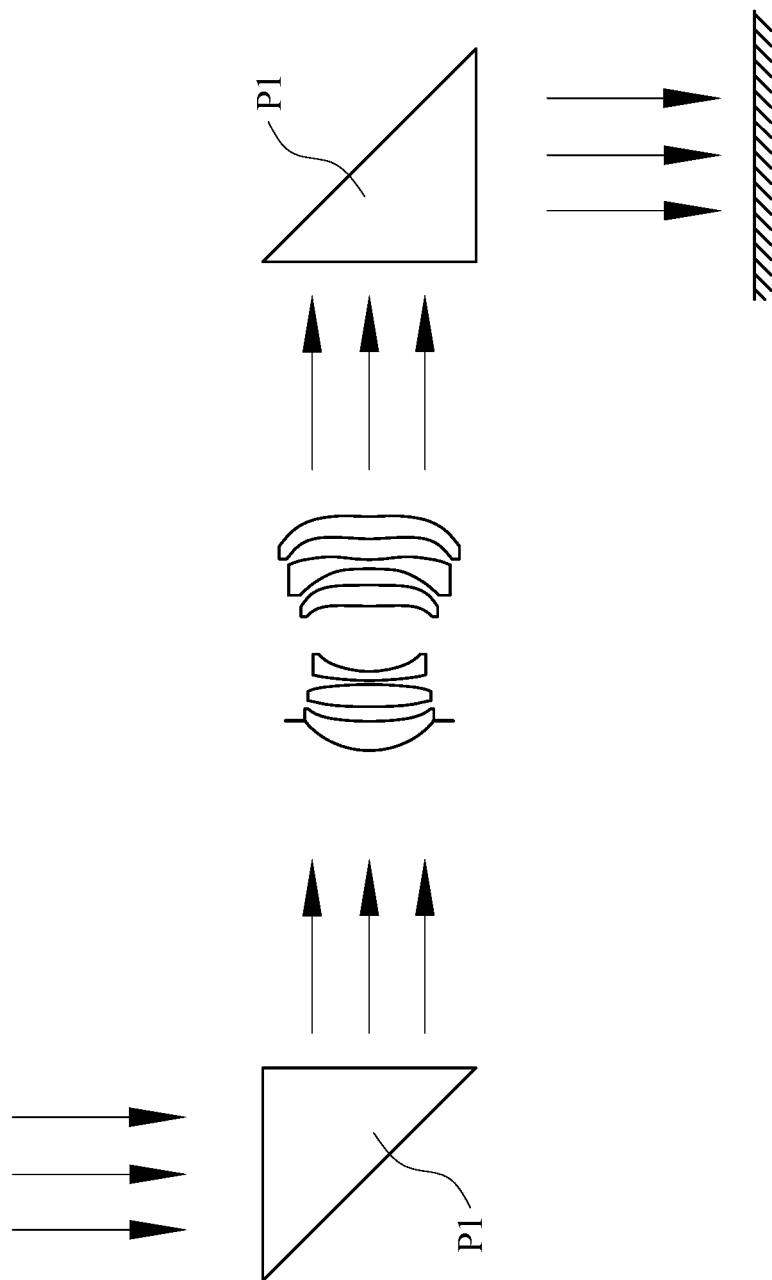
FIG. 29 shows a schematic view of two reflectors and the imaging lens assembly according to another embodiment of the present disclosure.
Figure 30:
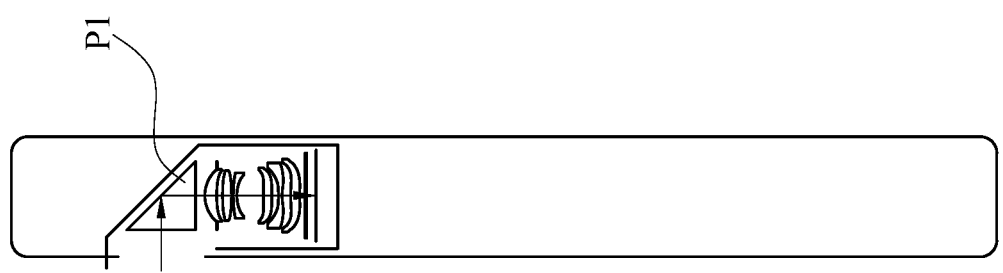
FIG. 30 shows a schematic side view of an electronic device including the reflector and the imaging lens assembly, according to one embodiment of the present disclosure.

According to the present disclosure, the imaging lens assembly can include at least one reflector. The reflector is, for example, a prism or a reflective mirror. Therefore, the traveling direction of light rays can be changed, such that it is favorable for obtaining good space utilization and also more design flexibility in the imaging lens assembly. As seen in FIG. 26, which shows a schematic view of a reflector and the imaging lens assembly according to one embodiment of the present disclosure, wherein the reflector is a prism P1 disposed between the imaged object (not shown in the drawings) and the lens elements of the imaging lens assembly (its reference numerals is omitted), but the disclosure is not limited to the type, the amount and the position of the reflector shown in FIG. 26. For example, as shown in FIG. 27, which shows a schematic view of another reflector and the imaging lens assembly according to one embodiment of the present disclosure, the reflector is a reflective mirror P2. Please refer to FIG. 28 and FIG. 29. FIG. 28 shows a schematic view of two reflectors and the imaging lens assembly according to one embodiment of the present disclosure, and FIG. 29 shows a schematic view of two reflectors and the imaging lens assembly according to another embodiment of the present disclosure, wherein the two prisms P1 are respectively located on the object side and the image side of the lens elements of the imaging lens assembly. As shown in FIG. 30, the traveling direction of incident light rays can be changed by the reflector (the prism P1), such that the dimensions of the electronic device is not restricted by the total track length of the imaging lens assembly.

According to the present disclosure, each of the aforementioned features and conditions can be utilized in numerous combinations so as to achieve corresponding effects.

According to the present disclosure, the lens elements thereof can be made of glass or plastic material. When the lens elements are made of glass material, the distribution of the refractive power of the imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging lens assembly can also be reduced.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the imaging lens assembly, based on the corresponding image sensor, can be flat or curved, especially a curved surface being concave facing towards the object side of the imaging lens assembly.

According to the present disclosure, an image correction unit, such as a field flattener, can be optionally disposed between the lens element closest to the image side of the imaging lens assembly and the image surface for correcting aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens assembly and thereby provides a wider field of view for the same.

According to the above description of the present disclosure, the following specific embodiments are provided for further explanation.

1st Embodiment

Figure 1:
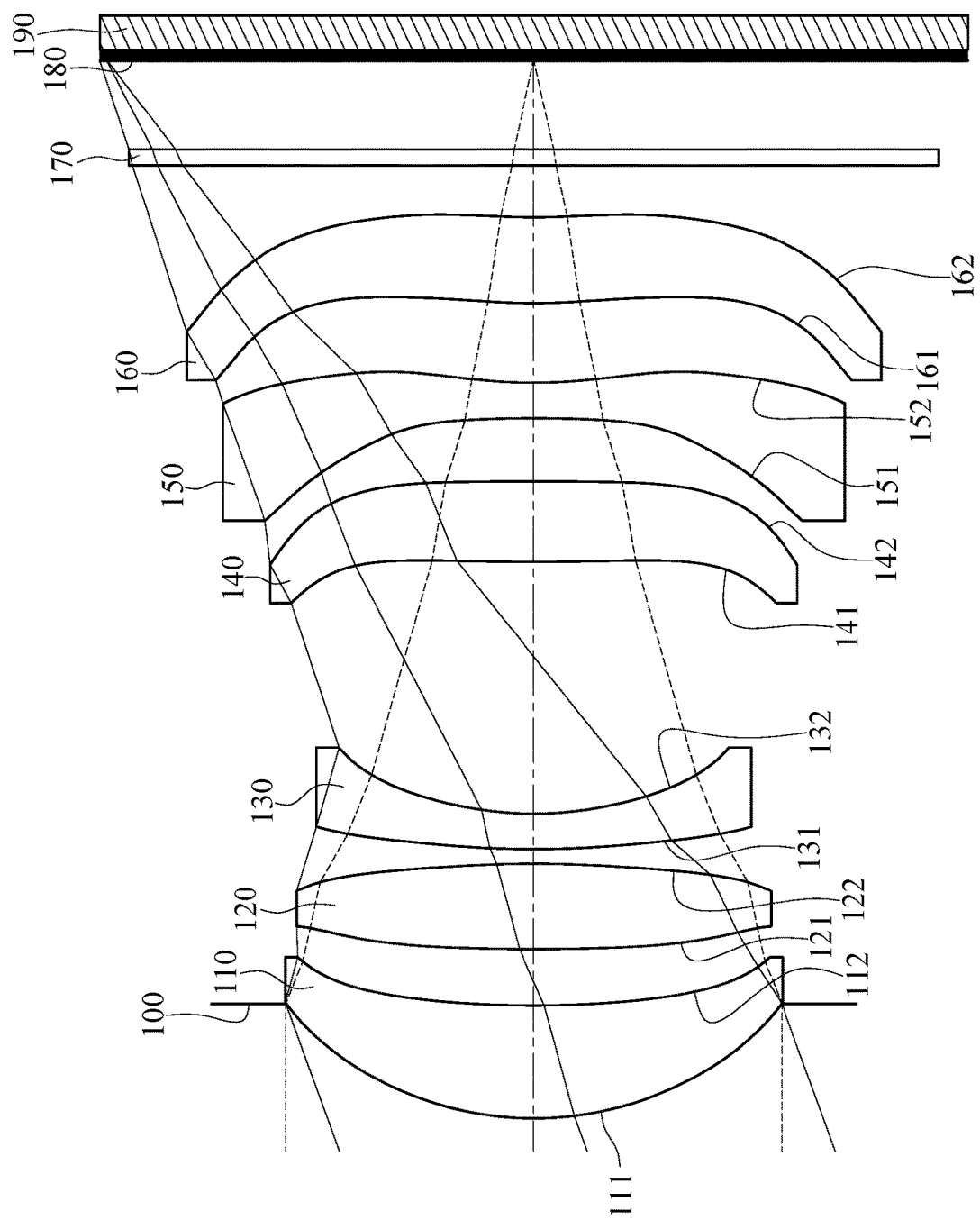
FIG. 1 is a schematic view of an image capturing unit according to the 1st embodiment of the present disclosure.
Figure 2:
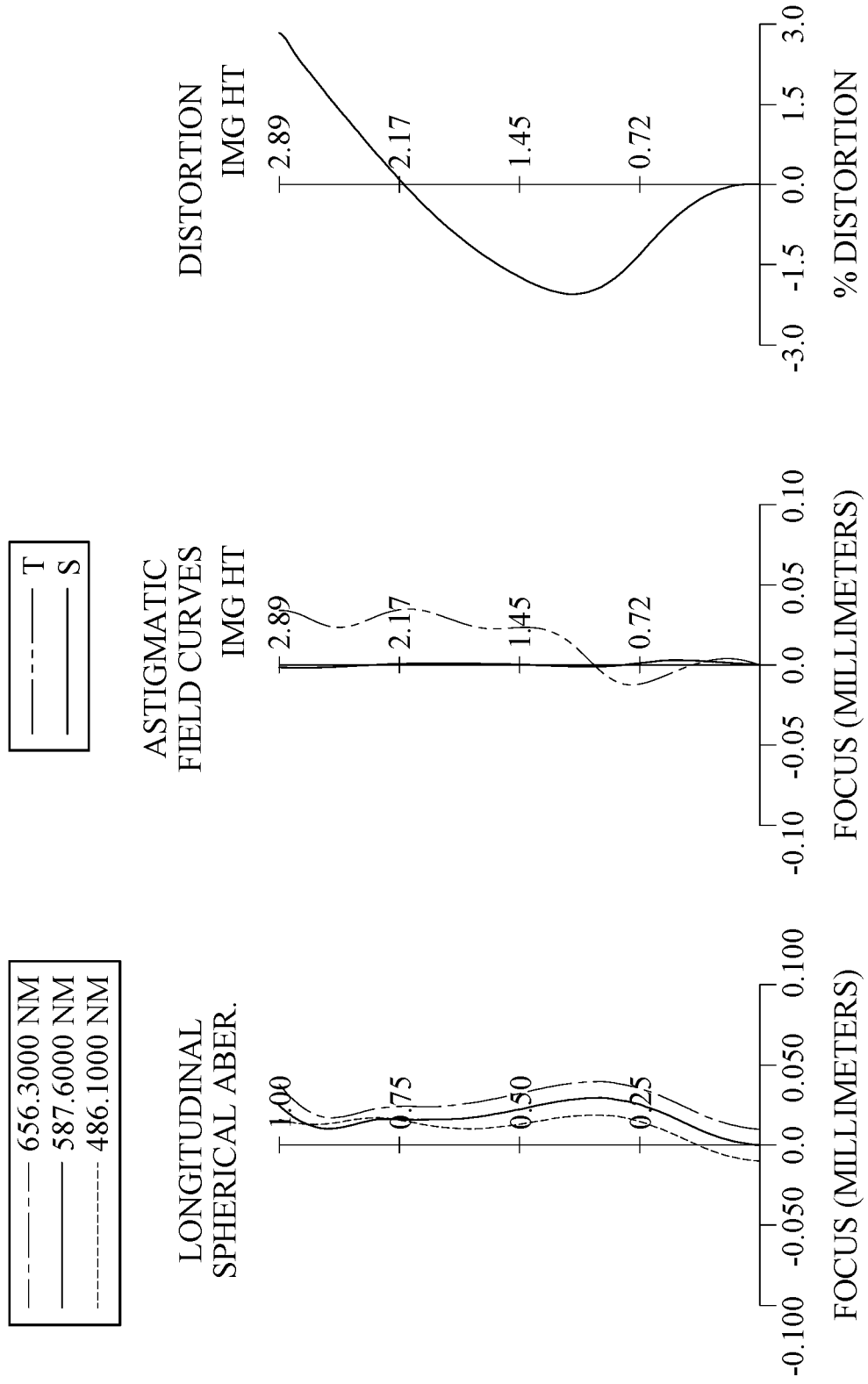
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens assembly (its reference numeral is omitted) of the present disclosure and an image sensor 190. The imaging lens assembly includes, in order from an object side to an image side, an aperture stop 100, a first lens element 110, a second lens element 120, a third lens element 130, a fourth lens element 140, a fifth lens element 150, a sixth lens element 160, a filter 170 and an image surface 180. The imaging lens assembly includes six single and non-cemented lens elements (110, 120, 130, 140, 150 and 160) with no additional lens element disposed between each of the adjacent six lens elements, wherein there is an air gap between every adjacent lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has at least one inflection point.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has at least one inflection point.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. Each of the object-side surface 151 and the image-side surface 152 of the fifth lens element 150 has at least one inflection point. The image-side surface 152 of the fifth lens element 150 has at least one convex shape in an off-axis region thereof.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. Each of the object-side surface 161 and the image-side surface 162 of the sixth lens element 160 has at least one inflection point. The image-side surface 162 of the sixth lens element 160 has at least one convex shape in an off-axis region thereof.

The filter 170 is made of glass material and located between the sixth lens element 160 and the image surface 180, and will not affect the focal length of the imaging lens assembly. The image sensor 190 is disposed on or near the image surface 180 of the imaging lens assembly.

In this embodiment, among the six lens elements, each of three lens elements has an Abbe number smaller than 25.0. In detail, the Abbe numbers of the third lens element 130, the fourth lens element 140 and the sixth lens element 160 are all smaller than 25.0. Additionally, each of three lens elements has an Abbe number smaller than 22.0. In detail, the Abbe numbers of the third lens element 130, the fourth lens element 140 and the sixth lens element 160 are all smaller than 22.0. Furthermore, each of two lens elements has an Abbe number smaller than 20.0. In detail, the Abbe numbers of the third lens element 130 and the sixth lens element 160 are both smaller than 20.0.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens assembly of the image capturing unit according to the 1st embodiment, when a focal length of the imaging lens assembly is f, an f-number of the imaging lens assembly is Fno, and half of a maximum field of view of the imaging lens assembly is HFOV, these parameters have the following values: f=7.69 millimeters (mm), Fno=2.29, HFOV=20.0 degrees (deg.).

When the Abbe number of the third lens element 130 is V3, the Abbe number of the fourth lens element 140 is V4, and an Abbe number of the sixth lens element 160 is V6, the following conditions are satisfied: V3=19.5; V4=21.5; and V3+V4+V6=60.5.

When a maximum value among all refractive indices of the six lens elements of the imaging lens assembly is Nmax, the following condition is satisfied: Nmax=1.669. In this embodiment, the refractive indices of the third lens element 130 and the sixth lens element 160, which are both larger than the refractive indices of the first lens element 110, the second lens element 120, the fourth lens element 140 and the fifth lens element 150. Accordingly, the refractive index of the third lens element 130 or that of the sixth lens element 160 is Nmax.

When a central thickness of the fourth lens element 140 is CT4, and an axial distance between the third lens element 130 and the fourth lens element 140 is T34, the following condition is satisfied: CT4/T34=0.32. In this embodiment, an axial distance between two adjacent lens elements is an air gap in a paraxial region between the two adjacent lens elements.

When the axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following conditions are satisfied: T45/T34=0.25; and T56/T34=0.32.

When a central thickness of the first lens element 110 is CT1, the axial distance between the third lens element 130 and the fourth lens element 140 is T34, and the axial distance between the fourth lens element 140 and the fifth lens element 150 is T45, the following condition is satisfied: (CT1+T34)/T45=5.8.

When a maximum value among all axial distances between each of the six adjacent lens elements is ATmax, and a maximum value among all central thicknesses of the six lens elements is CTmax, the following condition is satisfied: ATmax/CTmax=2.24. In this embodiment, ATmax is equal to 1.706 mm, which is the axial distance between the third lens element 130 and the fourth lens element 140; CTmax is equal to 0.763 mm, which is the central thickness of the first lens element 110.

When the axial distance between the fourth lens element 140 and the fifth lens element 150 is T45, the central thickness of the fourth lens element 140 is CT4, and a central thickness of the fifth lens element 150 is CT5, the following condition is satisfied: T45/(CT4+CT5)=0.54.

When a central thickness of the first lens element 110 is CT1, an axial distance between the first lens element 110 and the second lens element 120 is T12, an axial distance between the second lens element 120 and the third lens element 130 is T23, the axial distance between the third lens element 130 and the fourth lens element 140 is T34, and the axial distance between the fourth lens element 140 and the fifth lens element 150 is T45, the following condition is satisfied: (CT1+T12)/(T23+T34+T45)=0.51.

When a curvature radius of the image-side surface 152 of the fifth lens element 150 is R10, and a curvature radius of the image-side surface 162 of the sixth lens element 160 is R12, the following condition is satisfied: R10/R12=0.76.

When a curvature radius of the object-side surface 111 of the first lens element 110 is R1, and the curvature radius of the image-side surface 162 of the sixth lens element 160 is R12, the following condition is satisfied: (R1−R12)/(R1+R12)=−0.34.

When the focal length of the imaging lens assembly is f, and the curvature radius of the object-side surface 111 of the first lens element 110 is R1, the following condition is satisfied: f/R1=3.45.

When the focal length of the imaging lens assembly is f, and a curvature radius of the object-side surface 151 of the fifth lens element 150 is R9, the following condition is satisfied: f/R9=−1.01.

When the focal length of the imaging lens assembly is f, and the curvature radius of the image-side surface 162 of the sixth lens element 160 is R12, the following condition is satisfied: f/R12=1.70.

When a focal length of the second lens element 120 is f2, and a focal length of the third lens element 130 is f3, the following condition is satisfied: f2/f3=−1.58.

When the focal length of the second lens element 120 is f2, and a focal length of the fifth lens element 150 is f5, the following condition is satisfied: f2/f5=−2.21.

When an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.87.

When an axial distance between the object-side surface 111 of the first lens element 110 and the image surface 180 is TL, and the focal length of the imaging lens assembly is f, the following condition is satisfied: TL/f=0.93.

When the focal length of the imaging lens assembly is f, and a maximum image height of the imaging lens assembly is ImgH, the following condition is satisfied: f/ImgH=2.66.

When the focal length of the imaging lens assembly is f, and an entrance pupil diameter of the imaging lens assembly is EPD, the following condition is satisfied: f/EPD=2.29.

When a maximum effective radius of the object-side surface 111 of the first lens element 110 is Y11, and a maximum effective radius of the image-side surface 162 of the sixth lens element 160 is Y62, the following condition is satisfied: Y62/Y11=1.40.

When a vertical distance between a non-axial critical point on the image-side surface 152 of the fifth lens element 150 and an optical axis is Yc52, and the focal length of the imaging lens assembly is f, the following condition is satisfied: Yc52/f=0.13.

When the focal length of the imaging lens assembly is f, a curvature radius of an object-side surface of one lens element of the six lens elements is Rf, and a curvature radius of an image-side surface of the lens element of the six lens elements is Rr, one lens element (the fourth lens element 140) in this embodiment satisfies the following condition: |f/Rf|+|f/Rr|<1.0. The values of |f/Rf|+|f/Rr| for the six lens elements (110, 120, 130, 140, 150 and 160) are respectively presented in the following paragraph.

When the focal length of the imaging lens assembly is f, the curvature radius of the object-side surface 111 of the first lens element 110 is R1, and a curvature radius of the image-side surface 112 of the first lens element 110 is R2, the following condition is satisfied: |f/R1|+|f/R2|=4.51. When a curvature radius of the object-side surface 121 of the second lens element 120 is R3, and a curvature radius of the image-side surface 122 of the second lens element 120 is R4, the following condition is satisfied: |f/R3|+|f/R4|=1.50. When a curvature radius of the object-side surface 131 of the third lens element 130 is R5, and a curvature radius of the image-side surface 132 of the third lens element 130 is R6, the following condition is satisfied: |f/R5|+|f/R6|=4.62. When a curvature radius of the object-side surface 141 of the fourth lens element 140 is R7, and a curvature radius of the image-side surface 142 of the fourth lens element 140 is R8, the following condition is satisfied: |f/R7|+|f/R8|=0.77. When the curvature radius of the object-side surface 151 of the fifth lens element 150 is R9, and the curvature radius of the image-side surface 152 of the fifth lens element 150 is R10, the following condition is satisfied: |f/R9|+|f/R10|=3.26. When a curvature radius of the object-side surface 161 of the sixth lens element 160 is R11, and the curvature radius of the image-side surface 162 of the sixth lens element 160 is R12, the following condition is satisfied: |f/R11|+|f/R12|=3.73.

The detailed optical data of the 1st embodiment are shown in Table 1 and the aspheric surface data are shown in Table 2 below.

TABLE 1

1st Embodiment
f = 7.69 mm, Fno = 2.29, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.774 | | | | |
| 2 | Lens 1 | 2.231 | (ASP) | 0.763 | Plastic | 1.544 | 55.9 | 5.63 |
| 3 | | 7.231 | (ASP) | 0.380 | | | | |
| 4 | Lens 2 | 14.285 | (ASP) | 0.581 | Plastic | 1.544 | 55.9 | 9.49 |
| 5 | | −7.967 | (ASP) | 0.100 | | | | |
| 6 | Lens 3 | 5.799 | (ASP) | 0.240 | Plastic | 1.669 | 19.5 | −6.01 |
| 7 | | 2.334 | (ASP) | 1.706 | | | | |
| 8 | Lens 4 | 17.407 | (ASP) | 0.545 | Plastic | 1.650 | 21.5 | 15.47 |
| 9 | | −23.567 | (ASP) | 0.426 | | | | |
| 10 | Lens 5 | −7.573 | (ASP) | 0.240 | Plastic | 1.544 | 55.9 | −4.30 |
| 11 | | 3.423 | (ASP) | 0.542 | | | | |
| 12 | Lens 6 | 3.791 | (ASP) | 0.581 | Plastic | 1.669 | 19.5 | 26.89 |
| 13 | | 4.508 | (ASP) | 0.350 | | | | |
| 14 | Filter | Plano | | 0.110 | Glass | 1.517 | 64.2 | — |
| 15 | | Plano | | 0.602 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k= | −1.1491E−01 | −8.9486E+00 | 5.7271E+01 | −2.0734E+01 | −9.0000E+01 | −8.6281E−01 |
| A4= | −2.4221E−03 | 1.3370E−03 | −4.4037E−03 | 1.5330E−02 | 2.8503E−02 | −3.1316E−02 |
| A6= | 9.7935E−04 | 7.8484E−03 | 1.7980E−02 | −9.4057E−03 | −4.8782E−02 | 2.3518E−02 |
| A8= | −4.3614E−05 | −7.3867E−04 | −8.1722E−02 | 1.9982E−03 | 4.3346E−02 | −9.0153E−04 |
| A10= | 2.7521E−05 | 5.1500E−04 | 2.3685E−03 | −1.0522E−03 | −2.0230E−02 | 3.0919E−03 |
| A12= | 6.8905E−05 | 4.8517E−06 | −4.9380E−04 | 2.6779E−04 | 5.7599E−03 | 1.4767E−05 |
| A14= | — | — | −8.2120E−06 | −4.4824E−05 | −7.8516E−04 | — |

| Surface # | 8 | 9 | 10 | 11 | 12 | 13 |
|---|---|---|---|---|---|---|
| k= | 9.0000E+01 | 8.9934E+01 | 9.4622E+00 | −2.6094E+00 | −4.3115E+00 | −9.9579E+00 |
| A4= | −5.4945E−03 | 3.7447E−02 | 7.8493E−02 | −2.0552E−02 | −1.9047E−01 | −2.0346E−01 |
| A6= | −4.2332E−02 | −9.6043E−02 | −2.8525E−01 | −1.1144E−01 | 1.9070E−01 | 1.5877E−01 |
| A8= | 3.0615E−02 | 5.6883E−02 | 2.0600E−01 | 9.4535E−02 | −1.1910E−01 | −7.5383E−02 |
| A10= | −1.3583E−02 | −1.4148E−02 | −5.4153E−02 | −3.6176E−02 | 4.1983E−02 | 2.0831E−02 |
| A12= | 2.0829E−03 | −7.0956E−04 | −1.1035E−03 | 7.5291E−03 | −8.3261E−03 | −3.2993E−03 |
| A14= | — | 7.7402E−04 | 2.7955E−03 | −8.3919E−04 | 8.4022E−04 | 2.6929E−04 |
| A16= | — | −7.6554E−05 | −3.3795E−04 | 3.9690E−05 | −3.2032E−05 | −8.3459E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
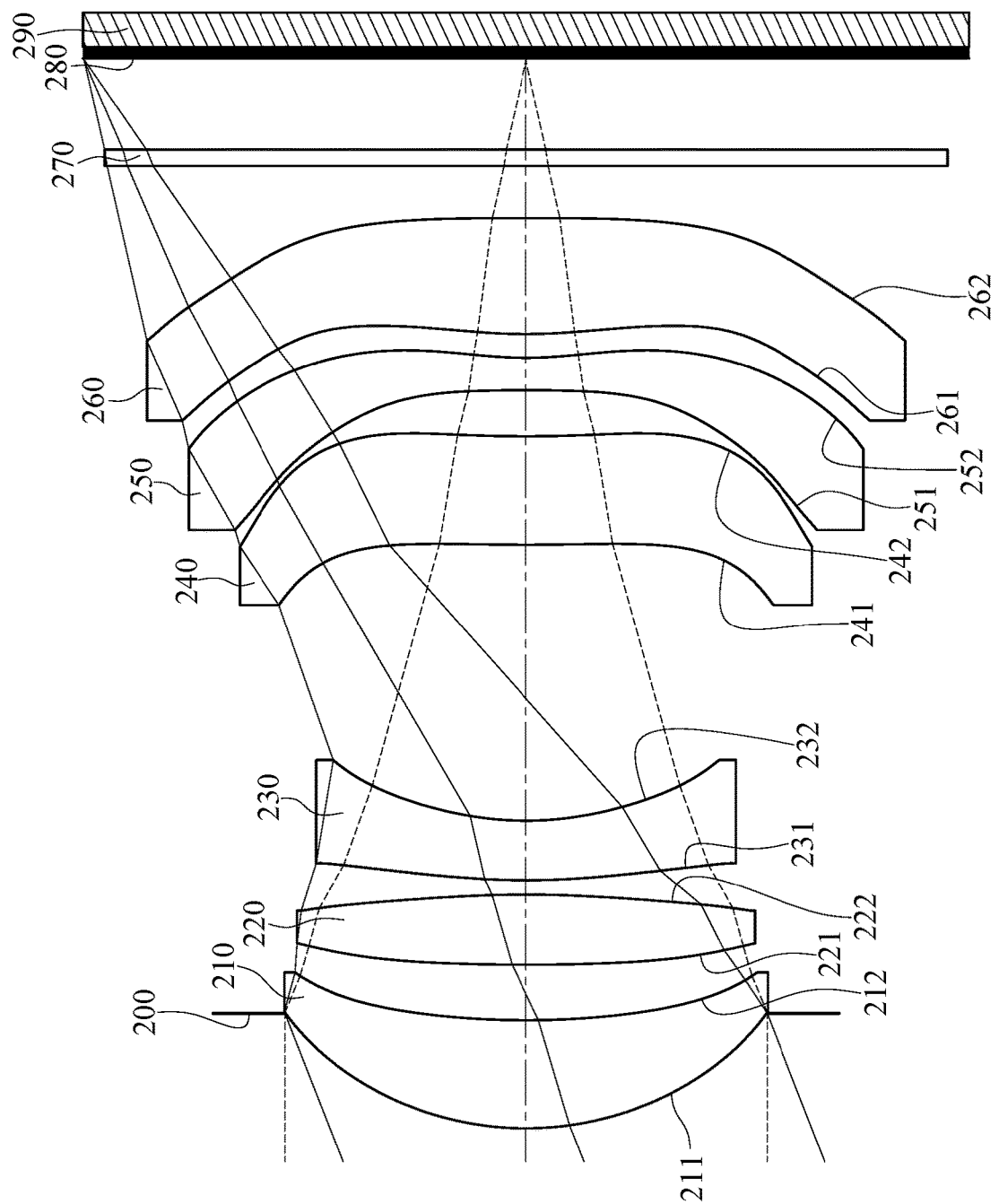
FIG. 3 is a schematic view of an image capturing unit according to the 2nd embodiment of the present disclosure.
Figure 4:
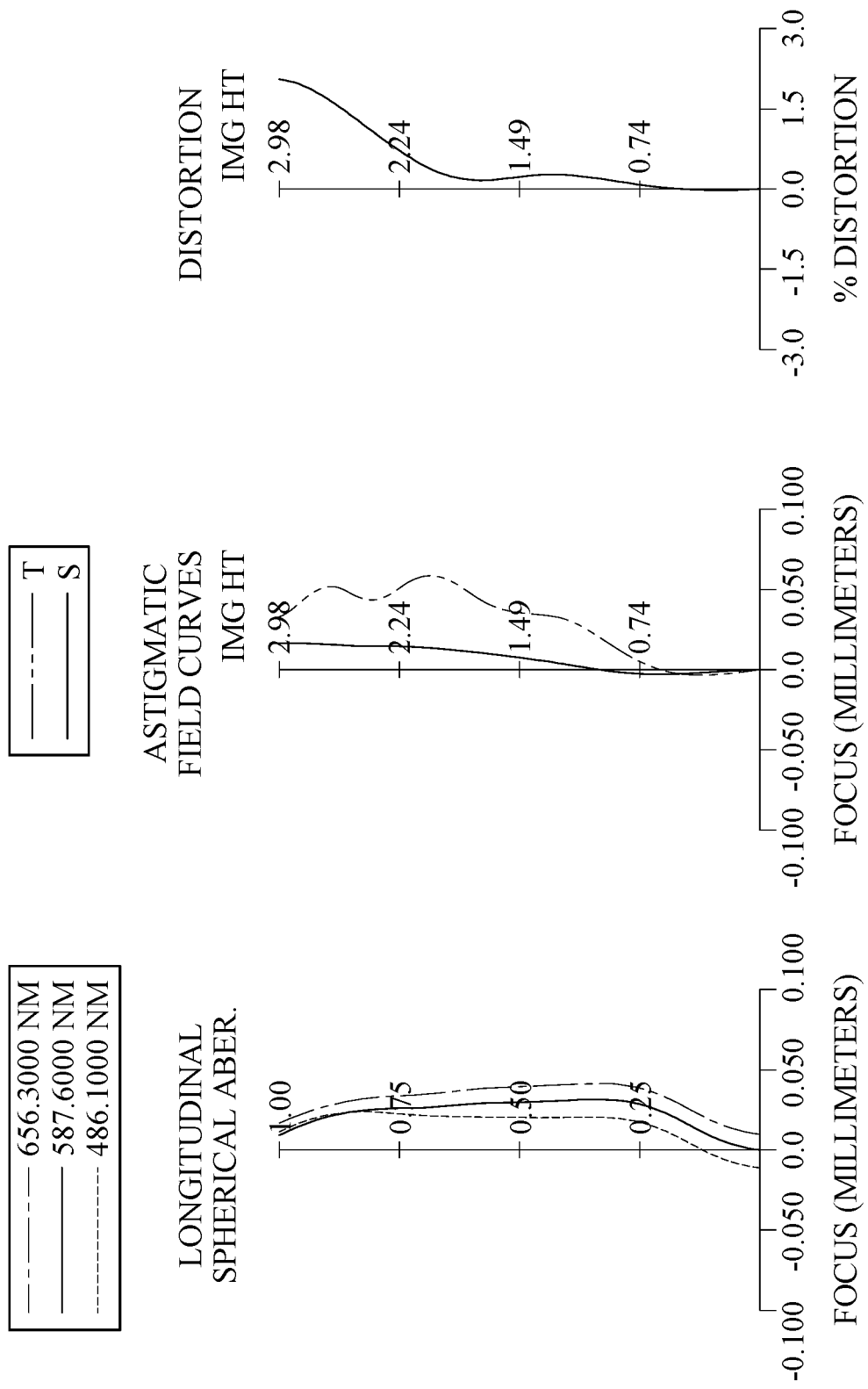
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens assembly (its reference numeral is omitted) of the present disclosure and an image sensor 290. The imaging lens assembly includes, in order from an object side to an image side, an aperture stop 200, a first lens element 210, a second lens element 220, a third lens element 230, a fourth lens element 240, a fifth lens element 250, a sixth lens element 260, a filter 270 and an image surface 280. The imaging lens assembly includes six single and non-cemented lens elements (210, 220, 230, 240, 250 and 260) with no additional lens element disposed between each of the adjacent six lens elements, wherein there is an air gap between every adjacent lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric. The object-side surface 221 of the second lens element 220 has at least one inflection point.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one inflection point.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. Each of the object-side surface 241 and the image-side surface 242 of the fourth lens element 240 has at least one inflection point. The image-side surface 242 of the fourth lens element 240 has at least one convex shape in an off-axis region thereof.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one inflection point. The image-side surface 252 of the fifth lens element 250 has at least one convex shape in an off-axis region thereof.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has at least one inflection point.

The filter 270 is made of glass material and located between the sixth lens element 260 and the image surface 280, and will not affect the focal length of the imaging lens assembly. The image sensor 290 is disposed on or near the image surface 280 of the imaging lens assembly.

In this embodiment, among the six lens elements, each of three lens elements has an Abbe number smaller than 25.0. In detail, the Abbe numbers of the third lens element 230, the fourth lens element 240 and the sixth lens element 260 are all smaller than 25.0. Additionally, each of two lens elements has an Abbe number smaller than 22.0. In detail, the Abbe numbers of the third lens element 230 and the sixth lens element 260 are both smaller than 22.0. Furthermore, each of two lens elements has an Abbe number smaller than 20.0. In detail, the Abbe numbers of the third lens element 230 and the sixth lens element 260 are both smaller than 20.0.

The detailed optical data of the 2nd embodiment are shown in Table 3 and the aspheric surface data are shown in Table 4 below.

TABLE 3

2nd Embodiment
f = 7.43 mm, Fno = 2.29, HFOV = 21.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.774 | | | | |
| 2 | Lens 1 | 2.120 | (ASP) | 0.728 | Plastic | 1.544 | 55.9 | 5.80 |
| 3 | | 5.688 | (ASP) | 0.372 | | | | |
| 4 | Lens 2 | 14.497 | (ASP) | 0.472 | Plastic | 1.544 | 55.9 | 9.44 |
| 5 | | −7.858 | (ASP) | 0.100 | | | | |
| 6 | Lens 3 | 5.070 | (ASP) | 0.401 | Plastic | 1.669 | 19.5 | −6.12 |
| 7 | | 2.193 | (ASP) | 1.857 | | | | |
| 8 | Lens 4 | 16.344 | (ASP) | 0.731 | Plastic | 1.639 | 23.5 | −32.92 |
| 9 | | 9.035 | (ASP) | 0.309 | | | | |
| 10 | Lens 5 | −16.229 | (ASP) | 0.220 | Plastic | 1.544 | 55.9 | −3.97 |
| 11 | | 2.505 | (ASP) | 0.160 | | | | |
| 12 | Lens 6 | 3.420 | (ASP) | 0.781 | Plastic | 1.669 | 19.5 | 4.94 |
| 13 | | −87.184 | (ASP) | 0.350 | | | | |
| 14 | Filter | Plano | | 0.110 | Glass | 1.517 | 64.2 | — |
| 15 | | Plano | | 0.616 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k= | −7.0564E−02 | −6.8110E+00 | 4.8477E+01 | −2.1010E+01 | −9.0000E+01 | −1.1730E+00 |
| A4= | −2.0553E−03 | 2.4609E−03 | −3.6753E−03 | 1.5830E−02 | 5.6476E−02 | −2.5498E−02 |
| A6= | 1.5306E−03 | 8.7108E−03 | 1.7108E−02 | −8.3920E−03 | −1.0298E−01 | 1.3918E−02 |
| A8= | 8.2250E−05 | −9.3784E−04 | −8.2831E−03 | 2.5236E−03 | 1.0206E−01 | 3.5532E−03 |
| A10= | −1.1900E−05 | 4.0470E−04 | 2.1802E−03 | −8.7586E−04 | −6.1202E−02 | 1.8913E−03 |
| A12= | 7.0417E−05 | −5.5779E−05 | −4.6561E−04 | 2.8334E−04 | 2.1328E−02 | −8.2129E−04 |
| A14= | — | — | 4.7249E−05 | −6.1466E−05 | −3.3648E−03 | — |

| Surface # | 8 | 9 | 10 | 11 | 12 | 13 |
|---|---|---|---|---|---|---|
| k= | 9.0000E+01 | −3.5787E+01 | 6.4205E+01 | −1.9837E+01 | −4.3115E+00 | −9.9579E+00 |
| A4= | −3.6690E−02 | −6.0971E−03 | −9.5719E−02 | −1.5565E−01 | −1.5012E−01 | −3.9968E−02 |
| A6= | −1.8283E−02 | −5.3878E−02 | 2.7141E−02 | 1.0287E−01 | 1.1666E−01 | 1.8029E−02 |
| A8= | 1.2511E−02 | 1.4766E−02 | −5.9179E−02 | −5.1997E−02 | −6.3328E−02 | −8.9128E−03 |
| A10= | −5.6473E−03 | 6.5814E−03 | 6.1682E−02 | 1.7757E−02 | 1.7361E−02 | 1.6477E−03 |
| A12= | 6.8904E−04 | −5.1108E−03 | −2.7302E−02 | −3.7951E−03 | −2.1978E−03 | 1.6165E−05 |
| A14= | — | 1.0641E−03 | 5.4856E−03 | 4.4959E−04 | 8.5373E−05 | −3.2806E−05 |
| A16= | — | −6.8372E−05 | −4.1261E−04 | −2.2406E−05 | 2.7683E−06 | 2.3864E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

2nd Embodiment

| | | | |
|---|---|---|---|
| f [mm] | 7.43 | f/R9 | −0.46 |
| Fno | 2.29 | f/R12 | −0.09 |
| HFOV [deg.] | 21.4 | f2/f3 | −1.54 |
| V3 | 19.5 | f2/f5 | −2.38 |
| V4 | 23.5 | SD/TD | 0.87 |
| V3 + V4 + V6 | 62.5 | TL/f | 0.97 |
| Nmax | 1.669 | f/ImgH | 2.49 |
| CT4/T34 | 0.39 | f/EPD | 2.29 |
| T45/T34 | 0.17 | Y62/Y11 | 1.57 |
| T56/T34 | 0.09 | Yc52/f | 0.11 |
| (CT1 + T34)/T45 | 8.4 | |f/R1| + |f/R2| | 4.81 |
| ATmax/CTmax | 2.38 | |f/R3| + |f/R4| | 1.46 |
| T45/(CT4 + CT5) | 0.32 | |f/R5| + |f/R6| | 4.85 |
| (CT1 + T12)/(T23 + T34 + T45) | 0.49 | |f/R7| + |f/R8| | 1.28 |
| R10/R12 | −0.03 | |f/R9| + |f/R10| | 3.42 |
| (R1 − R12)/(R1 + R12) | −1.05 | |f/R11| + |f/R12| | 2.26 |
| f/R1 | 3.50 | — | — |

3rd Embodiment

Figure 5:
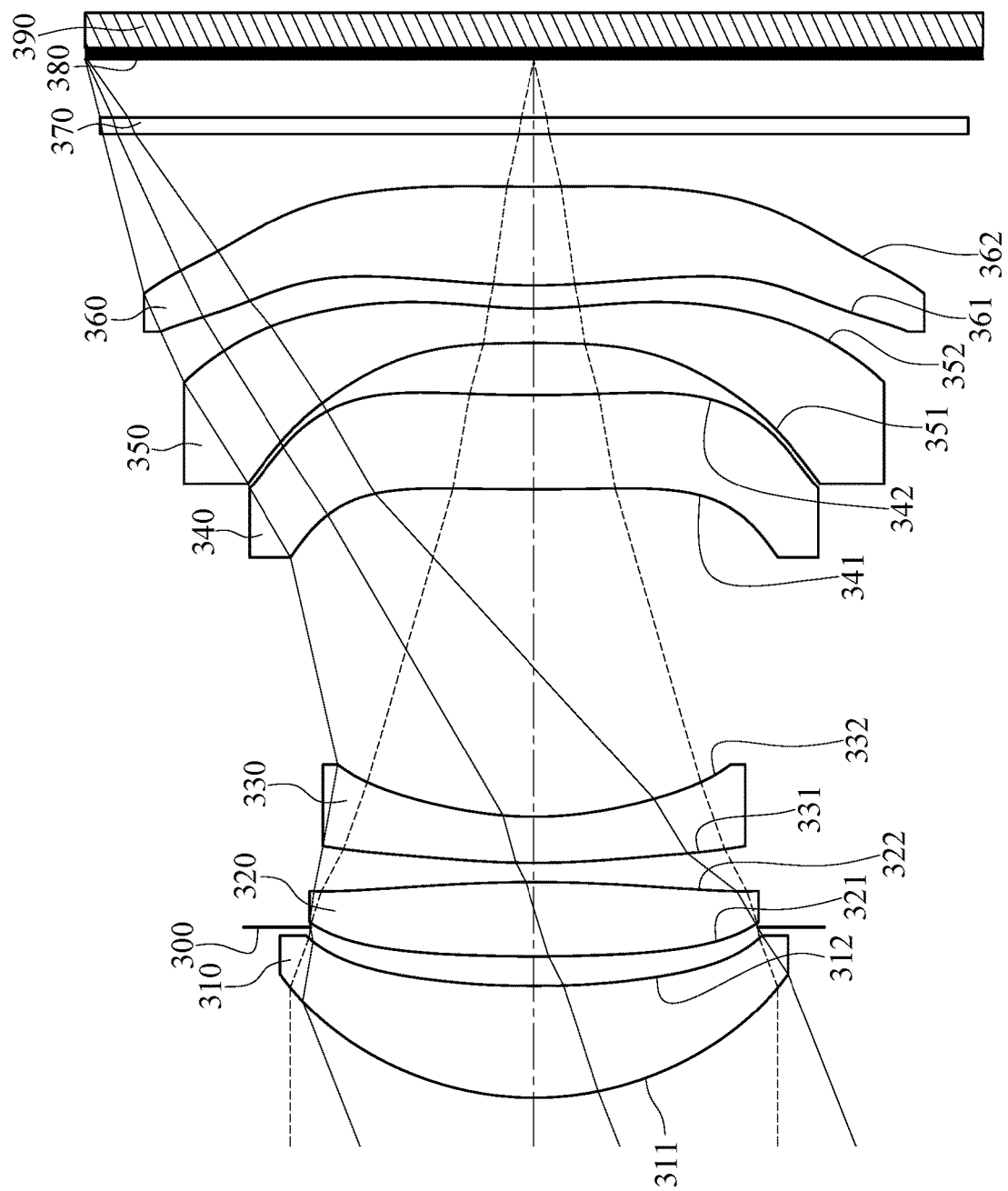
FIG. 5 is a schematic view of an image capturing unit according to the 3rd embodiment of the present disclosure.
Figure 6:
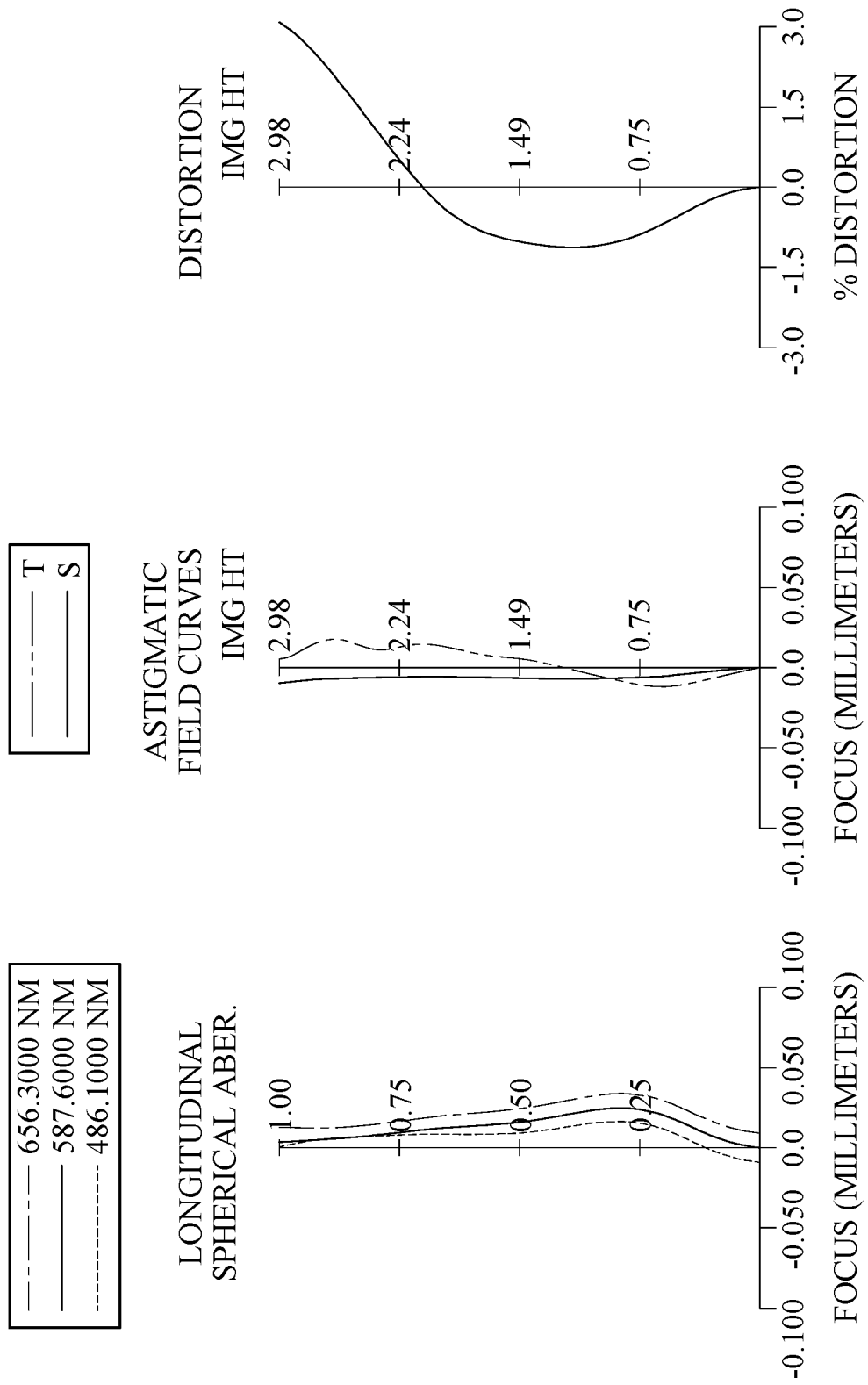
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens assembly (its reference numeral is omitted) of the present disclosure and an image sensor 390. The imaging lens assembly includes, in order from an object side to an image side, a first lens element 310, an aperture stop 300, a second lens element 320, a third lens element 330, a fourth lens element 340, a fifth lens element 350, a sixth lens element 360, a filter 370 and an image surface 380. The imaging lens assembly includes six single and non-cemented lens elements (310, 320, 330, 340, 350 and 360) with no additional lens element disposed between each of the adjacent six lens elements, wherein there is an air gap between every adjacent lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The image-side surface 322 of the second lens element 320 has at least one inflection point.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one inflection point.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. Each of the object-side surface 341 and the image-side surface 342 of the fourth lens element 340 has at least one inflection point. The image-side surface 342 of the fourth lens element 340 has at least one convex shape in an off-axis region thereof.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one inflection point. The image-side surface 352 of the fifth lens element 350 has at least one convex shape in an off-axis region thereof.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. Each of the object-side surface 361 and the image-side surface 362 of the sixth lens element 360 has at least one inflection point. The image-side surface 362 of the sixth lens element 360 has at least one convex shape in an off-axis region thereof.

The filter 370 is made of glass material and located between the sixth lens element 360 and the image surface 380, and will not affect the focal length of the imaging lens assembly. The image sensor 390 is disposed on or near the image surface 380 of the imaging lens assembly.

In this embodiment, among the six lens elements, each of three lens elements has an Abbe number smaller than 25.0. In detail, the Abbe numbers of the third lens element 330, the fourth lens element 340 and the sixth lens element 360 are all smaller than 25.0. Additionally, each of two lens elements has an Abbe number smaller than 22.0. In detail, the Abbe numbers of the third lens element 330 and the sixth lens element 360 are both smaller than 22.0. Furthermore, each of two lens elements has an Abbe number smaller than 20.0. In detail, the Abbe numbers of the third lens element 330 and the sixth lens element 360 are both smaller than 20.0.

The detailed optical data of the 3rd embodiment are shown in Table 5 and the aspheric surface data are shown in Table 6 below.

TABLE 5

3rd Embodiment
f = 7.29 mm, Fno = 2.25, HFOV = 21.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.164 | (ASP) | 0.746 | Plastic | 1.544 | 55.9 | 5.93 |
| 2 | | 5.789 | (ASP) | 0.389 | | | | |

TABLE 5-continued

3rd Embodiment
f = 7.29 mm, Fno = 2.25, HFOV = 21.6 deg.

| Surface # | | Curvature Radius | | Thickness | Material | Index | Abbe # | Focal Length |
|---|---|---|---|---|---|---|---|---|
| 3 | Ape. Stop | Plano | | −0.193 | | | | |
| 4 | Lens 2 | 11.991 | (ASP) | 0.493 | Plastic | 1.544 | 55.9 | 9.11 |
| 5 | | −8.316 | (ASP) | 0.128 | | | | |
| 6 | Lens 3 | 5.289 | (ASP) | 0.307 | Plastic | 1.669 | 19.5 | −6.86 |
| 7 | | 2.400 | (ASP) | 2.177 | | | | |
| 8 | Lens 4 | 15.842 | (ASP) | 0.631 | Plastic | 1.639 | 23.5 | −38.61 |
| 9 | | 9.495 | (ASP) | 0.346 | | | | |
| 10 | Lens 5 | −14.093 | (ASP) | 0.230 | Plastic | 1.544 | 55.9 | −4.49 |
| 11 | | 2.969 | (ASP) | 0.154 | | | | |
| 12 | Lens 6 | 4.422 | (ASP) | 0.658 | Plastic | 1.669 | 19.5 | 8.94 |
| 13 | | 15.972 | (ASP) | 0.350 | | | | |
| 14 | Filter | Plano | | 0.110 | Glass | 1.517 | 64.2 | — |
| 15 | | Plano | | 0.387 | | | | |
| 16 | Image | Plano | | — | | | | |

Note:
Reference wavelength is 587.6 nm (d-line).

TABLE 6

Aspheric Coefficients

| Surface # | 1 | 2 | 4 | 5 | 6 | 7 |
|---|---|---|---|---|---|---|
| k= | −8.6122E−02 | −9.3350E+00 | 5.1713E+01 | −2.0837E+01 | −9.0000E+01 | −1.8161E+00 |
| A4= | −1.5239E−03 | 2.6303E−03 | −1.5169E−03 | 1.6656E−02 | 2.2979E−02 | −4.5561E−02 |
| A6= | 4.9279E−04 | 1.0439E−02 | 1.6410E−02 | −7.0469E−03 | −6.7694E−02 | 2.5848E−02 |
| A8= | 1.1462E−04 | −1.0354E−03 | −7.8820E−03 | 2.8092E−03 | 7.8470E−02 | 5.4182E−03 |
| A10= | 4.0637E−05 | 2.1796E−04 | 2.6631E−03 | −8.9614E−03 | −4.7471E−02 | −5.3288E−03 |
| A12= | 3.5074E−05 | 2.1874E−04 | −2.9534E−04 | 3.6459E−04 | 1.5980E−02 | 1.8472E−03 |
| A14= | — | — | 2.5524E−05 | −4.0259E−05 | −2.3259E−03 | — |

| Surface # | 8 | 9 | 10 | 11 | 12 | 13 |
|---|---|---|---|---|---|---|
| k= | 9.0000E+01 | −1.7305E+01 | 5.0006E+01 | −2.7698E+01 | 9.3268E−01 | −9.9579E+00 |
| A4= | −2.6423E−02 | −2.4937E−02 | −1.9264E−01 | −1.2236E−01 | −1.0128E−01 | −9.3145E−02 |
| A6= | −4.3673E−02 | −2.4341E−02 | 1.3337E−01 | 6.8148E−02 | 7.2767E−02 | 6.2649E−02 |
| A8= | 2.9082E−02 | −4.5467E−03 | −9.5552E−02 | −2.7161E−02 | −4.2154E−02 | −2.9410E−02 |
| A10= | −1.3396E−02 | 1.2492E−02 | 5.5990E−02 | 7.9942E−03 | 1.2802E−02 | 7.2751E−03 |
| A12= | 2.0597E−03 | −6.1062E−03 | −1.9940E−02 | −1.6574E−03 | −2.0314E−03 | −9.1178E−04 |
| A14= | — | 1.1957E−03 | 3.6077E−03 | 2.0081E−04 | 1.6177E−04 | 5.3008E−05 |
| A16= | — | −7.7985E−05 | −2.5258E−04 | −1.0240E−05 | −5.1307E−06 | −1.0280E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 7.29 | f/R9 | −0.52 |
| Fno | 2.25 | f/R12 | 0.46 |
| HFOV [deg.] | 21.6 | f2/f3 | −1.33 |
| V3 | 19.5 | f2/f5 | −2.03 |
| V4 | 23.5 | SD/TD | 0.81 |
| V3 + V4 + V6 | 62.5 | TL/f | 0.95 |
| Nmax | 1.669 | f/ImgH | 2.45 |
| CT4/T34 | 0.29 | f/EPD | 2.25 |
| T45/T34 | 0.16 | Y62/Y11 | 1.54 |
| T56/T34 | 0.07 | Yc52/f | 0.11 |
| (CT1 + T34)/T45 | 8.4 | \|f/R1\| + \|f/R2\| | 4.63 |
| ATmax/CTmax | 2.92 | \|f/R3\| + \|f/R4\| | 1.49 |
| T45/(CT4 + CT5) | 0.40 | \|f/R5\| + \|f/R6\| | 4.42 |
| (CT1 + T12)/(T23 + T34 + T45) | 0.36 | \|f/R7\| + \|f/R8\| | 1.23 |
| R10/R12 | 0.19 | \|f/R9\| + \|f/R10\| | 2.97 |
| (R1 − R12)/(R1 + R12) | −0.76 | \|f/R11\| + \|f/R12\| | 2.11 |
| f/R1 | 3.37 | — | — |

4th Embodiment

Figure 7:
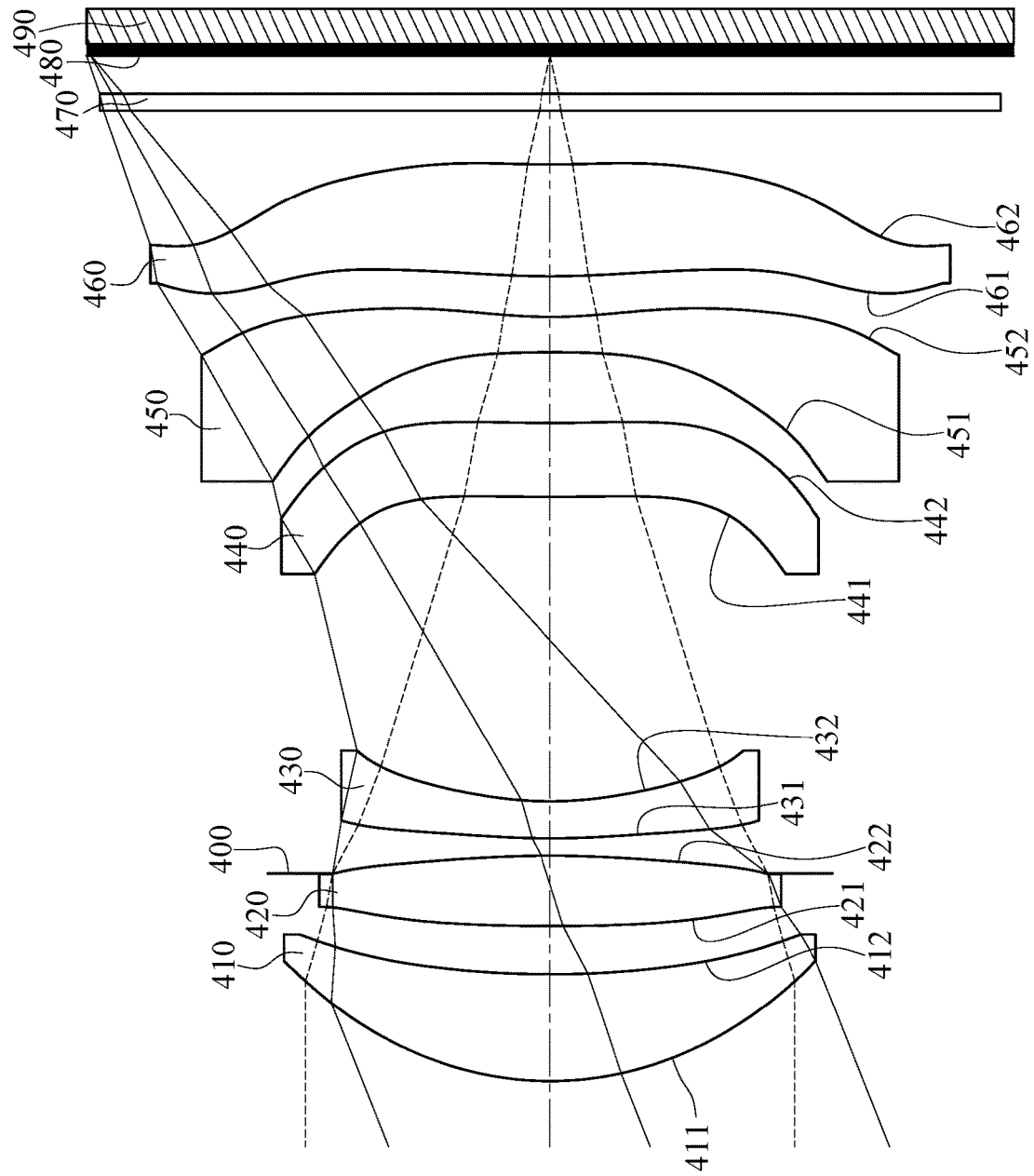
FIG. 7 is a schematic view of an image capturing unit according to the 4th embodiment of the present disclosure.
Figure 8:
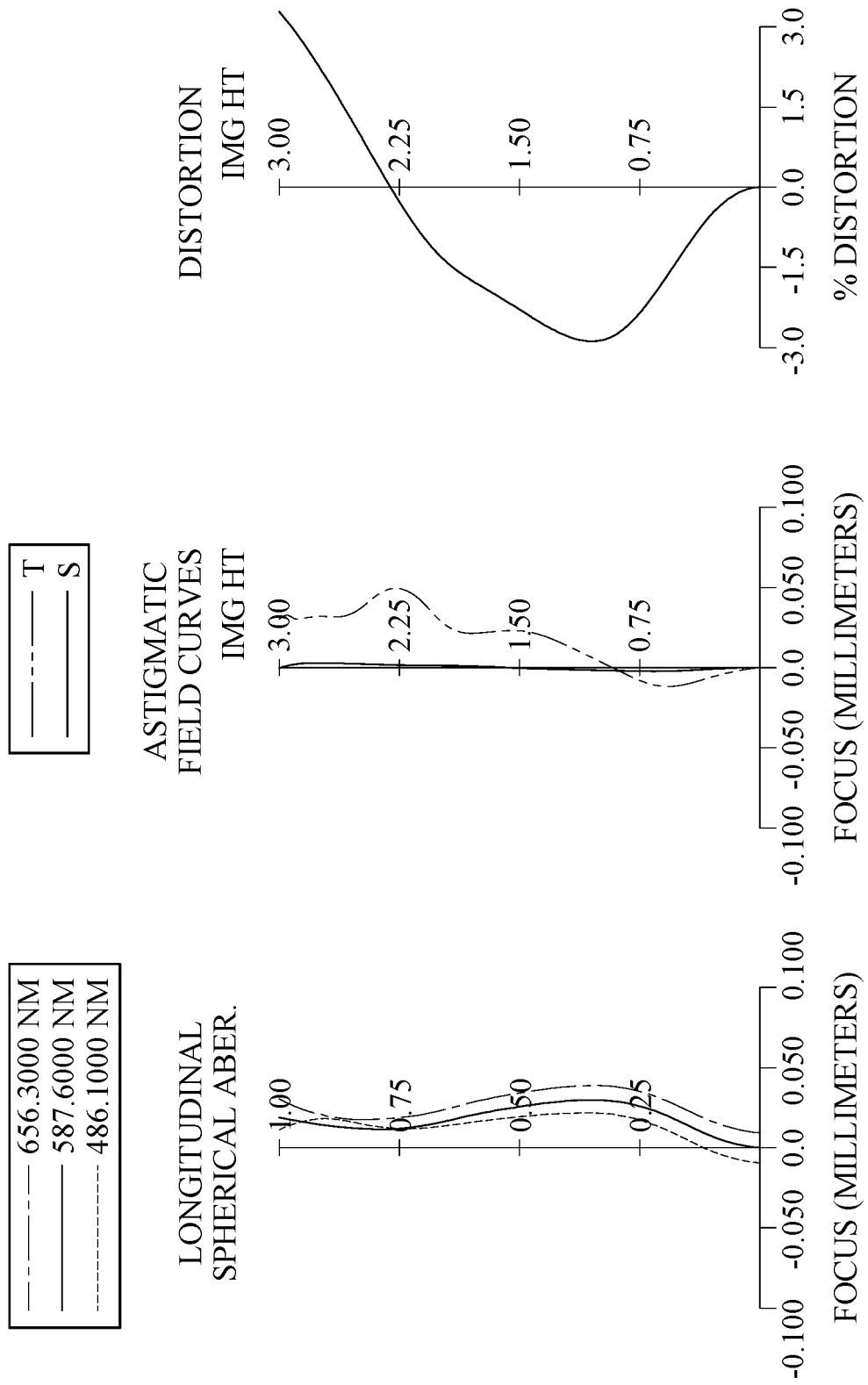
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens assembly (its reference numeral is omitted) of the present disclosure and an image sensor 490. The imaging lens assembly includes, in order from an object side to an image side, a first lens element 410, a second lens element 420, an aperture stop 400, a third lens element 430, a fourth lens element 440, a fifth lens element 450, a sixth lens element 460, a filter 470 and an image surface 480. The imaging lens assembly includes six single and non-cemented lens elements (410, 420, 430, 440, 450 and 460) with no additional lens element disposed between each of the adjacent six lens elements, wherein there is an air gap between every adjacent lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has at least one inflection point.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. Each of the object-side surface 441 and the image-side surface 442 of the fourth lens element 440 has at least one inflection point. The image-side surface 442 of the fourth lens element 440 has at least one convex shape in an off-axis region thereof.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one inflection point. The image-side surface 452 of the fifth lens element 450 has at least one convex shape in an off-axis region thereof.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. Each of the object-side surface 461 and the image-side surface 462 of the sixth lens element 460 has at least one inflection point. The image-side surface 462 of the sixth lens element 460 has at least one convex shape in an off-axis region thereof.

The filter 470 is made of glass material and located between the sixth lens element 460 and the image surface 480, and will not affect the focal length of the imaging lens assembly. The image sensor 490 is disposed on or near the image surface 480 of the imaging lens assembly.

In this embodiment, among the six lens elements, each of three lens elements has an Abbe number smaller than 25.0. In detail, the Abbe numbers of the third lens element 430, the fourth lens element 440 and the sixth lens element 460 are all smaller than 25.0. Additionally, each of two lens elements has an Abbe number smaller than 22.0. In detail, the Abbe numbers of the third lens element 430 and the sixth lens element 460 are both smaller than 22.0. Furthermore, each of two lens elements has an Abbe number smaller than 20.0. In detail, the Abbe numbers of the third lens element 430 and the sixth lens element 460 are both smaller than 20.0.

The detailed optical data of the 4th embodiment are shown in Table 7 and the aspheric surface data are shown in Table 8 below.

TABLE 7

4th Embodiment
f = 7.28 mm, Fno = 2.28, HFOV = 21.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.151 | (ASP) | 0.701 | Plastic | 1.544 | 55.9 | 5.73 |
| 2 | | 6.147 | (ASP) | 0.314 | | | | |
| 3 | Lens 2 | 12.507 | (ASP) | 0.460 | Plastic | 1.544 | 55.9 | 8.46 |
| 4 | | −7.186 | (ASP) | −0.116 | | | | |
| 5 | Ape. Stop | Plano | | 0.228 | | | | |
| 6 | Lens 3 | 5.314 | (ASP) | 0.243 | Plastic | 1.669 | 19.5 | −6.81 |
| 7 | | 2.408 | (ASP) | 1.989 | | | | |
| 8 | Lens 4 | 15.375 | (ASP) | 0.487 | Plastic | 1.634 | 23.8 | −77.18 |
| 9 | | 11.555 | (ASP) | 0.461 | | | | |
| 10 | Lens 5 | −10.045 | (ASP) | 0.230 | Plastic | 1.544 | 55.9 | −4.42 |
| 11 | | 3.189 | (ASP) | 0.266 | | | | |
| 12 | Lens 6 | 5.272 | (ASP) | 0.734 | Plastic | 1.669 | 19.5 | 26.53 |
| 13 | | 7.083 | (ASP) | 0.350 | | | | |
| 14 | Filter | Plano | | 0.110 | Glass | 1.517 | 64.2 | — |
| 15 | | Plano | | 0.248 | | | | |
| 16 | Image | Plano | | — | | | | |

Note:
Reference wavelength is 587.6 nm (d-line).

TABLE 8

Aspheric Coefficients

| Surface # | 1 | 2 | 3 | 4 | 6 | 7 |
|---|---|---|---|---|---|---|
| k= | −1.7189E−01 | −1.4522E+01 | 4.2331E+01 | −1.6190E+01 | −9.0000E+01 | −1.9892E+00 |
| A4= | −3.9649E−03 | −1.3616E−04 | 2.3870E−04 | 1.6275E−02 | 1.2971E−03 | −6.6618E−02 |
| A6= | 5.0297E−04 | 8.3312E−03 | 1.6242E−02 | −7.0980E−03 | −5.5430E−02 | 3.9864E−02 |
| A8= | −4.1386E−05 | −1.5784E−03 | −8.6983E−03 | 2.2607E−03 | 9.1328E−02 | 1.9112E−02 |
| A10= | −1.0982E−04 | −1.7490E−05 | 2.2268E−03 | −1.3986E−03 | −6.3676E−02 | −2.1009E−02 |
| A12= | 7.8388E−06 | 7.8784E−06 | −4.5114E−04 | 8.8067E−05 | 2.2924E−02 | 7.3452E−03 |
| A14= | — | — | −6.6587E−05 | −7.0000E−06 | −3.2797E−03 | — |

| Surface # | 8 | 9 | 10 | 11 | 12 | 13 |
|---|---|---|---|---|---|---|
| k= | 9.0000E+01 | −9.0000E+01 | 2.6224E+01 | −1.0085E+01 | 2.1165E+00 | −1.4961E+01 |
| A4= | −6.3586E−02 | −7.1644E−02 | −1.5979E−01 | −1.1501E−01 | −1.0922E−01 | −1.8741E−01 |
| A6= | −2.6417E−02 | 2.7155E−02 | 5.4826E−02 | 4.7571E−02 | 9.1260E−02 | 1.3711E−01 |
| A8= | 1.1011E−02 | −5.4729E−02 | 9.9666E−03 | −6.4750E−03 | −5.0998E−02 | −5.6956E−02 |
| A10= | −8.1911E−03 | 3.8779E−02 | −2.4199E−02 | −1.8150E−03 | 1.5153E−02 | 1.2836E−02 |
| A12= | 1.9738E−03 | −1.3038E−02 | 1.4957E−02 | 8.4730E−04 | −2.4171E−03 | −1.5618E−03 |
| A14= | — | 2.0304E−03 | −4.3325E−03 | −1.3256E−04 | 1.9905E−04 | 9.7623E−05 |
| A16= | — | −1.0724E−04 | 4.6926E−04 | 7.8561E−06 | −6.7076E−06 | −2.4935E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 7.28 | f/R9 | −0.73 |
| Fno | 2.28 | f/R12 | 1.03 |
| HFOV [deg.] | 21.6 | f2/f3 | −1.24 |
| V3 | 19.5 | f2/f5 | −1.91 |
| V4 | 23.8 | SD/TD | 0.77 |
| V3 + V4 + V6 | 62.8 | TL/f | 0.92 |
| Nmax | 1.669 | f/ImgH | 2.43 |
| CT4/T34 | 0.24 | f/EPD | 2.28 |
| T45/T34 | 0.23 | Y62/Y11 | 1.50 |
| T56/T34 | 0.13 | Yc52/f | 0.13 |
| (CT1 + T34)/T45 | 5.8 | |f/R1| + |f/R2| | 4.57 |
| ATmax/CTmax | 2.71 | |f/R3| + |f/R4| | 1.60 |
| T45/(CT4 + CT5) | 0.64 | |f/R5| + |f/R6| | 4.40 |
| (CT1 + T12)/(T23 + T34 + T45) | 0.40 | |f/R7| + |f/R8| | 1.10 |
| R10/R12 | 0.45 | |f/R9| + |f/R10| | 3.01 |
| (R1 − R12)/(R1 + R12) | −0.53 | |f/R11| + |f/R12| | 2.41 |
| f/R1 | 3.39 | — | — |

5th Embodiment

Figure 9:
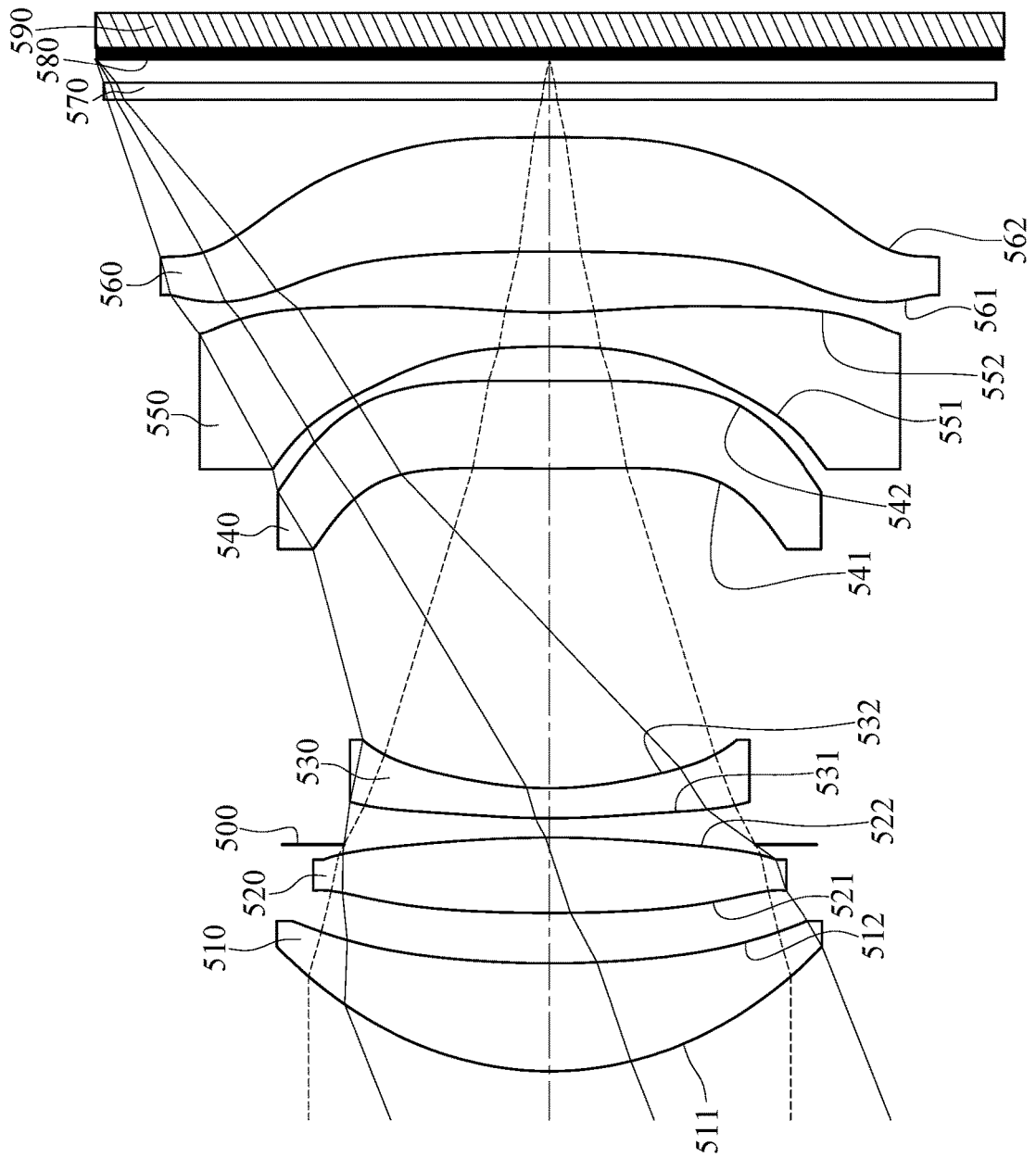
FIG. 9 is a schematic view of an image capturing unit according to the 5th embodiment of the present disclosure.
Figure 10:
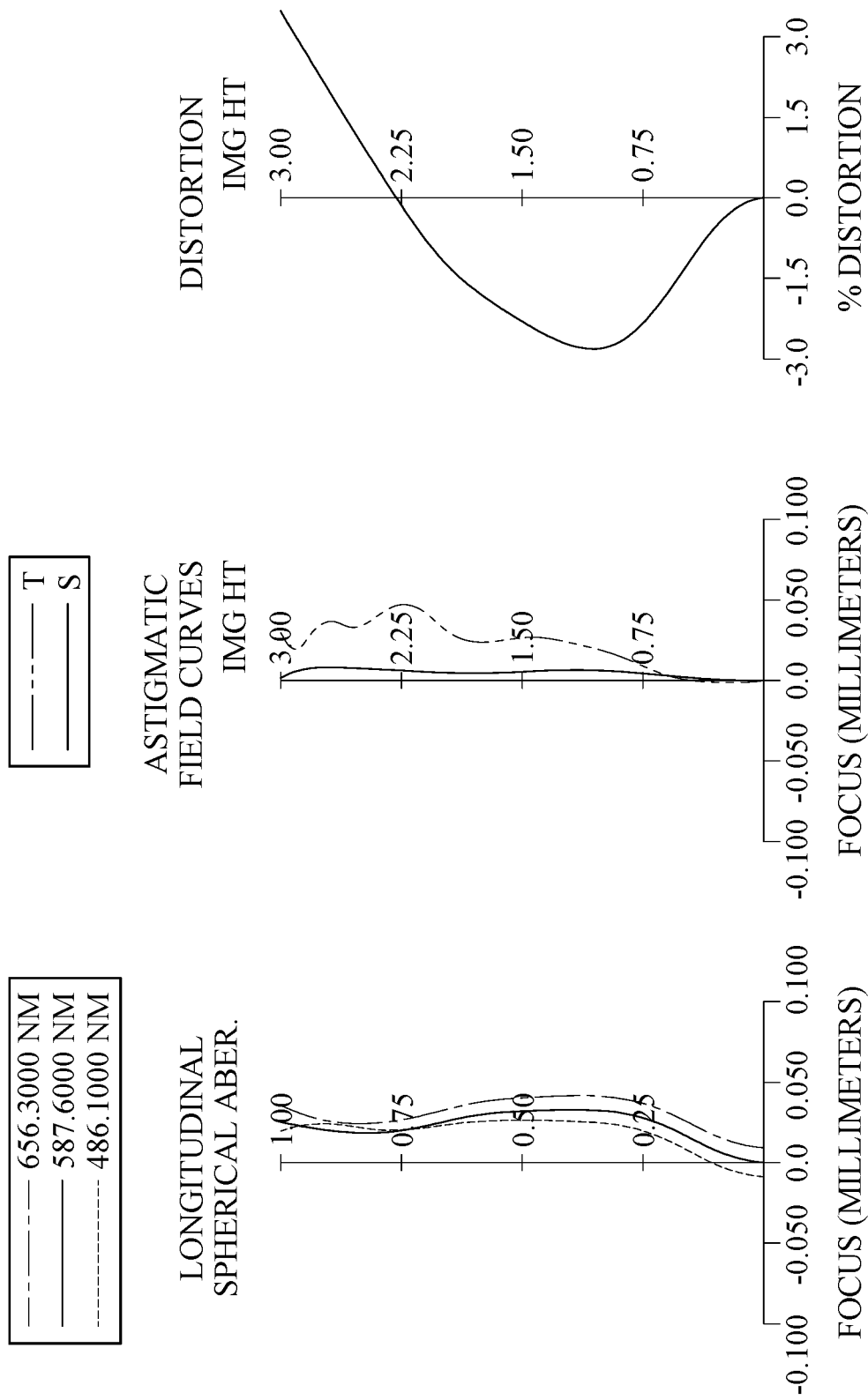
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens assembly (its reference numeral is omitted) of the present disclosure and an image sensor 590. The imaging lens assembly includes, in order from an object side to an image side, a first lens element 510, a second lens element 520, an aperture stop 500, a third lens element 530, a fourth lens element 540, a fifth lens element 550, a sixth lens element 560, a filter 570 and an image surface 580. The imaging lens assembly includes six single and non-cemented lens elements (510, 520, 530, 540, 550 and 560) with no additional lens element disposed between each of the adjacent six lens elements, wherein there is an air gap between every adjacent lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has at least one inflection point.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has at least one inflection point.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Each of the object-side surface 541 and the image-side surface 542 of the fourth lens element 540 has at least one inflection point. The image-side surface 542 of the fourth lens element 540 has at least one convex shape in an off-axis region thereof.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one inflection point. The image-side surface 552 of the fifth lens element 550 has at least one convex shape in an off-axis region thereof.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric. Each of the object-side surface 561 and the image-side surface 562 of the sixth lens element 560 has at least one inflection point. The image-side surface 562 of the sixth lens element 560 has at least one convex shape in an off-axis region thereof.

The filter 570 is made of glass material and located between the sixth lens element 560 and the image surface 580, and will not affect the focal length of the imaging lens assembly. The image sensor 590 is disposed on or near the image surface 580 of the imaging lens assembly.

In this embodiment, among the six lens elements, each of three lens elements has an Abbe number smaller than 25.0. In detail, the Abbe numbers of the third lens element 530, the fourth lens element 540 and the sixth lens element 560 are all smaller than 25.0. Additionally, each of two lens elements has an Abbe number smaller than 22.0. In detail, the Abbe numbers of the third lens element 530 and the sixth lens element 560 are both smaller than 22.0. Furthermore, each of two lens elements has an Abbe number smaller than 20.0. In detail, the Abbe numbers of the third lens element 530 and the sixth lens element 560 are both smaller than 20.0.

In this embodiment, each of two lens elements (the fourth lens element 540 and the sixth lens element 560) satisfies the following condition: $|f/Rf|+|f/Rr|<1.0$. In detail, a focal length of the imaging lens assembly is f, a curvature radius of the object-side surface 541 of the fourth lens element 540 is R7, a curvature radius of the image-side surface 542 of the fourth lens element 540 is R8, and $|f/R7|+|f/R8|=0.80$; a curvature radius of the object-side surface 561 of the sixth lens element 560 is R11, a curvature radius of the image-side surface 562 of the sixth lens element 560 is R12, and $|f/R11|+|f/R12|=0.37$.

The detailed optical data of the 5th embodiment are shown in Table 9 and the aspheric surface data are shown in Table 10 below.

TABLE 9

5th Embodiment
f = 7.27 mm, Fno = 2.28, HFOV = 21.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.192 | (ASP) | 0.713 | Plastic | 1.544 | 55.9 | 5.75 |
| 2 | | 6.487 | (ASP) | 0.334 | | | | |
| 3 | Lens 2 | 11.589 | (ASP) | 0.502 | Plastic | 1.544 | 55.9 | 8.12 |
| 4 | | −7.018 | (ASP) | −0.047 | | | | |
| 5 | Ape. Stop | Plano | | 0.175 | | | | |
| 6 | Lens 3 | 5.075 | (ASP) | 0.199 | Plastic | 1.669 | 19.5 | −6.75 |
| 7 | | 2.352 | (ASP) | 2.117 | | | | |
| 8 | Lens 4 | 15.797 | (ASP) | 0.580 | Plastic | 1.634 | 23.8 | 94.16 |
| 9 | | 21.175 | (ASP) | 0.227 | | | | |
| 10 | Lens 5 | −7.244 | (ASP) | 0.230 | Plastic | 1.544 | 55.9 | −5.07 |
| 11 | | 4.496 | (ASP) | 0.402 | | | | |
| 12 | Lens 6 | −31.102 | (ASP) | 0.755 | Plastic | 1.669 | 19.5 | −29.15 |
| 13 | | 52.768 | (ASP) | 0.250 | | | | |
| 14 | Filter | Plano | | 0.110 | Glass | 1.517 | 64.2 | — |
| 15 | | Plano | | 0.159 | | | | |
| 16 | Image | Plano | | — | | | | |

Note:
Reference wavelength is 587.6 nm (d-line).

TABLE 10

Aspheric Coefficients

| Surface # | 1 | 2 | 3 | 4 | 6 | 7 |
|---|---|---|---|---|---|---|
| k= | −1.9157E−01 | −1.5476E+01 | 4.3537E+01 | −1.5499E+01 | −8.9967E+01 | −2.1360E+00 |
| A4= | −4.4023E−03 | −2.8399E−04 | 1.5146E−03 | 1.6284E−02 | −5.2917E−03 | −7.9793E−02 |
| A6= | 2.1976E−04 | 8.3435E−03 | 1.6637E−02 | −7.0264E−03 | −5.9593E−02 | 5.5429E−02 |
| A8= | −1.5075E−05 | −1.5209E−03 | −8.7070E−03 | 2.2796E−03 | 1.1185E−01 | 1.4095E−02 |
| A10= | −8.5347E−05 | 3.0961E−05 | 2.2135E−03 | −1.3750E−03 | −8.3279E−02 | −2.0701E−02 |
| A12= | 7.9200E−06 | −6.6665E−06 | −4.9625E−04 | 7.4272E−05 | 3.1658E−02 | 7.8115E−03 |
| A14= | — | — | −5.3163E−05 | 7.5927E−06 | −4.7834E−03 | — |

| Surface # | 8 | 9 | 10 | 11 | 12 | 13 |
|---|---|---|---|---|---|---|
| k= | 8.8490E+01 | −9.0000E+01 | 1.2792E+01 | −2.6367E+00 | −9.0000E+01 | −2.3691E+01 |
| A4= | −7.5083E−02 | −1.3382E−01 | −2.1521E−01 | −1.0643E−01 | −4.3339E−02 | −1.8035E−01 |
| A6= | 1.5832E−02 | 1.0865E−01 | 1.1792E−01 | 3.9944E−02 | 4.7249E−02 | 1.2903E−01 |
| A8= | −2.2595E−02 | −9.1334E−02 | 2.1455E−02 | 2.3274E−03 | −3.8120E−02 | −5.5888E−02 |
| A10= | 1.7450E−03 | 4.2044E−02 | −5.5322E−02 | −6.7790E−03 | 1.4549E−02 | 1.3633E−02 |
| A12= | 1.0550E−03 | −1.1077E−02 | 2.7684E−02 | 2.1939E−03 | −2.7916E−03 | −1.8620E−03 |
| A14= | — | 1.5425E−03 | −6.3050E−03 | −3.0673E−04 | 2.6774E−04 | 1.3721E−04 |
| A16= | — | −8.3068E−05 | 5.5987E−04 | 1.6446E−05 | −1.0296E−05 | −4.3692E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 7.27 | f/R9 | −1.00 |
| Fno | 2.28 | f/R12 | 0.14 |
| HFOV [deg.] | 21.6 | f2/f3 | −1.20 |
| V3 | 19.5 | f2/f5 | −1.60 |
| V4 | 23.8 | SD/TD | 0.76 |
| V3 + V4 + V6 | 62.8 | TL/f | 0.92 |
| Nmax | 1.669 | f/ImgH | 2.42 |
| CT4/T34 | 0.27 | f/EPD | 2.28 |
| T45/T34 | 0.11 | Y62/Y11 | 1.43 |
| T56/T34 | 0.19 | Yc52/f | 0.14 |
| (CT1 + T34)/T45 | 12.5 | \|f/R1\| + \|f/R2\| | 4.43 |
| ATmax/CTmax | 2.80 | \|f/R3\| + \|f/R4\| | 1.66 |
| T45/(CT4 + CT5) | 0.28 | \|f/R5\| + \|f/R6\| | 4.52 |
| (CT1 + T12)/(T23 + T34 + T45) | 0.42 | \|f/R7\| + \|f/R8\| | 0.80 |
| R10/R12 | 0.09 | \|f/R9\| + \|f/R10\| | 2.62 |
| (R1 − R12)/(R1 + R12) | −0.92 | \|f/R11\| + \|f/R12\| | 0.37 |
| f/R1 | 3.31 | — | — |

6th Embodiment

Figure 11:
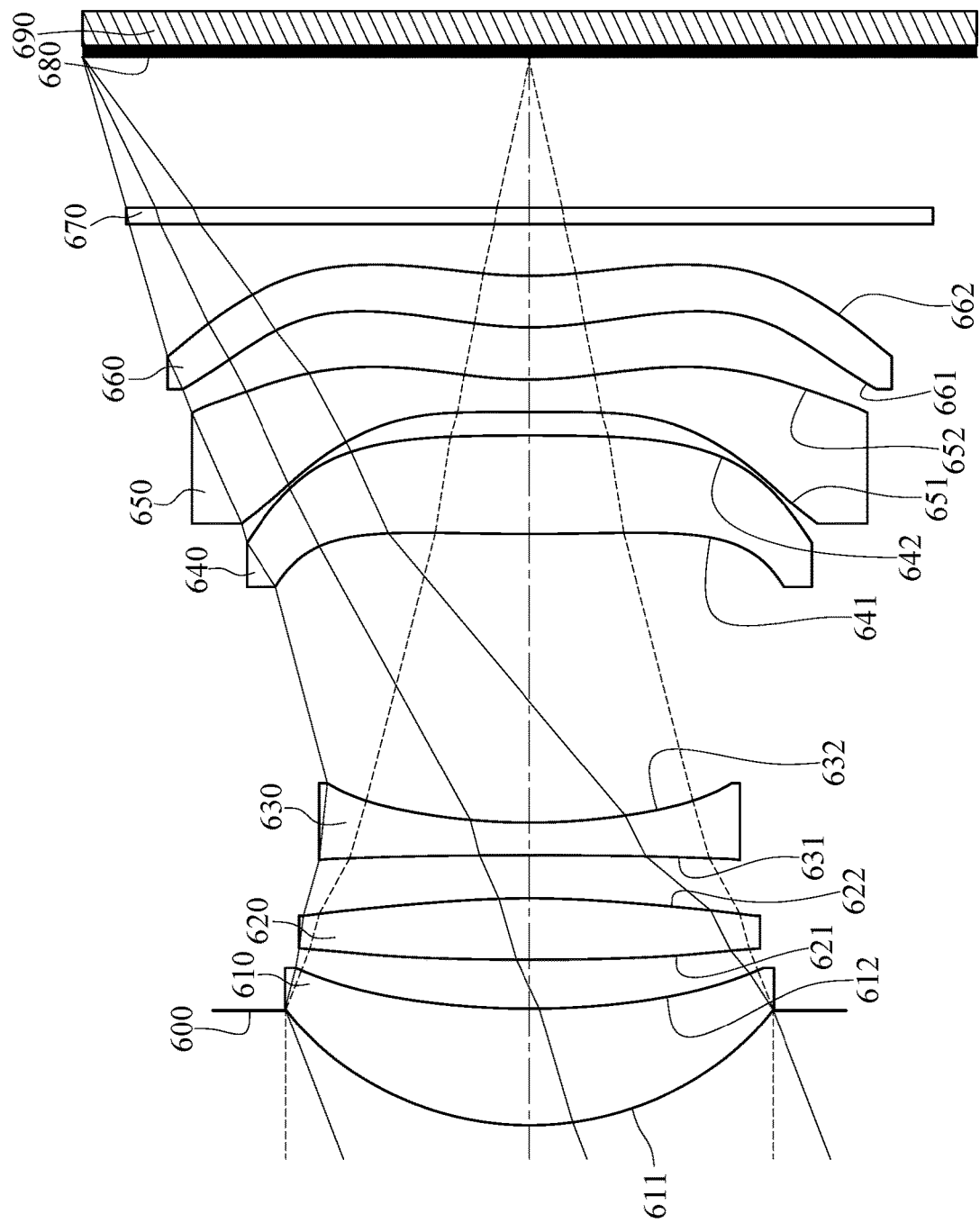
FIG. 11 is a schematic view of an image capturing unit according to the 6th embodiment of the present disclosure.
Figure 12:
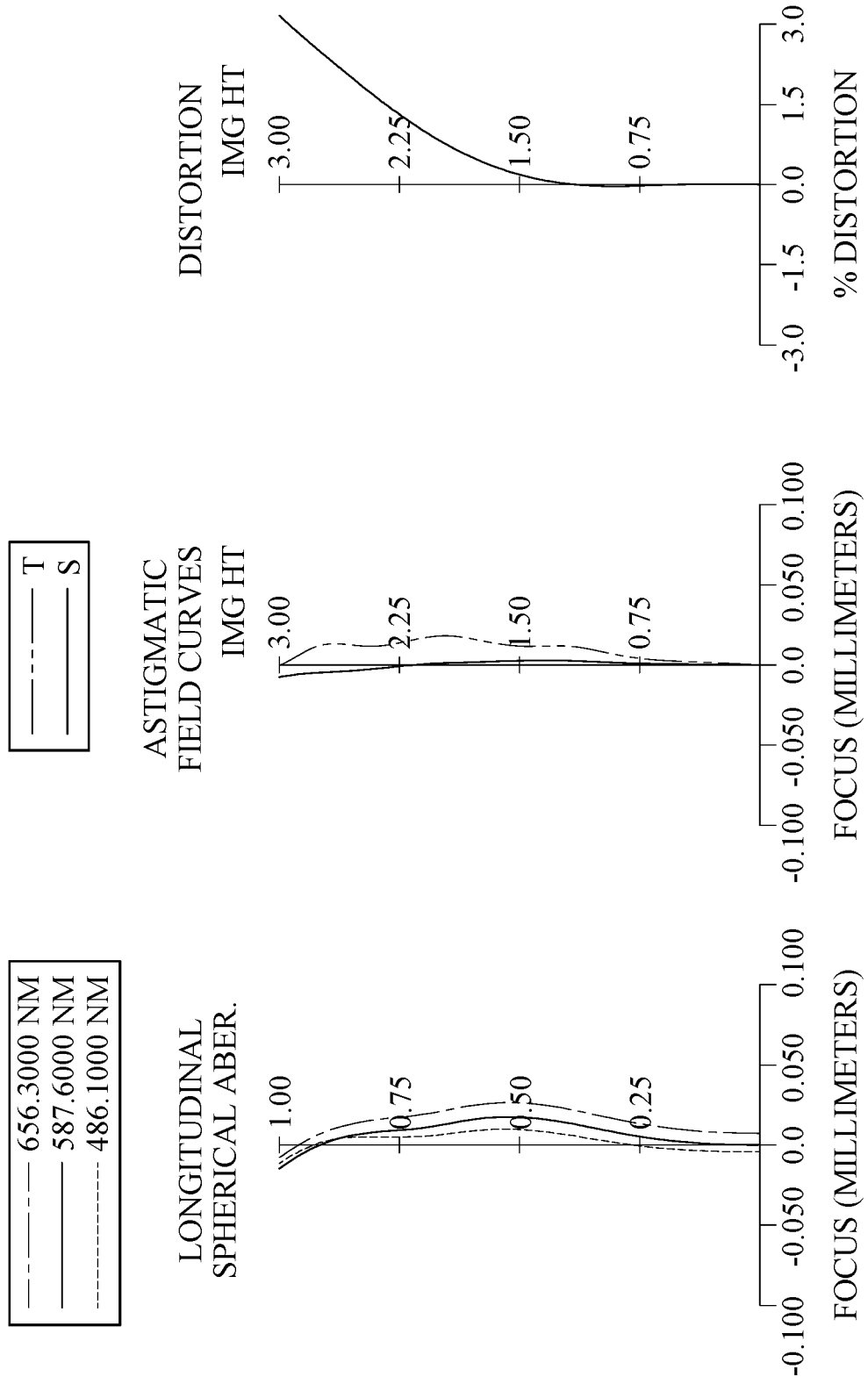
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens assembly (its reference numeral is omitted) of the present disclosure and an image sensor 690. The imaging lens assembly includes, in order from an object side to an image side, an aperture stop 600, a first lens element 610, a second lens element 620, a third lens element 630, a fourth lens element 640, a fifth lens element 650, a sixth lens element 660, a filter 670 and an image surface 680. The imaging lens assembly includes six single and non-cemented lens elements (610, 620, 630, 640, 650 and 660) with no additional lens element disposed between each of the adjacent six lens elements, wherein there is an air gap between every adjacent lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric. Each of the object-side surface 621 and the image-side surface 622 of the second lens element 620 has at least one inflection point.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one inflection point.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. Each of the object-side surface 651 and the image-side surface 652 of the fifth lens element 650 has at least one inflection point. The image-side surface 652 of the fifth lens element 650 has at least one convex shape in an off-axis region thereof.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. Each of the object-side surface 661 and the image-side surface 662 of the sixth lens element 660 has at least one convex shape in an off-axis region thereof. The image-side surface 662 of the sixth lens element 660 has at least one convex shape in an off-axis region thereof.

The filter 670 is made of glass material and located between the sixth lens element 660 and the image surface 680, and will not affect the focal length of the imaging lens assembly. The image sensor 690 is disposed on or near the image surface 680 of the imaging lens assembly.

In this embodiment, among the six lens elements, each of three lens elements has an Abbe number smaller than 25.0. In detail, the Abbe numbers of the third lens element 630, the fourth lens element 640 and the sixth lens element 660 are all smaller than 25.0. Additionally, each of three lens elements has an Abbe number smaller than 22.0. In detail, the Abbe numbers of the third lens element 630, the fourth lens element 640 and the sixth lens element 660 are all smaller than 22.0. Furthermore, each of two lens elements has an Abbe number smaller than 20.0. In detail, the Abbe numbers of the third lens element 630 and the sixth lens element 660 are both smaller than 20.0.

In this embodiment, one lens element (the fourth lens element 640) satisfies the following condition: |f/Rf|+|f/Rr|<1.0. In detail, a focal length of the imaging lens assembly is f, a curvature radius of the object-side surface 641 of the fourth lens element 640 is R7, a curvature radius of the image-side surface 642 of the fourth lens element 640 is R8, and |f/R7|+|f/R8|=0.73.

The detailed optical data of the 6th embodiment are shown in Table 11 and the aspheric surface data are shown in Table 12 below.

TABLE 11

6th Embodiment
f = 7.49 mm, Fno = 2.29, HFOV = 21.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.774 | | | | |
| 2 | Lens 1 | 2.137 | (ASP) | 0.786 | Plastic | 1.544 | 55.9 | 5.95 |
| 3 | | 5.489 | (ASP) | 0.327 | | | | |
| 4 | Lens 2 | 18.877 | (ASP) | 0.414 | Plastic | 1.544 | 55.9 | 8.70 |
| 5 | | −6.265 | (ASP) | 0.288 | | | | |
| 6 | Lens 3 | −31.104 | (ASP) | 0.220 | Plastic | 1.669 | 19.5 | −5.73 |
| 7 | | 4.384 | (ASP) | 1.940 | | | | |
| 8 | Lens 4 | 16.578 | (ASP) | 0.665 | Plastic | 1.650 | 21.5 | 15.87 |
| 9 | | −26.935 | (ASP) | 0.156 | | | | |
| 10 | Lens 5 | 49.744 | (ASP) | 0.220 | Plastic | 1.534 | 55.9 | −5.14 |
| 11 | | 2.596 | (ASP) | 0.350 | | | | |
| 12 | Lens 6 | 2.303 | (ASP) | 0.346 | Plastic | 1.669 | 19.5 | 16.07 |
| 13 | | 2.755 | (ASP) | 0.350 | | | | |
| 14 | Filter | Plano | | 0.110 | Glass | 1.517 | 64.2 | — |
| 15 | | Plano | | 1.012 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k= | −6.3490E−02 | −8.9813E+00 | 4.8279E+00 | −3.2331E+01 | −8.9657E+01 | −3.1584E−01 |
| A4= | −1.6453E−03 | 1.2658E−03 | −5.4437E−03 | 1.6431E−02 | 2.9887E−02 | 1.2071E−02 |
| A6= | 1.2902E−03 | 7.7790E−03 | 1.6207E−02 | −9.0080E−03 | −7.0123E−02 | −3.9322E−02 |
| A8= | 1.1372E−04 | −1.3926E−03 | −8.7291E−03 | 2.2109E−03 | 7.1515E−02 | 4.6274E−02 |
| A10= | −3.1875E−05 | 2.6493E−04 | 2.0942E−03 | −8.3294E−04 | −4.0006E−02 | −1.8329E−02 |
| A12= | 4.4192E−05 | −8.9443E−05 | −4.9877E−04 | 3.2274E−04 | 1.3020E−02 | 2.8713E−03 |
| A14= | — | — | 8.3949E−05 | −3.8945E−05 | −2.0142E−03 | — |

| Surface # | 8 | 9 | 10 | 11 | 12 | 13 |
|---|---|---|---|---|---|---|
| k= | 9.0000E+01 | −4.7778E+01 | −9.0000E+01 | −9.2444E+00 | −4.4358E+00 | −1.0087E+01 |
| A4= | −3.3051E−02 | −2.5931E−02 | −8.0791E−02 | −9.1389E−02 | −1.5041E−01 | −1.1480E−01 |
| A6= | 8.9640E−03 | −3.3878E−02 | −8.3857E−02 | 2.8831E−02 | 1.0248E−01 | 6.5741E−02 |
| A8= | −1.0605E−02 | 3.5537E−02 | 9.9618E−02 | −7.6174E−02 | −5.1324E−02 | −2.7661E−02 |
| A10= | 3.6016E−03 | −1.9564E−02 | −4.6568E−02 | 1.9115E−03 | 1.4357E−02 | 6.5049E−03 |
| A12= | −7.1092E−04 | 5.4740E−03 | 1.0617E−02 | −4.0597E−04 | −2.2166E−03 | −7.9436E−04 |
| A14= | — | −7.9429E−04 | −1.0365E−03 | 5.8258E−05 | 1.8133E−04 | 4.2470E−05 |
| A16= | — | 5.0555E−05 | 2.2670E−05 | −3.7664E−06 | −6.2423E−06 | −4.4480E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 7.49 | f/R9 | 0.15 |
| Fno | 2.29 | f/R12 | 2.72 |
| HFOV [deg.] | 21.2 | f2/f3 | −1.52 |
| V3 | 19.5 | f2/f5 | −1.69 |
| V4 | 21.5 | SD/TD | 0.86 |
| V3 + V4 + V6 | 60.5 | TL/f | 0.96 |
| Nmax | 1.669 | f/ImgH | 2.50 |
| CT4/T34 | 0.34 | f/EPD | 2.29 |
| T45/T34 | 0.08 | Y62/Y11 | 1.48 |
| T56/T34 | 0.18 | Yc52/f | 0.14 |
| (CT1 + T34)/T45 | 17.5 | |f/R1| + |f/R2| | 4.87 |
| ATmax/CTmax | 2.47 | |f/R3| + |f/R4| | 1.59 |
| T45/(CT4 + CT5) | 0.18 | |f/R5| + |f/R6| | 1.95 |
| (CT1 + T12)/(T23 + T34 + T45) | 0.47 | |f/R7| + |f/R8| | 0.73 |
| R10/R12 | 0.94 | |f/R9| + |f/R10| | 3.04 |
| (R1 − R12)/(R1 + R12) | −0.13 | |f/R11| + |f/R12| | 5.97 |
| f/R1 | 3.51 | — | — |

7th Embodiment

Figure 13:
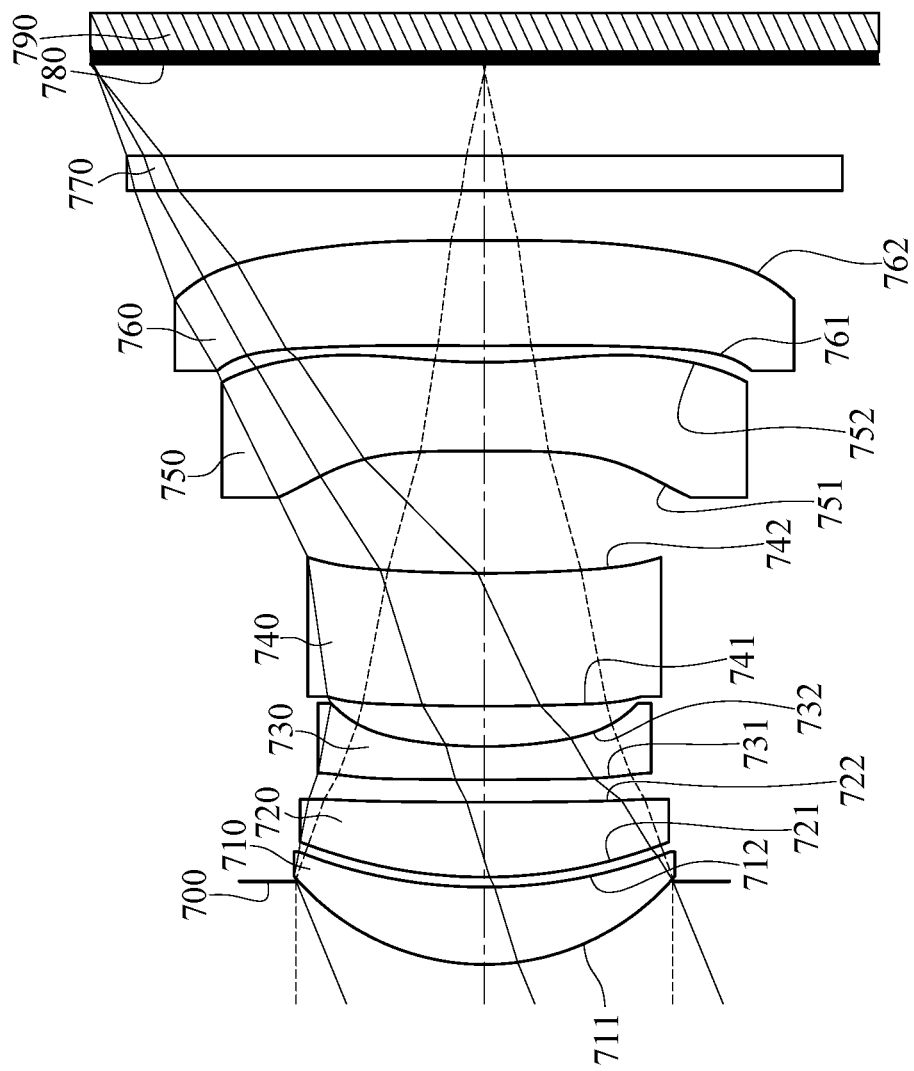
FIG. 13 is a schematic view of an image capturing unit according to the 7th embodiment of the present disclosure.

FIG. 13 is a schematic view of an image capturing unit according to the 7th embodiment of the present disclosure.

Figure 14:
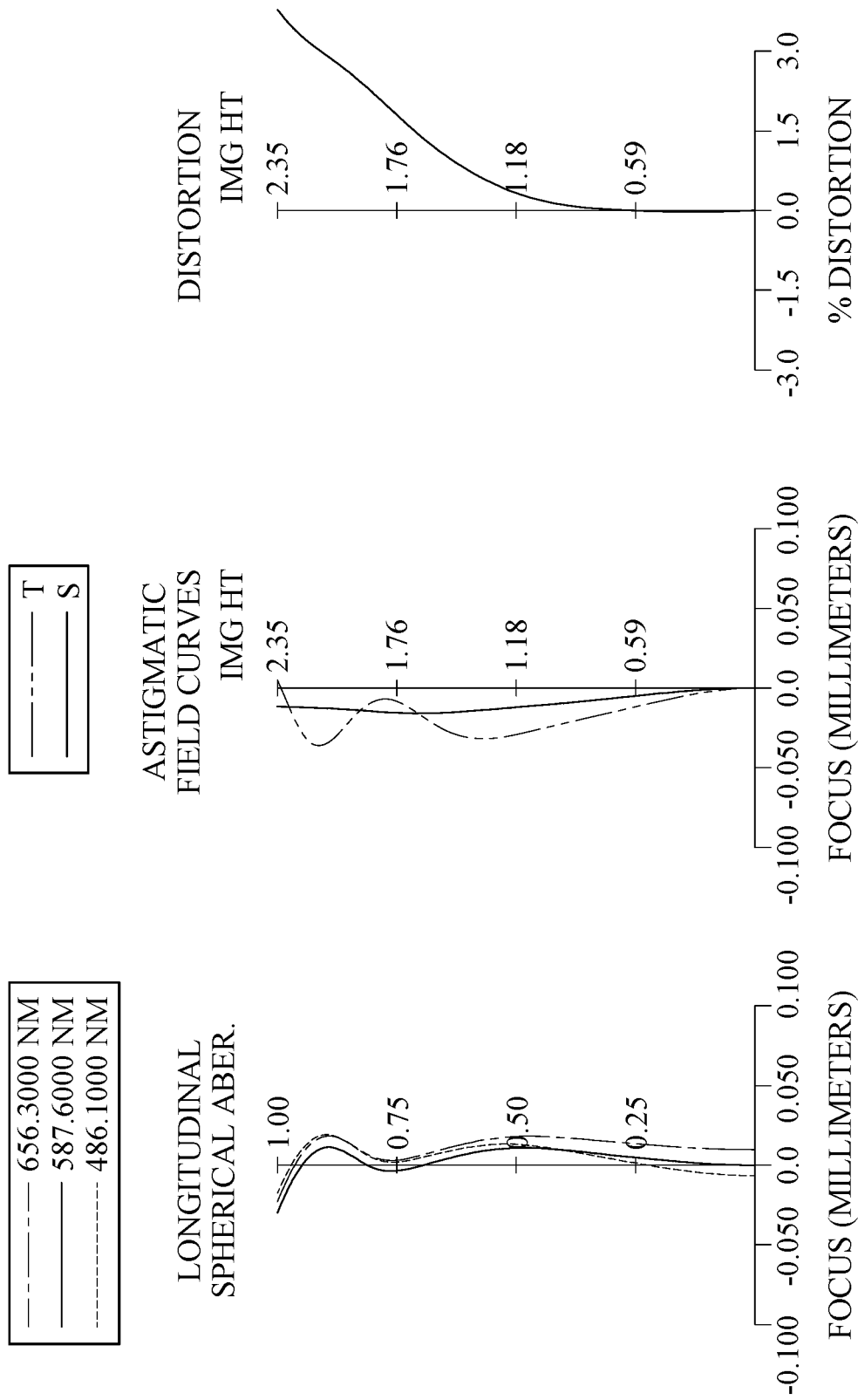
FIG. 14 shows spherical aberration curves, astigmatic field curves and a distortion curve of the image capturing unit according to the 7th embodiment.

FIG. 14 shows, in order from left to right, spherical aberration curves, astigmatic field curves and a distortion curve of the image capturing unit according to the 7th embodiment. In FIG. 13, the image capturing unit includes the imaging lens assembly (its reference numeral is omitted) of the present disclosure and an image sensor 790. The imaging lens assembly includes, in order from an object side to an image side, an aperture stop 700, a first lens element 710, a second lens element 720, a third lens element 730, a fourth lens element 740, a fifth lens element 750, a sixth lens element 760, a filter 770 and an image surface 780. The imaging lens assembly includes six single and non-cemented lens elements (710, 720, 730, 740, 750 and 760) with no additional lens element disposed between each of the adjacent six lens elements, wherein there is an air gap between every adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The image-side surface 722 of the second lens element 720 has at least one inflection point.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one inflection point.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one inflection point. The image-side surface 742 of the fourth lens element 740 has at least one convex shape in an off-axis region thereof.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. Each of the object-side surface 751 and the image-side surface 752 of the fifth lens element 750 has at least one inflection point. The image-side surface 752 of the fifth lens element 750 has at least one convex shape in an off-axis region thereof.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one inflection point.

The filter 770 is made of glass material and located between the sixth lens element 760 and the image surface 780, and will not affect the focal length of the imaging lens assembly. The image sensor 790 is disposed on or near the image surface 780 of the imaging lens assembly.

In this embodiment, among the six lens elements, each of three lens elements has an Abbe number smaller than 25.0. In detail, the Abbe numbers of the third lens element 730, the fourth lens element 740 and the sixth lens element 760 are all smaller than 25.0. Additionally, each of two lens elements has an Abbe number smaller than 22.0. In detail, the Abbe numbers of the third lens element 730 and the sixth lens element 760 are both smaller than 22.0. Furthermore, each of two lens elements has an Abbe number smaller than 20.0. In detail, the Abbe numbers of the third lens element 730 and the sixth lens element 760 are both smaller than 20.0.

In this embodiment, one lens element (the sixth lens element 760) satisfies the following condition: $|f/Rf|+|f/Rr|<1.0$. In detail, a focal length of the imaging lens assembly is f, a curvature radius of the object-side surface 761 of the sixth lens element 760 is R11, a curvature radius of the image-side surface 762 of the sixth lens element 760 is R12, and $|f/R11|+|f/R12|=0.27$.

The detailed optical data of the 7th embodiment are shown in Table 13 and the aspheric surface data are shown in Table 14 below.

TABLE 13

7th Embodiment
f = 5.50 mm, Fno = 2.43, HFOV = 22.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.500 | | | | |
| 2 | Lens 1 | 1.489 | (ASP) | 0.465 | Plastic | 1.544 | 55.9 | 4.82 |
| 3 | | 3.067 | (ASP) | 0.060 | | | | |
| 4 | Lens 2 | 2.971 | (ASP) | 0.450 | Plastic | 1.544 | 55.9 | 6.31 |
| 5 | | 20.802 | (ASP) | 0.135 | | | | |
| 6 | Lens 3 | 10.658 | (ASP) | 0.200 | Plastic | 1.650 | 21.4 | −4.86 |
| 7 | | 2.419 | (ASP) | 0.242 | | | | |
| 8 | Lens 4 | 8.449 | (ASP) | 0.800 | Plastic | 1.639 | 23.5 | −267.13 |
| 9 | | 7.754 | (ASP) | 0.735 | | | | |
| 10 | Lens 5 | −110.405 | (ASP) | 0.534 | Plastic | 1.544 | 55.9 | −6.23 |
| 11 | | 3.504 | (ASP) | 0.099 | | | | |
| 12 | Lens 6 | 22.389 | (ASP) | 0.633 | Plastic | 1.650 | 21.5 | 31.15 |
| 13 | | −210.470 | (ASP) | 0.300 | | | | |
| 14 | Filter | Plano | | 0.210 | Glass | 1.517 | 64.2 | — |

TABLE 13-continued

7th Embodiment
f = 5.50 mm, Fno = 2.43, HFOV = 22.3 deg.

| Surface # | | Curvature Radius | Thickness | Material | Index | Abbe # | Focal Length |
|---|---|---|---|---|---|---|---|
| 15 | | Plano | 0.550 | | | | |
| 16 | Image | Plano | — | | | | |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k= | −1.9563E−01 | 1.0768E−01 | 2.5973E−01 | 3.8491E+01 | −1.3121E+01 | 4.2886E−01 |
| A4= | 3.2293E−03 | 2.4776E−04 | 1.4843E−03 | −8.1010E−02 | −2.8689E−01 | −2.8466E−01 |
| A6= | 4.7964E−03 | 5.2248E−04 | −3.9307E−03 | 2.1608E−01 | 9.3265E−01 | 9.9876E−01 |
| A8= | 2.2052E−03 | — | — | −2.3830E−01 | −1.2895E+00 | −1.3318E+00 |
| A10= | −2.6719E−03 | — | — | 1.1538E−01 | 9.8672E−01 | 1.2185E+00 |
| A12= | 1.7893E−03 | — | — | −1.8965E−03 | −3.7945E−01 | −4.7198E−01 |
| A14= | — | — | — | −1.6440E−02 | 3.0635E−02 | — |

| Surface # | 8 | 9 | 10 | 11 | 12 | 13 |
|---|---|---|---|---|---|---|
| k= | −1.7568E+01 | 4.3492E+01 | 6.6000E+01 | 1.2641E+00 | 9.0000E+01 | 8.6951E+01 |
| A4= | −1.0603E−01 | −5.1956E−02 | −1.6745E−01 | −1.3816E−01 | −6.6488E−02 | −7.1296E−02 |
| A6= | 9.3315E−02 | 3.4678E−02 | −3.5990E−02 | 4.0642E−03 | 2.6618E−02 | 2.8821E−02 |
| A8= | 2.4821E−01 | 5.1867E−02 | 6.0269E−02 | 4.0839E−02 | 4.4390E−02 | 8.1632E−03 |
| A10= | −5.9227E−01 | −1.0436E−01 | −1.8115E−02 | −3.0003E−02 | −6.3960E−02 | −1.2712E−02 |
| A12= | 6.3319E−01 | 1.1440E−01 | 7.5060E−03 | 1.0118E−02 | 3.3717E−02 | 4.8191E−03 |
| A14= | −2.5402E−01 | −5.1651E−02 | 3.0872E−03 | −1.6230E−03 | −8.4416E−03 | −8.4230E−04 |
| A16= | — | — | −2.8765E−03 | 7.9074E−05 | 8.1133E−04 | 5.7264E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.50 | f/R9 | −0.05 |
| Fno | 2.43 | f/R12 | −0.03 |
| HFOV [deg.] | 22.3 | f2/f3 | −1.30 |
| V3 | 21.4 | f2/f5 | −1.01 |
| V4 | 23.5 | SD/TD | 0.89 |
| V3 + V4 + V6 | 66.4 | TL/f | 0.98 |
| Nmax | 1.650 | f/ImgH | 2.34 |
| CT4/T34 | 3.31 | f/EPD | 2.43 |
| T45/T34 | 3.04 | Y62/Y11 | 1.62 |
| T56/T34 | 0.41 | Yc52/f | 0.15 |
| (CT1 + T34)/T45 | 1.0 | |f/R1| + |f/R2| | 5.49 |
| ATmax/CTmax | 0.92 | |f/R3| + |f/R4| | 2.12 |
| T45/(CT4 + CT5) | 0.55 | |f/R5| + |f/R6| | 2.79 |
| (CT1 + T12)/(T23 + T34 + T45) | 0.47 | |f/R7| + |f/R8| | 1.36 |
| R10/R12 | −0.02 | |f/R9| + |f/R10| | 1.62 |
| (R1 − R12)/(R1 + R12) | −1.01 | |f/R11| + |f/R12| | 0.27 |
| f/R1 | 3.69 | — | — |

8th Embodiment

Figure 15:
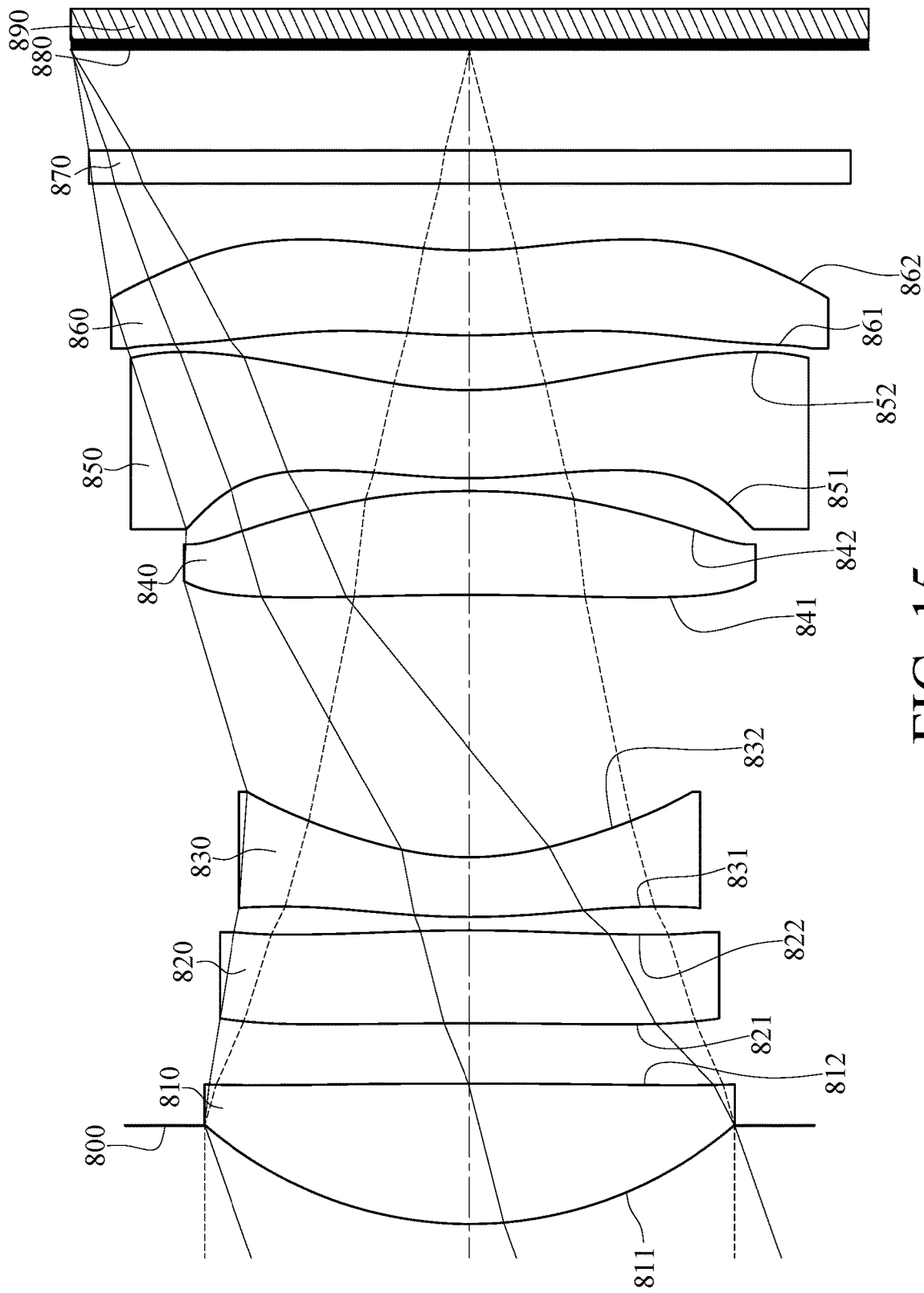
FIG. 15 is a schematic view of an image capturing unit according to the 8th embodiment of the present disclosure.
Figure 16:
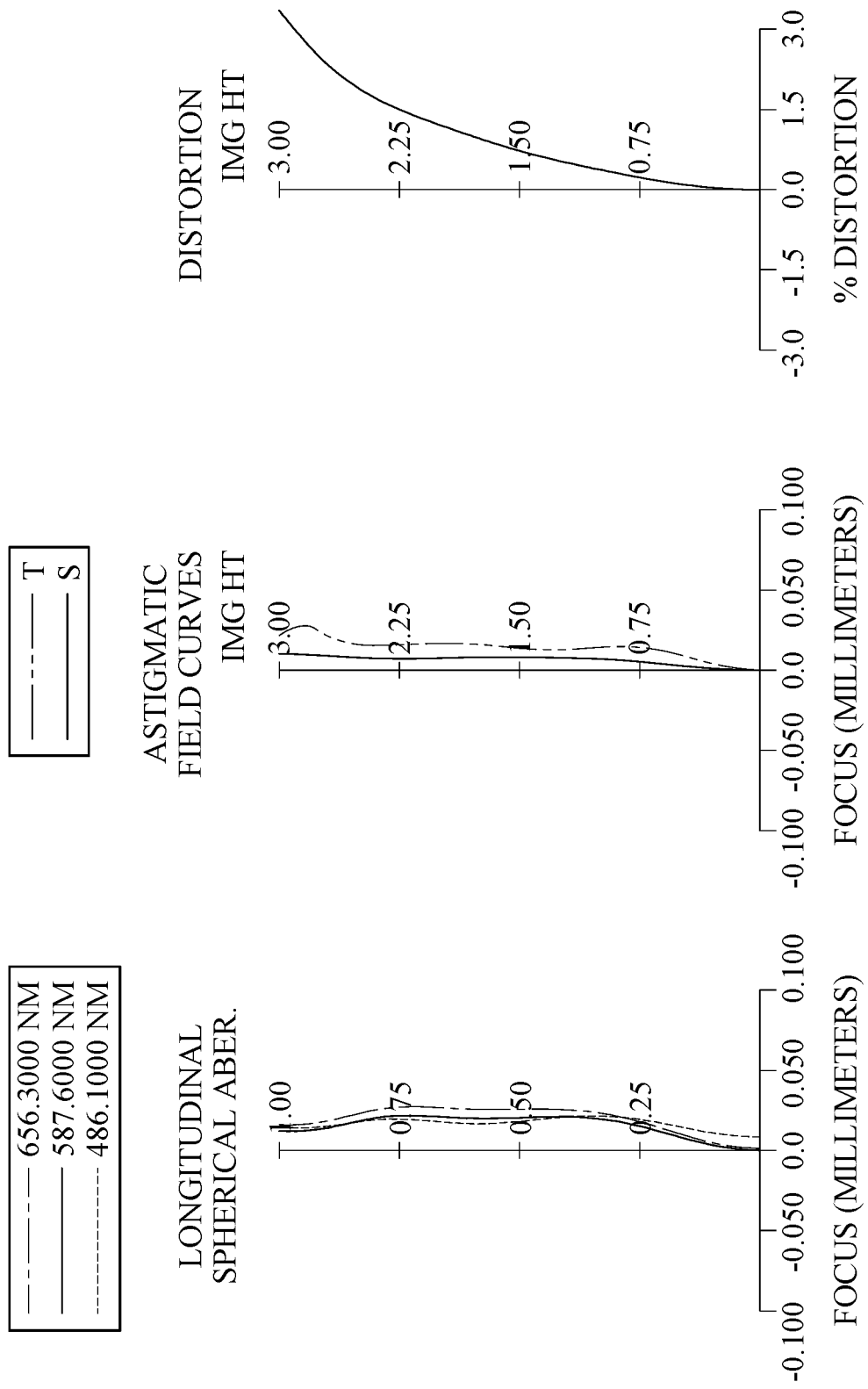
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens assembly (its reference numeral is omitted) of the present disclosure and an image sensor 890. The imaging lens assembly includes, in order from an object side to an image side, an aperture stop 800, a first lens element 810, a second lens element 820, a third lens element 830, a fourth lens element 840, a fifth lens element 850, a sixth lens element 860, a filter 870 and an image surface 880. The imaging lens assembly includes six single and non-cemented lens elements (810, 820, 830, 840, 850 and 860) with no additional lens element disposed between each of the adjacent six lens elements, wherein there is an air gap between every adjacent lens elements.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric. The image-side surface 812 of the first lens element 810 has at least one inflection point.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric. Each of the object-side surface 821 and the image-side surface 822 of the second lens element 820 has at least one inflection point.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has at least one inflection point.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. Each of the object-side surface 841 and the image-side surface 842 of the fourth lens element 840 has at least one inflection point in an off-axis region thereof.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. Each of the object-side surface 851 and the image-side surface 852 of the fifth lens element 850 has at least one inflection point. The image-side surface 852 of the fifth lens element 850 has at least one convex shape in an off-axis region thereof.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. Each of the object-side surface 861 and the image-side surface 862 of the sixth lens element 860 has at least one inflection point. The image-side surface 862 of the sixth lens element 860 has at least one convex shape in an off-axis region thereof.

The filter 870 is made of glass material and located between the sixth lens element 860 and the image surface 880, and will not affect the focal length of the imaging lens assembly. The image sensor 890 is disposed on or near the image surface 880 of the imaging lens assembly.

In this embodiment, among the six lens elements, each of two lens elements has an Abbe number smaller than 25.0. In detail, the Abbe numbers of the third lens element 830 and the fourth lens element 840 are both smaller than 25.0. Additionally, one lens element has an Abbe number smaller than 22.0. In detail, the Abbe number of the third lens element 830 is smaller than 22.0. Furthermore, one lens element has an Abbe number smaller than 20.0. In detail, the Abbe number of the third lens element 830 is smaller than 20.0.

In this embodiment, one lens element (the second lens element 820) satisfies the following condition: |f/Rf|+|f/Rr|<1.0. In detail, a focal length of the imaging lens assembly is f, a curvature radius of the object-side surface 821 of the second lens element 820 is R3, a curvature radius of the image-side surface 822 of the second lens element 820 is R4, and |f/R3|+|f/R4|=0.90.

The detailed optical data of the 8th embodiment are shown in Table 15 and the aspheric surface data are shown in Table 16 below.

TABLE 15

8th embodiment
f = 8.22 mm, Fno = 2.06, HFOV = 19.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.740 | | | | |
| 2 | Lens 1 | 3.006 | (ASP) | 1.055 | Plastic | 1.544 | 55.9 | 5.42 |
| 3 | | −131.769 | (ASP) | 0.452 | | | | |
| 4 | Lens 2 | −51.900 | (ASP) | 0.703 | Plastic | 1.544 | 55.9 | 25.59 |
| 5 | | −11.025 | (ASP) | 0.100 | | | | |
| 6 | Lens 3 | 5.968 | (ASP) | 0.451 | Plastic | 1.688 | 18.7 | −5.43 |
| 7 | | 2.227 | (ASP) | 1.975 | | | | |
| 8 | Lens 4 | −20.342 | (ASP) | 0.784 | Plastic | 1.639 | 23.3 | 12.21 |
| 9 | | −5.722 | (ASP) | 0.096 | | | | |
| 10 | Lens 5 | 4.231 | (ASP) | 0.662 | Plastic | 1.544 | 55.9 | −20.93 |
| 11 | | 2.914 | (ASP) | 0.411 | | | | |
| 12 | Lens 6 | 5.194 | (ASP) | 0.644 | Plastic | 1.529 | 45.4 | −25.78 |
| 13 | | 3.601 | (ASP) | 0.500 | | | | |
| 14 | Filter | Plano | | 0.250 | Glass | 1.517 | 64.2 | — |
| 15 | | Plano | | 0.760 | | | | |
| 16 | Image | Plano | | — | | | | |

Note:
Reference wavelength is 587.6 nm (d-line).

TABLE 16

Aspheric Coefficients

| Surface # | 2 | 3 | 4 | 5 | 6 | 7 |
|---|---|---|---|---|---|---|
| k= | −7.1587E−02 | 9.0000E+01 | 6.4481E+01 | −5.8154E+01 | −4.2362E+01 | −1.4790E+00 |
| A4= | −1.0639E−03 | −6.2162E−03 | −8.2423E−03 | 2.1409E−02 | 8.1735E−03 | −3.0842E−02 |

TABLE 16-continued

Aspheric Coefficients

| A6= | 3.0041E−04 | 4.9691E−03 | 1.5374E−02 | −8.3813E−03 | −2.2862E−02 | 5.9605E−03 |
|---|---|---|---|---|---|---|
| A8= | −2.2761E−05 | −1.6376E−03 | −8.2398E−03 | 2.1183E−03 | 1.0876E−02 | −3.8378E−04 |
| A10= | −7.9630E−06 | 2.8641E−04 | 2.4579E−03 | −8.3672E−04 | −3.0813E−03 | 5.6917E−04 |
| A12= | 1.7763E−06 | −2.0146E−05 | −3.7576E−04 | 4.1072E−04 | 6.9941E−04 | −1.3496E−04 |
| A14= | — | — | 2.3060E−05 | −6.6111E−05 | −8.8291E−05 | — |

| Surface # | 8 | 9 | 10 | 11 | 12 | 13 |
|---|---|---|---|---|---|---|
| k= | 7.8812E+01 | −2.9866E−01 | −1.8545E+01 | −4.3960E+00 | −5.5517E−02 | −1.4323E+01 |
| A4= | 9.4731E−03 | −3.8948E−02 | −5.9243E−02 | −4.2737E−02 | −9.0637E−02 | −5.1312E−02 |
| A6= | 1.5350E−04 | 3.4983E−02 | 2.8058E−02 | 1.4699E−02 | 3.2587E−02 | 1.4986E−02 |
| A8= | −3.1011E−04 | −1.6358E−02 | −1.0815E−02 | −2.1149E−03 | −6.9886E−03 | −3.3297E−03 |
| A10= | 6.3018E−05 | 4.5874E−03 | 2.1475E−03 | −2.7748E−04 | 9.3166E−04 | 4.2431E−04 |
| A12= | 6.5525E−06 | −7.8540E−04 | −2.6294E−04 | 1.3618E−04 | −7.2008E−05 | −3.0609E−05 |
| A14= | — | 7.5471E−05 | 1.2524E−05 | −1.7259E−05 | 2.9486E−06 | 1.9332E−06 |
| A16= | — | −2.6966E−06 | 8.3602E−07 | 7.6131E−07 | −7.1409E−08 | −1.0184E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

8th Embodiment

| f [mm] | 8.22 | f/R9 | 1.94 |
|---|---|---|---|
| Fno | 2.06 | f/R12 | 2.28 |
| HFOV [deg.] | 19.4 | f2/f3 | −4.71 |
| V3 | 18.7 | f2/f5 | −1.22 |
| V4 | 23.3 | SD/TD | 0.90 |
| V3 + V4 + V6 | 87.4 | TL/f | 1.08 |
| Nmax | 1.688 | f/ImgH | 2.74 |
| CT4/T34 | 0.40 | f/EPD | 2.06 |
| T45/T34 | 0.05 | Y62/Y11 | 1.35 |
| T56/T34 | 0.21 | Yc52/f | 0.26 |
| (CT1 + T34)/T45 | 31.6 | |f/R1| + |f/R2| | 2.80 |
| ATmax/CTmax | 1.87 | |f/R3| + |f/R4| | 0.90 |
| T45/(CT4 + CT5) | 0.07 | |f/R5| + |f/R6| | 5.07 |
| (CT1 + T12)/(T23 + T34 + T45) | 0.69 | |f/R7| + |f/R8| | 1.84 |
| R10/R12 | 0.81 | |f/R9| + |f/R10| | 4.76 |
| (R1 − R12)/(R1 + R12) | −0.09 | |f/R11| + |f/R12| | 3.86 |
| f/R1 | 2.73 | — | — |

9th Embodiment

Figure 17:
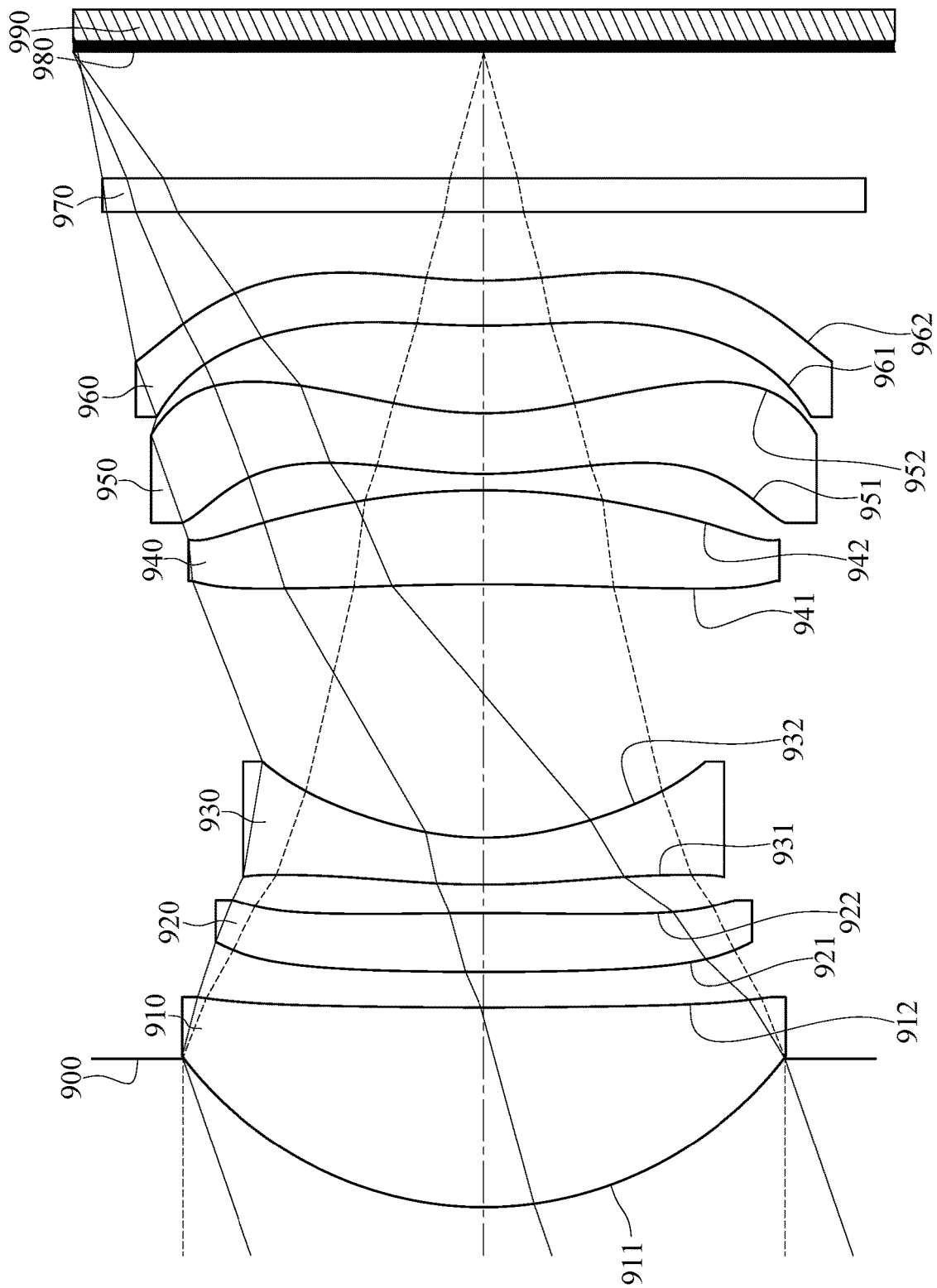
FIG. 17 is a schematic view of an image capturing unit according to the 9th embodiment of the present disclosure.
Figure 18:
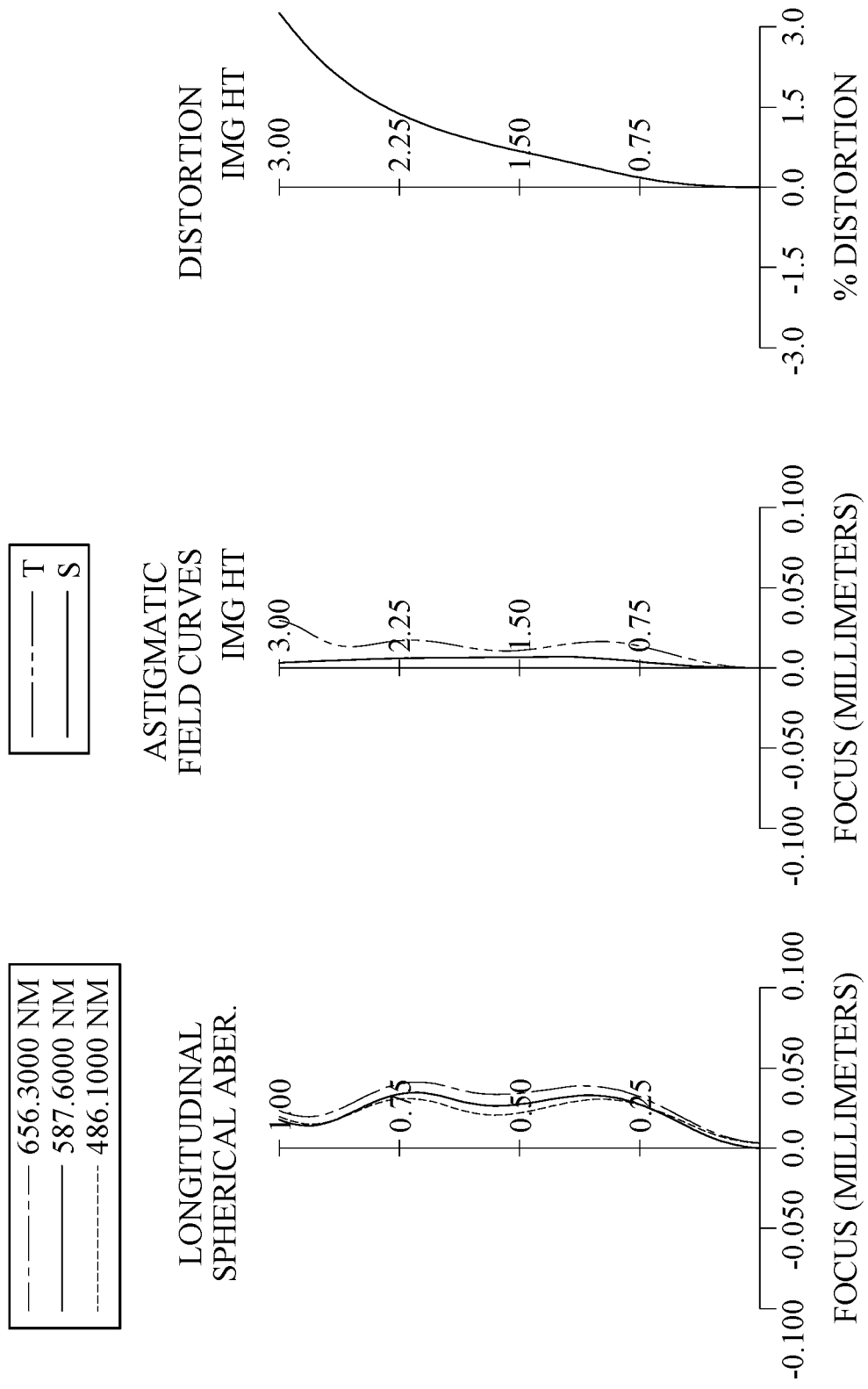
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens assembly (its reference numeral is omitted) of the present disclosure and an image sensor 990. The imaging lens assembly includes, in order from an object side to an image side, an aperture stop 900, a first lens element 910, a second lens element 920, a third lens element 930, a fourth lens element 940, a fifth lens element 950, a sixth lens element 960, a filter 970 and an image surface 980. The imaging lens assembly includes six single and non-cemented lens elements (910, 920, 930, 940, 950 and 960) with no additional lens element disposed between each of the adjacent six lens elements, wherein there is an air gap between every adjacent lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric. The image-side surface 922 of the second lens element 920 has at least one inflection point.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has at least one inflection point.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. Each of the object-side surface 941 and the image-side surface 942 of the fourth lens element 940 has at least one inflection point.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. Each of the object-side surface 951 and the image-side surface 952 of the fifth lens element 950 has at least one inflection point. The image-side surface 952 of the fifth lens element 950 has at least one convex shape in an off-axis region thereof.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. Each of the object-side surface 961 and the image-side surface 962 of the sixth lens element 960 has at least one inflection point. The image-side surface 962 of the sixth lens element 960 has at least one convex shape in an off-axis region thereof.

The filter 970 is made of glass material and located between the sixth lens element 960 and the image surface 980, and will not affect the focal length of the imaging lens assembly. The image sensor 990 is disposed on or near the image surface 980 of the imaging lens assembly.

In this embodiment, among the six lens elements, each of two lens elements has an Abbe number smaller than 25.0. In detail, the Abbe numbers of the third lens element 930 and the fourth lens element 940 are both smaller than 25.0. Additionally, each of two lens elements has an Abbe number smaller than 22.0. In detail, the Abbe numbers of the third lens element 930 and the fourth lens element 940 are both smaller than 22.0. Furthermore, each of two lens elements has an Abbe number smaller than 20.0. In detail, the Abbe numbers of the third lens element 930 and the fourth lens element 940 are both smaller than 20.0.

In this embodiment, one lens element (the second lens element 920) satisfies the following condition: $|f/Rf|+|f/Rr|<1.0$. In detail, a focal length of the imaging lens assembly is f, a curvature radius of the object-side surface 921 of the second lens element 920 is R3, a curvature radius of the image-side surface 922 of the second lens element 920 is R4, and $|f/R3|+|f/R4|=0.77$.

The detailed optical data of the 9th embodiment are shown in Table 17 and the aspheric surface data are shown in Table 18 below.

TABLE 17

9th embodiment
f = 8.36 mm, Fno = 1.90, HFOV = 19.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.086 | | | | |
| 2 | Lens 1 | 2.699 | (ASP) | 1.460 | Plastic | 1.534 | 55.9 | 5.36 |
| 3 | | 38.608 | (ASP) | 0.260 | | | | |
| 4 | Lens 2 | 22.257 | (ASP) | 0.429 | Plastic | 1.511 | 56.8 | 21.38 |
| 5 | | −21.316 | (ASP) | 0.212 | | | | |
| 6 | Lens 3 | 6.454 | (ASP) | 0.343 | Plastic | 1.688 | 18.7 | −5.05 |
| 7 | | 2.211 | (ASP) | 1.852 | | | | |
| 8 | Lens 4 | −16.960 | (ASP) | 0.686 | Plastic | 1.688 | 18.7 | 12.04 |
| 9 | | −5.657 | (ASP) | 0.120 | | | | |
| 10 | Lens 5 | 3.429 | (ASP) | 0.446 | Plastic | 1.511 | 56.8 | −23.99 |
| 11 | | 2.561 | (ASP) | 0.638 | | | | |
| 12 | Lens 6 | 5.810 | (ASP) | 0.330 | Plastic | 1.529 | 45.4 | −20.78 |
| 13 | | 3.727 | (ASP) | 0.500 | | | | |
| 14 | Filter | Plano | | 0.250 | Glass | 1.517 | 64.2 | — |
| 15 | | Plano | | 0.923 | | | | |
| 16 | Image | Plano | | — | | | | |

Note:
Reference wavelength is 587.6 nm (d-line).

TABLE 18

Aspheric Coefficients

| Surface # | 2 | 3 | 4 | 5 | 6 | 7 |
|---|---|---|---|---|---|---|
| k= | −7.6510E−02 | 8.8818E+01 | −9.0000E+01 | −6.0613E+01 | −5.9414E+01 | −1.2343E+00 |
| A4= | −6.5698E−04 | −7.3636E−03 | −8.3424E−03 | 2.3418E−02 | 5.6905E−03 | −2.8261E−02 |
| A6= | 1.0591E−04 | 4.9334E−03 | 1.4802E−02 | −8.1476E−03 | −2.1405E−02 | 7.8623E−03 |
| A8= | −1.3353E−05 | −1.5593E−03 | −8.1147E−03 | 1.9821E−03 | 1.1661E−02 | 4.3634E−04 |
| A10= | −7.2760E−06 | 2.9248E−04 | 2.5416E−03 | −7.4654E−04 | −3.1670E−03 | 4.0962E−04 |
| A12= | 1.7004E−06 | −2.2073E−05 | −3.5279E−04 | 4.6465E−04 | 5.8266E−04 | −1.1373E−04 |
| A14= | — | — | 1.6517E−05 | −8.0761E−05 | −7.0825E−05 | — |

| Surface # | 8 | 9 | 10 | 11 | 12 | 13 |
|---|---|---|---|---|---|---|
| k= | 5.8910E+01 | −3.6538E+01 | −9.5947E+00 | −3.3695E+00 | 6.7415E−01 | −1.8685E+01 |
| A4= | 1.0529E−02 | −4.4730E−02 | −6.9377E−02 | −4.9303E−02 | −9.0432E−02 | −6.1088E−02 |
| A6= | −1.8625E−04 | 3.4431E−02 | 2.8731E−02 | 1.3239E−02 | 2.9831E−02 | 1.6338E−02 |
| A8= | −4.3677E−04 | −1.6203E−02 | −1.0676E−02 | −1.9996E−03 | −6.9315E−03 | −3.5102E−03 |
| A10= | 7.9249E−05 | 4.5862E−03 | 2.1422E−03 | −2.6116E−04 | 9.3257E−04 | 4.1947E−04 |
| A12= | 8.5200E−06 | −7.9192E−04 | −2.6039E−04 | 1.3359E−04 | −7.3247E−05 | −2.9611E−05 |
| A14= | — | 7.4619E−05 | 1.3421E−05 | −1.7996E−05 | 2.8501E−06 | 2.0279E−06 |
| A16= | — | −2.3689E−06 | 8.0017E−07 | 7.7769E−07 | −1.0295E−07 | −9.3193E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 8.36 | f/R9 | 2.44 |
| Fno | 1.90 | f/R12 | 2.24 |
| HFOV [deg.] | 19.1 | f2/f3 | −4.23 |
| V3 | 18.7 | f2/f5 | −0.89 |
| V4 | 18.7 | SD/TD | 0.84 |
| V3 + V4 + V6 | 82.8 | TL/f | 1.01 |
| Nmax | 1.688 | f/ImgH | 2.79 |
| CT4/T34 | 0.37 | f/EPD | 1.90 |
| T45/T34 | 0.06 | Y62/Y11 | 1.15 |
| T56/T34 | 0.34 | Yc52/f | 0.20 |
| (CT1 + T34)/T45 | 27.6 | \|f/R1\| + \|f/R2\| | 3.31 |
| ATmax/CTmax | 1.27 | \|f/R3\| + \|f/R4\| | 0.77 |
| T45/(CT4 + CT5) | 0.11 | \|f/R5\| + \|f/R6\| | 5.07 |
| (CT1 + T12)/(T23 + T34 + T45) | 0.79 | \|f/R7\| + \|f/R8\| | 1.97 |
| R10/R12 | 0.69 | \|f/R9\| + \|f/R10\| | 5.70 |
| (R1 − R12)/(R1 + R12) | −0.16 | \|f/R11\| + \|f/R12\| | 3.68 |
| f/R1 | 3.10 | — | — |

10th Embodiment

Figure 19:
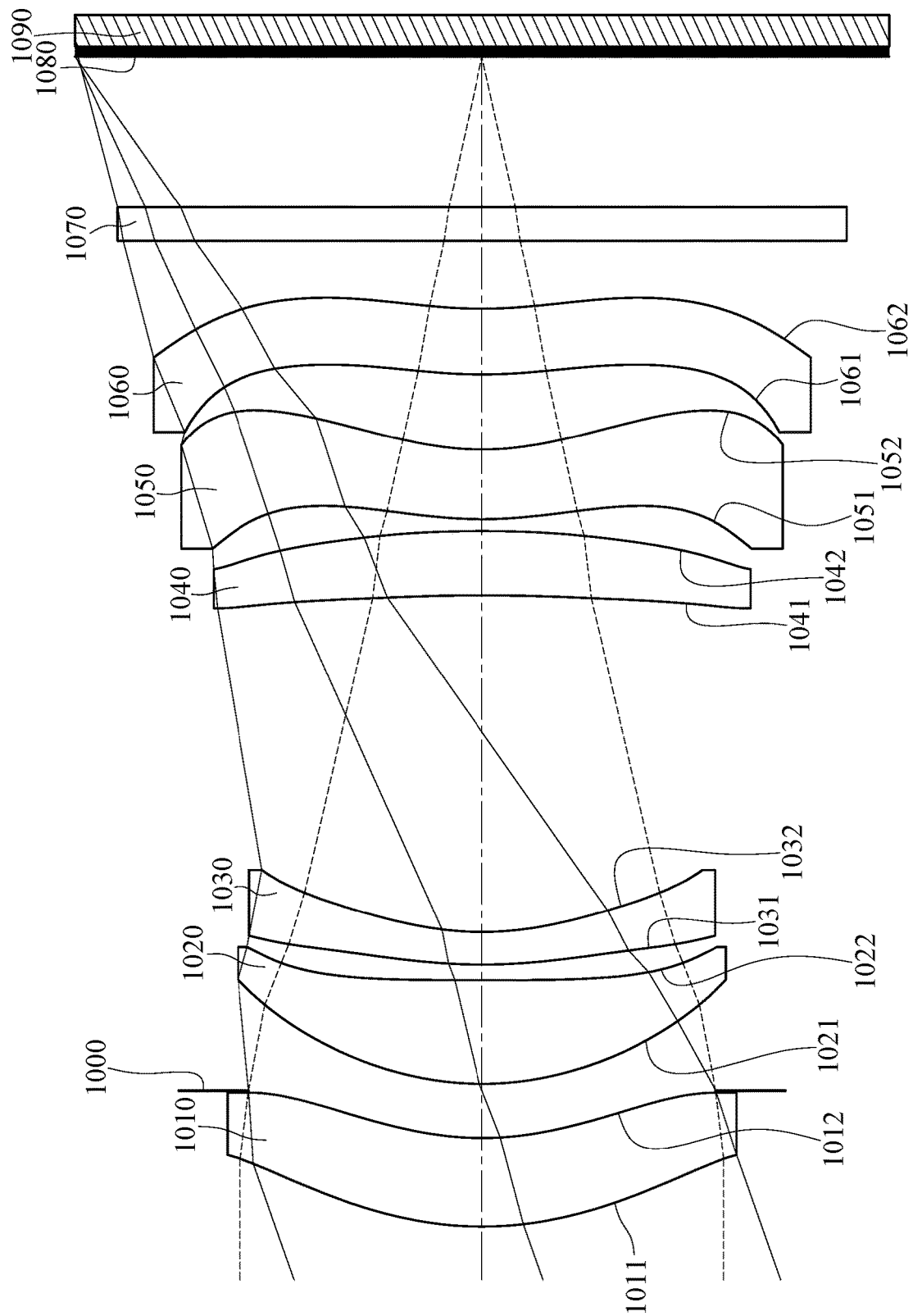
FIG. 19 is a schematic view of an image capturing unit according to the 10th embodiment of the present disclosure.
Figure 20:
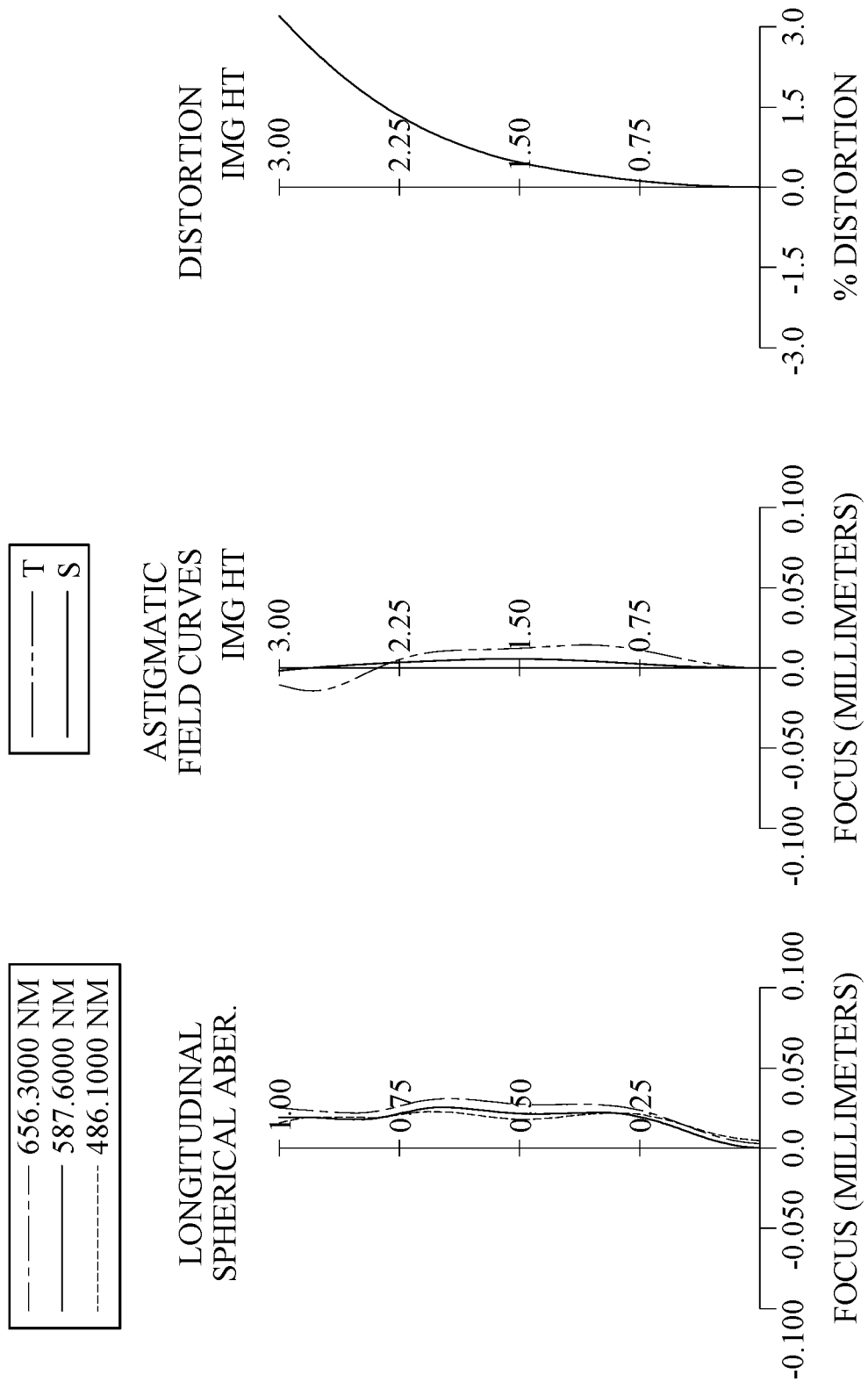
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging lens assembly (its reference numeral is omitted) of the present disclosure and an image sensor 1090. The imaging lens assembly includes, in order from an object side to an image side, a first lens element 1010, an aperture stop 1000, a second lens element 1020, a third lens element 1030, a fourth lens element 1040, a fifth lens element 1050, a sixth lens element 1060, a filter 1070 and an image surface 1080. The imaging lens assembly includes six single and non-cemented lens elements (1010, 1020, 1030, 1040, 1050 and 1060) with no additional lens element disposed between each of the adjacent six lens elements, wherein there is an air gap between every adjacent lens elements.

The first lens element 1010 with negative refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. Each of the object-side surface 1011 and the image-side surface 1012 of the first lens element 1010 has at least one inflection point.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric. The image-side surface 1022 of the second lens element 1020 has at least one inflection point.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has at least one inflection point.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. Each of the object-side surface 1041 and the image-side surface 1042 of the fourth lens element 1040 has at least one inflection point.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. Each of the object-side surface 1051 and the image-side surface 1052 of the fifth lens element 1050 has at least one inflection point. The image-side surface 1052 of the fifth lens element 1050 has at least one convex shape in an off-axis region thereof.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. Each of the object-side surface 1061 and the image-side surface 1062 of the sixth lens element 1060 has at least one inflection point. The image-side surface 1062 of the sixth lens element 1060 has at least one convex shape in an off-axis region thereof.

The filter 1070 is made of glass material and located between the sixth lens element 1060 and the image surface 1080, and will not affect the focal length of the imaging lens assembly. The image sensor 1090 is disposed on or near the image surface 1080 of the imaging lens assembly.

In this embodiment, among the six lens elements, each of two lens elements has an Abbe number smaller than 25.0. In detail, the Abbe numbers of the third lens element 1030 and the fourth lens element 1040 are both smaller than 25.0. Additionally, each of two lens elements has an Abbe number smaller than 22.0. In detail, the Abbe numbers of the third lens element 1030 and the fourth lens element 1040 are both smaller than 22.0. Furthermore, each of two lens elements has an Abbe number smaller than 20.0. In detail, the Abbe numbers of the third lens element 1030 and the fourth lens element 1040 are both smaller than 20.0.

The detailed optical data of the 10th embodiment are shown in Table 19 and the aspheric surface data are shown in Table 20 below.

TABLE 19

10th embodiment
f = 8.21 mm, Fno = 2.30, HFOV = 19.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.618 | (ASP) | 0.657 | Plastic | 1.535 | 56.3 | −148.85 |
| 2 | | 2.313 | (ASP) | 0.349 | | | | |
| 3 | Ape. Stop | Plano | | 0.050 | | | | |
| 4 | Lens 2 | 2.273 | (ASP) | 0.766 | Plastic | 1.544 | 55.9 | 4.17 |
| 5 | | −1223.079 | (ASP) | 0.115 | | | | |
| 6 | Lens 3 | 4.164 | (ASP) | 0.240 | Plastic | 1.688 | 18.7 | −7.85 |
| 7 | | 2.297 | (ASP) | 2.489 | | | | |
| 8 | Lens 4 | −13.555 | (ASP) | 0.474 | Plastic | 1.688 | 18.7 | 34.14 |
| 9 | | −8.717 | (ASP) | 0.088 | | | | |
| 10 | Lens 5 | 3.083 | (ASP) | 0.514 | Plastic | 1.544 | 55.9 | −15.06 |
| 11 | | 2.108 | (ASP) | 0.557 | | | | |
| 12 | Lens 6 | 3.645 | (ASP) | 0.486 | Plastic | 1.529 | 45.4 | −359.84 |
| 13 | | 3.412 | (ASP) | 0.500 | | | | |
| 14 | Filter | Plano | | 0.250 | Glass | 1.517 | 64.2 | — |
| 15 | | Plano | | 1.111 | | | | |
| 16 | Image | Plano | | — | | | | |

Note:
Reference wavelength is 587.6 nm (d-line).

TABLE 20

Aspheric Coefficients

| Surface # | 1 | 2 | 4 | 5 | 6 | 7 |
|---|---|---|---|---|---|---|
| k= | −6.8013E−01 | −2.9865E+00 | −6.6932E−01 | −9.0000E+01 | −2.1495E+01 | −2.0477E+00 |
| A4= | −1.0518E−02 | −1.6621E−02 | −1.3965E−02 | 3.1755E−02 | 8.1593E−03 | −3.3532E−02 |
| A6= | 3.9290E−04 | 1.7109E−03 | 1.1602E−02 | −7.0822E−03 | −2.2077E−02 | 6.7424E−03 |
| A8= | −1.9244E−04 | −2.1930E−03 | −6.4967E−03 | 2.1596E−03 | 1.1554E−02 | 9.6748E−04 |
| A10= | −6.2770E−05 | 4.3657E−04 | 2.5792E−03 | −4.4917E−04 | −2.8881E−03 | 1.4354E−04 |
| A12= | 1.6947E−06 | −2.6796E−05 | −5.0968E−04 | 4.3216E−04 | 6.7859E−04 | −3.1610E−05 |
| A14= | — | — | 3.9900E−05 | −1.0549E−04 | −1.0140E−04 | — |

| Surface # | 8 | 9 | 10 | 11 | 12 | 13 |
|---|---|---|---|---|---|---|
| k= | 4.1718E+01 | −8.8933E+01 | −3.3496E+00 | −3.0076E+00 | −6.0391E−01 | −1.1733E+01 |
| A4= | 1.2133E−02 | −3.7659E−02 | −8.1481E−02 | −4.8019E−02 | −9.2224E−02 | −5.9199E−02 |
| A6= | −6.0619E−04 | 3.2447E−02 | 2.8807E−02 | 1.1967E−02 | 2.9448E−02 | 1.6450E−02 |
| A8= | −8.4285E−04 | −1.6408E−02 | −1.0477E−02 | −1.9841E−03 | −6.9722E−03 | −3.5297E−03 |
| A10= | 3.8381E−05 | 4.5853E−03 | 2.1083E−03 | −2.4862E−04 | 9.1197E−04 | 4.1657E−04 |
| A12= | 3.9131E−05 | −7.8647E−04 | −2.6996E−04 | 1.3080E−04 | −7.8541E−05 | −2.8975E−05 |
| A14= | — | 7.5684E−05 | 1.3807E−05 | −1.8751E−05 | 2.2690E−06 | 2.0785E−06 |
| A16= | — | −2.0569E−06 | 1.5430E−06 | 7.9830E−07 | −9.1186E−08 | −1.1343E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 8.21 | f/R9 | 2.66 |
| Fno | 2.30 | f/R12 | 2.41 |
| HFOV [deg.] | 19.4 | f2/f3 | −0.53 |
| V3 | 18.7 | f2/f5 | −0.28 |
| V4 | 18.7 | SD/TD | 0.85 |
| V3 + V4 + V6 | 82.8 | TL/f | 1.05 |

| 10th Embodiment | | | |
|---|---|---|---|
| Nmax | 1.688 | f/ImgH | 2.74 |
| CT4/T34 | 0.19 | f/EPD | 2.30 |
| T45/T34 | 0.04 | Y62/Y11 | 1.29 |
| T56/T34 | 0.22 | Yc52/f | 0.20 |
| (CT1 + T34)/T45 | 35.8 | |f/R1| + |f/R2| | 6.69 |
| ATmax/CTmax | 3.25 | |f/R3| + |f/R4| | 3.62 |
| T45/(CT4 + CT5) | 0.09 | |f/R5| + |f/R6| | 5.55 |
| (CT1 + T12)/(T23 + T34 + T45) | 0.39 | |f/R7| + |f/R8| | 1.55 |
| R10/R12 | 0.62 | |f/R9| + |f/R10| | 6.56 |
| (R1 − R12)/(R1 + R12) | −0.13 | |f/R11| + |f/R12| | 4.66 |
| f/R1 | 3.14 | — | — |

11th Embodiment

Figure 21:
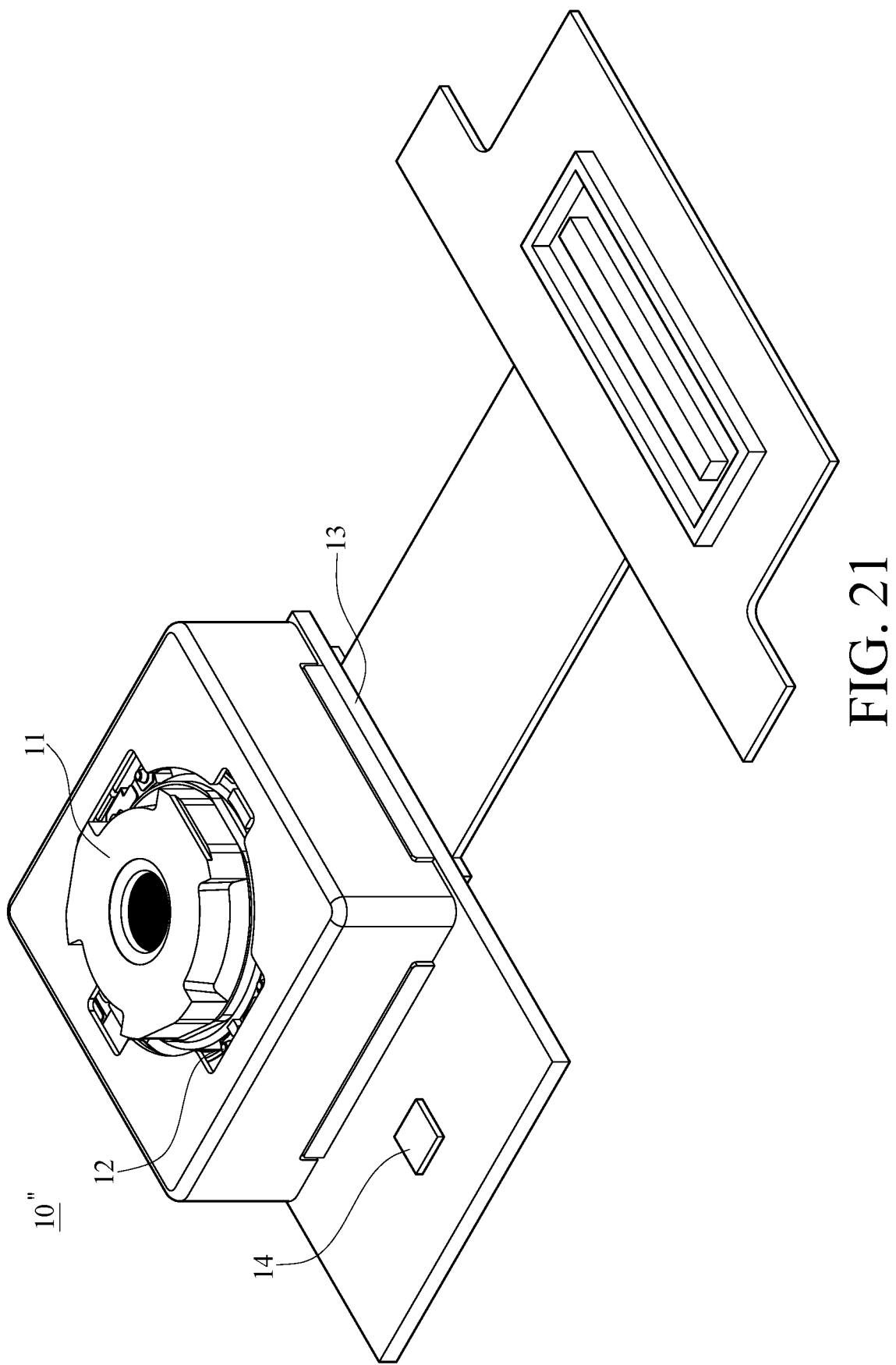
FIG. 21 is a perspective view of an image capturing unit according to the 11th embodiment of the present disclosure.

FIG. 21 is a perspective view of an image capturing unit according to the 11th embodiment of the present disclosure.

In this embodiment, an image capturing unit 10" is a camera module including a lens unit 11, a driving device 12, an image sensor 13 and an image stabilizer 14. The lens unit 11 includes the imaging lens assembly disclosed in the 1st embodiment, a barrel and a holder member (their reference numerals are omitted) for holding the imaging lens assembly. The imaging light converges in the lens unit 11 of the image capturing unit 10" to generate an image with the driving device 12 utilized for focusing the image on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

12th Embodiment

Figure 22:
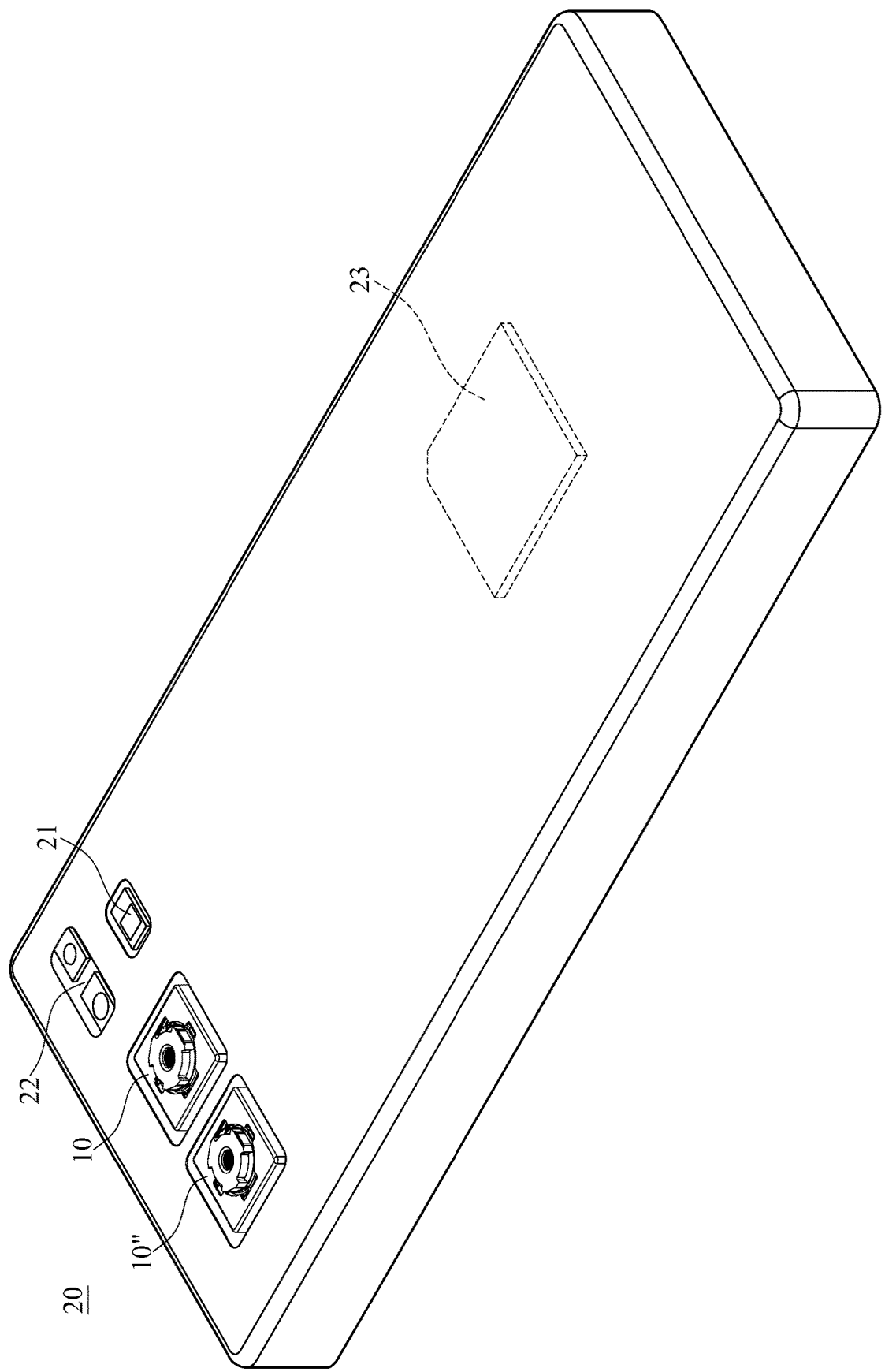
FIG. 22 is one perspective view of an electronic device according to the 12th embodiment of the present disclosure.
Figure 23:
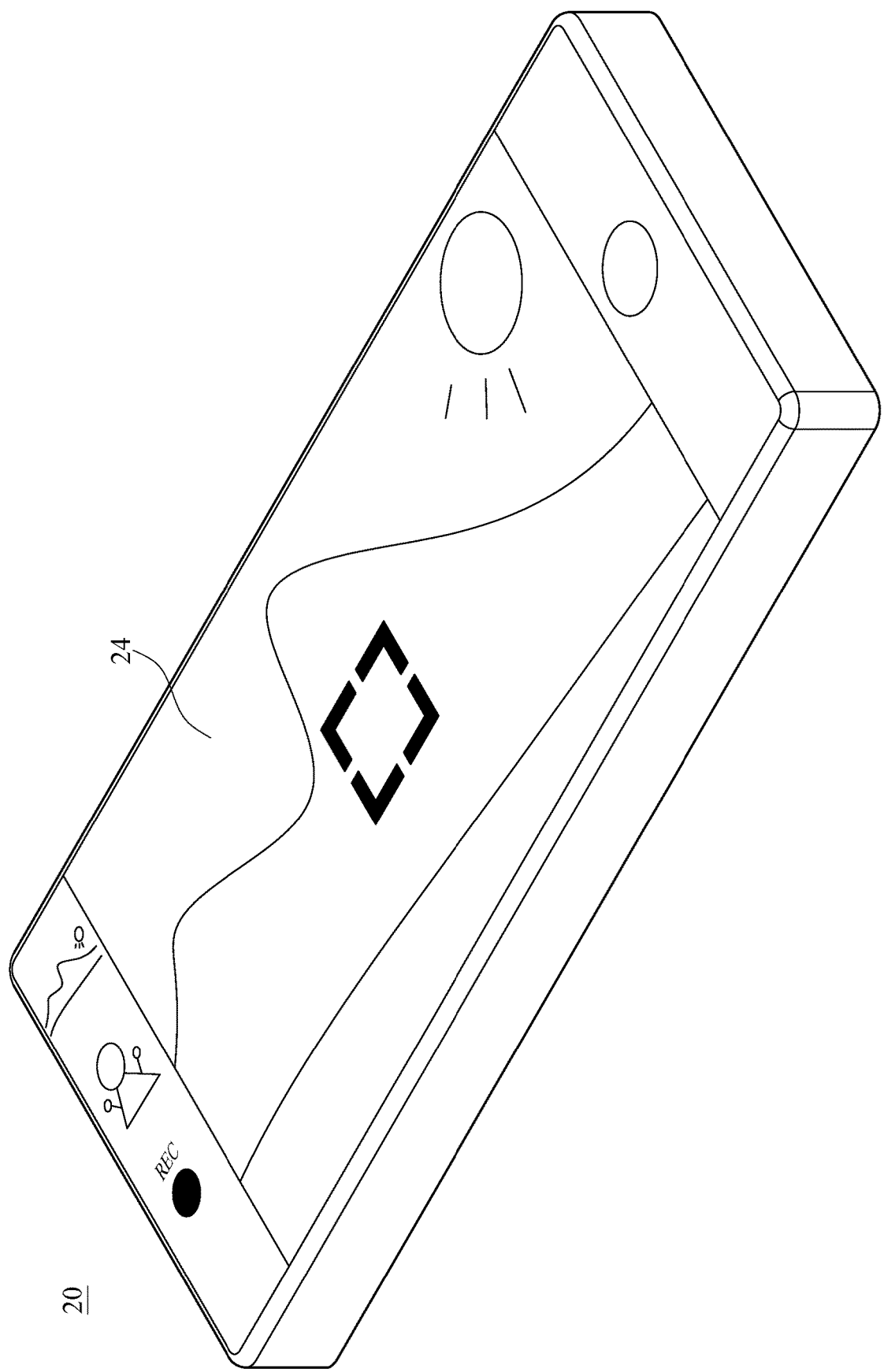
FIG. 23 is another perspective view of the electronic device in FIG. 22.
Figure 24:
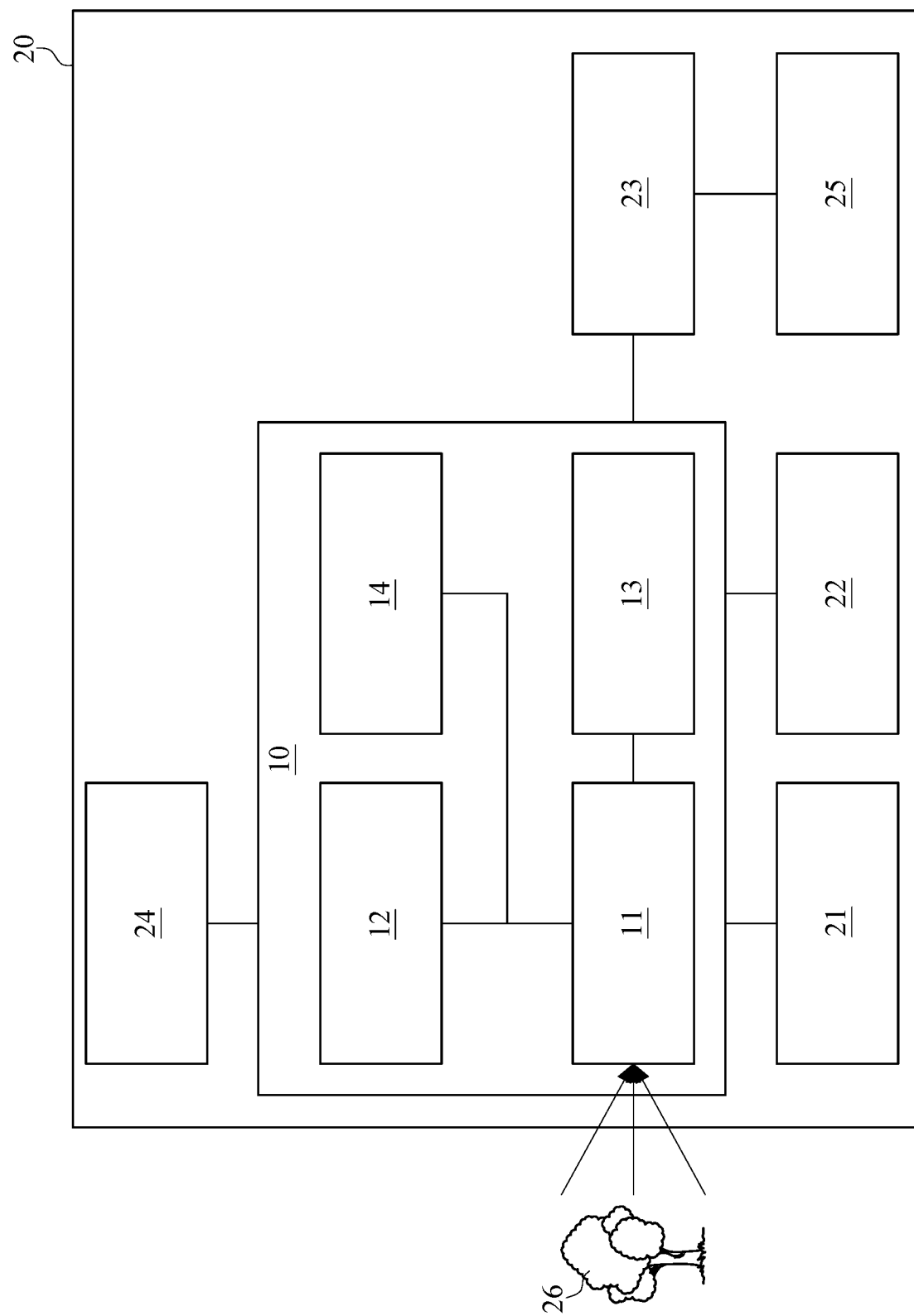
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22. In this embodiment, an electronic device 20 is a smartphone including an image capturing unit 10, the image capturing unit 10" disclosed in the 11th embodiment, a flash module 21, a focus assist module 22, an image signal processor 23, a user interface 24 and an image software processor 25. In this embodiment, the image capturing unit 10 is a wide-angle image capturing unit having a relatively large field of view, and the image capturing unit 10" is a telephoto image capturing unit having a relatively small field of view; that is, in this embodiment, the image capturing units 10, 10" have different fields of view from each other, but the disclosure is not limited thereto. For example, the two image capturing units 10, 10" can have the same field of view. Furthermore, in this embodiment, the electronic device 20 includes two image capturing units 10, 10", but the disclosure is not limited thereto. In some cases, the electronic device 20 can include only one image capturing unit 10 or one image capturing unit 10". In some cases, the electronic device 20 can include more than two image capturing units of different configurations.

When a user captures images of an object 26 through the user interface 24, the light rays converge in the image capturing unit 10" to generate an image, and the flash module 21 is activated for light supplement. The focus assist module 22 detects the object distance of the imaged object 26 to achieve fast auto focusing. The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10" of the present disclosure installed in an electronic device, and the present disclosure is not limited thereto. The image capturing unit 10" can be optionally applied to optical systems with a movable focus. Furthermore, the imaging lens assembly of the image capturing unit 10" features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising six lens elements, the six lens elements being, in order from an object side to an image side: a first lens element, a second lens element, a third lens element, a fourth lens element, a fifth lens element and a sixth lens element;
   wherein the first lens element has positive refractive power, the sixth lens element has at least one aspheric surface, at least one lens element has at least one lens surface with at least one inflection point, and at least one lens element has an Abbe number smaller than 20.0;
   wherein the imaging lens assembly further comprises an aperture stop disposed between an imaged object and the third lens element, an Abbe number of the fourth lens element is V4, a curvature radius of an object-side surface of the first lens element is R1, a curvature radius of an image-side surface of the fifth lens element is R10, a curvature radius of an image-side surface of the sixth lens element is R12, an axial distance between the aperture stop and the image-side surface of the sixth lens element is SD, an axial distance between the object-side surface of the first lens element and the image-side surface of the sixth lens element is TD, and the following conditions are satisfied:

$10.0 < V4 \leq 23.8$;

$-1.50 < (R1-R12)/(R1+R12) < 0$;

$-1.8 < R10/R12 < 1.3$; and $0.75 < SD/TD < 0.90$.

2. The imaging lens assembly of claim 1, wherein the second lens element has positive refractive power.

3. The imaging lens assembly of claim 1, wherein the first lens element has an object-side surface being convex in a paraxial region thereof and an image-side surface being concave in a paraxial region thereof, and the sixth lens element is made of plastic material.

4. The imaging lens assembly of claim 1, wherein the third lens element has an object-side surface being convex in a paraxial region thereof, and there is an air gap in a paraxial region between each of all adjacent lens elements of the imaging lens assembly.

5. The imaging lens assembly of claim 1, wherein the image-side surface of the sixth lens element is convex in a paraxial region thereof.

6. The imaging lens assembly of claim 1, wherein an axial distance between an object-side surface of the first lens element and an image surface is TL, a focal length of the imaging lens assembly is f, and the following condition is satisfied:

$0.70 < TL/f < 1.10$.

7. The imaging lens assembly of claim 1, wherein a focal length of the imaging lens assembly is f, the curvature radius of the image-side surface of the sixth lens element is R12, and the following condition is satisfied:

$-0.65 < f/R12 \leq 0.46$.

8. The imaging lens assembly of claim 1, wherein each lens element has at least one aspheric surface, a maximum value among refractive indices of all lens elements is Nmax, and the following condition is satisfied:

$1.669 \leq Nmax < 1.75$.

9. The imaging lens assembly of claim 1, wherein an axial distance between the fourth lens element and the fifth lens element is T45, a central thickness of the fourth lens element is CT4, a central thickness of the fifth lens element is CT5, and the following condition is satisfied:

$0 < T45/(CT4+CT5) \leq 0.64$.

10. The imaging lens assembly of claim 1, wherein a focal length of the imaging lens assembly is f, a curvature radius of an object-side surface of a lens element is Rf, a curvature radius of an image-side surface of the lens element is Rr, and at least one lens element satisfies the following condition:

$|f/Rf|+|f/Rr|<1.0$.

11. The imaging lens assembly of claim 1, wherein there are at least two lens elements having at least one lens surface with at least one inflection point, a focal length of the imaging lens assembly is f, an entrance pupil diameter of the imaging lens assembly is EPD, and the following condition is satisfied:

$0.90 < f/EPD \leq 2.29$.

12. An image capturing unit, comprising:
the imaging lens assembly of claim 1;
a driving device disposed on the imaging lens assembly; and
an image sensor disposed on an image surface of the imaging lens assembly.

13. An electronic device, comprising:
the image capturing unit of claim 12.

14. The imaging lens assembly of claim 1, wherein the sixth lens element has an object-side surface being concave in a paraxial region thereof.

15. The imaging lens assembly of claim 1, wherein a maximum value among axial distances between each of all adjacent lens elements of the imaging lens assembly is ATmax, a maximum value among central thicknesses of all lens elements of the imaging lens assembly is CTmax, and the following condition is satisfied:

$1.20 < ATmax/CTmax < 6.0$.

16. The imaging lens assembly of claim 1, wherein a focal length of the imaging lens assembly is f, a curvature radius of an object-side surface of the fifth lens element is R9, and the following condition is satisfied:

$-0.50 < f/R9 < 5.0$.

17. The imaging lens assembly of claim 1, wherein there are at least three lens elements with an Abbe number smaller than 25.0.

18. The imaging lens assembly of claim 1, wherein there are at least two lens elements with an Abbe number smaller than 20.0, and each of an image-side surface of the fourth lens element, the image-side surface of the fifth lens element and the image-side surface of the sixth lens element has at least one convex shape in an off-axis region thereof.

19. The imaging lens assembly of claim 1, wherein an absolute value of a focal length of the sixth lens element is smaller than an absolute value of a focal length of the first lens element.

* * * * *